(12) United States Patent
Singh et al.

(10) Patent No.: US 11,798,554 B2
(45) Date of Patent: *Oct. 24, 2023

(54) DYNAMIC CONTACT INGESTION

(71) Applicant: Amazon Technologies, Inc., Seattle, WA (US)

(72) Inventors: Amandeep Singh, Issaquah, WA (US); Amit Chakraborty, Redmond, WA (US); Peng Bai, Seattle, WA (US); Kamal Bhambhani, Sunnyvale, CA (US); Premal Dinesh Desai, Cupertino, CA (US); Shane Michael Wilson, Mercer Island, WA (US); Sanjay Rajput, Mountain View, CA (US); Abhay Gupta, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/346,394

(22) Filed: Jun. 14, 2021

(65) Prior Publication Data

US 2021/0335361 A1    Oct. 28, 2021

Related U.S. Application Data

(63) Continuation of application No. 16/360,436, filed on Mar. 21, 2019, now Pat. No. 11,056,111.

(Continued)

(51) Int. Cl.
*G10L 15/22*     (2006.01)
*H04W 76/14*     (2018.01)
(Continued)

(52) U.S. Cl.
CPC ............. *G10L 15/22* (2013.01); *H04W 4/48* (2018.02); *H04W 76/14* (2018.02); *B60R 16/0373* (2013.01); *G10L 2015/223* (2013.01)

(58) Field of Classification Search
CPC .. G10L 15/22; G10L 2015/223; H04W 76/14; H04W 4/48; B60R 16/0373
See application file for complete search history.

(56) References Cited

U.S. PATENT DOCUMENTS 7,720,832 B1 *   5/2010   da Rosa, Jr. ........... G06Q 10/10
                                                   707/782
8,744,397 B2 *   6/2014   Gee .......................... H04W 4/90
                                                   701/45

(Continued)

OTHER PUBLICATIONS

Communication pursuant to Article 94(3) EPC dated Nov. 2, 2022 for EP Application No. 19809298.3.

(Continued)

*Primary Examiner* — Lewis G West
(74) *Attorney, Agent, or Firm* — PIERCE ATWOOD LLP

(57) ABSTRACT

Techniques for dynamic contact ingestion are described. A system may interpret a voice command received from a first device based on contact data or other information associated with a second device connected to the first device. For example, when a data connection is made between the first device and the second device, the first device may receive the contact data and send the contact data to a remote system. The remote system may temporarily associate the contact data with the first device, enabling the remote system to interpret a voice command received from the first device using the contact data. The remote system may use the contact data to perform disambiguation, enabling the remote system to initiate outbound calls, announce inbound calls, and/or the like. When the second device is disconnected from the first device, the remote system may remove the association between the contact data and the first device.

20 Claims, 37 Drawing Sheets

Related U.S. Application Data

(60) Provisional application No. 62/767,952, filed on Nov. 15, 2018.

(51) Int. Cl.
*H04W 4/48* (2018.01)
*B60R 16/037* (2006.01)

(56) References Cited

U.S. PATENT DOCUMENTS

| | | | |
|---|---|---|---|
| 9,628,617 B2 | 4/2017 | Joh et al. | |
| 10,127,908 B1* | 11/2018 | Deller | H04L 67/02 |
| 10,789,948 B1* | 9/2020 | Klein | G06F 16/3329 |
| 10,796,563 B1* | 10/2020 | Bell | G10L 15/22 |
| 2006/0209690 A1* | 9/2006 | Brooke | G06Q 10/109 |
| | | | 370/465 |
| 2006/0282649 A1* | 12/2006 | Malamud | H04W 12/06 |
| | | | 712/26 |
| 2008/0133580 A1* | 6/2008 | Wanless | H04L 61/4594 |
| | | | 707/999.102 |
| 2010/0227549 A1* | 9/2010 | Kozlay | H04W 12/50 |
| | | | 455/26.1 |
| 2011/0022661 A1* | 1/2011 | Alsina | G06V 40/172 |
| | | | 709/205 |
| 2011/0028094 A1* | 2/2011 | Masuda | H04W 12/06 |
| | | | 455/41.2 |
| 2013/0178151 A1* | 7/2013 | Itzhaki | H04M 1/72463 |
| | | | 455/26.1 |
| 2013/0185369 A1* | 7/2013 | Bain | G16H 20/00 |
| | | | 709/206 |
| 2013/0227431 A1* | 8/2013 | Vasudevan | H04L 51/52 |
| | | | 715/753 |
| 2014/0018000 A1* | 1/2014 | Seymour | H04W 48/16 |
| | | | 455/41.2 |
| 2014/0046664 A1* | 2/2014 | Sarkar | H04L 63/0861 |
| | | | 704/E17.003 |
| 2014/0254434 A1* | 9/2014 | Jain | H04L 65/1094 |
| | | | 370/259 |
| 2015/0073815 A1* | 3/2015 | Holmes | G16H 40/20 |
| | | | 705/2 |
| 2015/0082404 A1* | 3/2015 | Goldstein | H04W 4/023 |
| | | | 726/7 |
| 2015/0215464 A1* | 7/2015 | Shaffer | G10L 15/1815 |
| | | | 379/266.06 |
| 2015/0281371 A1* | 10/2015 | Bacon | H04L 67/141 |
| | | | 709/228 |
| 2015/0327319 A1* | 11/2015 | Yae | H04W 76/19 |
| | | | 455/41.2 |
| 2015/0379964 A1* | 12/2015 | Lee | H04M 1/72412 |
| | | | 345/173 |
| 2016/0014547 A1* | 1/2016 | Yae | H04W 4/80 |
| | | | 455/418 |
| 2016/0058658 A1* | 3/2016 | Borras | H04W 68/005 |
| | | | 601/46 |
| 2016/0066358 A1* | 3/2016 | Kim | H04W 76/14 |
| | | | 370/329 |
| 2016/0104486 A1* | 4/2016 | Penilla | G10L 15/02 |
| | | | 704/232 |
| 2017/0055108 A1* | 2/2017 | Jeon | H04W 4/40 |
| 2017/0064753 A1* | 3/2017 | Zhao | H04W 76/14 |
| 2017/0078848 A1* | 3/2017 | Almarri | H04W 4/025 |
| 2017/0104860 A1* | 4/2017 | Joh | H04M 1/271 |
| 2017/0223168 A1* | 8/2017 | Singh | H04W 4/12 |
| 2017/0264729 A1* | 9/2017 | Nelson | H04M 1/6066 |
| 2017/0267170 A1* | 9/2017 | Be | G01C 21/3679 |
| 2018/0013873 A1* | 1/2018 | Farrell | H04W 76/10 |
| 2018/0032585 A1* | 2/2018 | Kadiyala | G06N 20/00 |
| 2018/0032997 A1* | 2/2018 | Gordon | G06Q 30/0269 |
| 2018/0113987 A1* | 4/2018 | Zhu | G16H 50/20 |
| 2018/0309866 A1* | 10/2018 | Devaraj | H04M 3/53366 |
| 2019/0102376 A1* | 4/2019 | Agrawal | G06Q 50/01 |
| 2019/0182331 A1* | 6/2019 | You | H04W 76/14 |
| 2019/0199306 A1* | 6/2019 | Yum | H04W 4/80 |
| 2020/0380850 A1* | 12/2020 | Kawabata | G08C 17/02 |
| 2021/0297520 A1* | 9/2021 | Takada | H04M 1/6091 |
| 2022/0286420 A1* | 9/2022 | Fried | H04L 51/18 |

OTHER PUBLICATIONS

Ford Motor Company: "SYNC 3 Phone Pairing I Sync 3 How-To I Ford", Nov. 6, 2016 (Nov. 6, 2016), XP055969126, Retrieved from the Internet: URL:https://www.youtube.com/watch?v=GkGaDE1b5R0&t=13s [retrieved on Oct. 8, 2022].

Mazda Ireland: "How to pair your phone to the car?", Dec. 2, 2017 (Dec. 2, 2017), XP055969127, Retrieved from the Internet: URL:https://www.youtube.com/watch?v=h9Bn4pKRcr4&t=25s [retrieved on Oct. 8, 2022].

Honda Canada Inc.: "Making and Receiving Calls with Bluetooth HandsFreelink", Oct. 25, 2017 (Oct. 25, 2017), XP055969128, Retrieved from the Internet: URL:https://www.youtube.com/watch?v=jGrBv68sOtU [retrieved on Oct. 8, 2022].

European Office Action dated May 10, 2023 for European Patent Application No. 19809298.3.

Chinese First Office Action dated Jun. 30, 2023 for Chinese Application No. 2019800874073.

\* cited by examiner

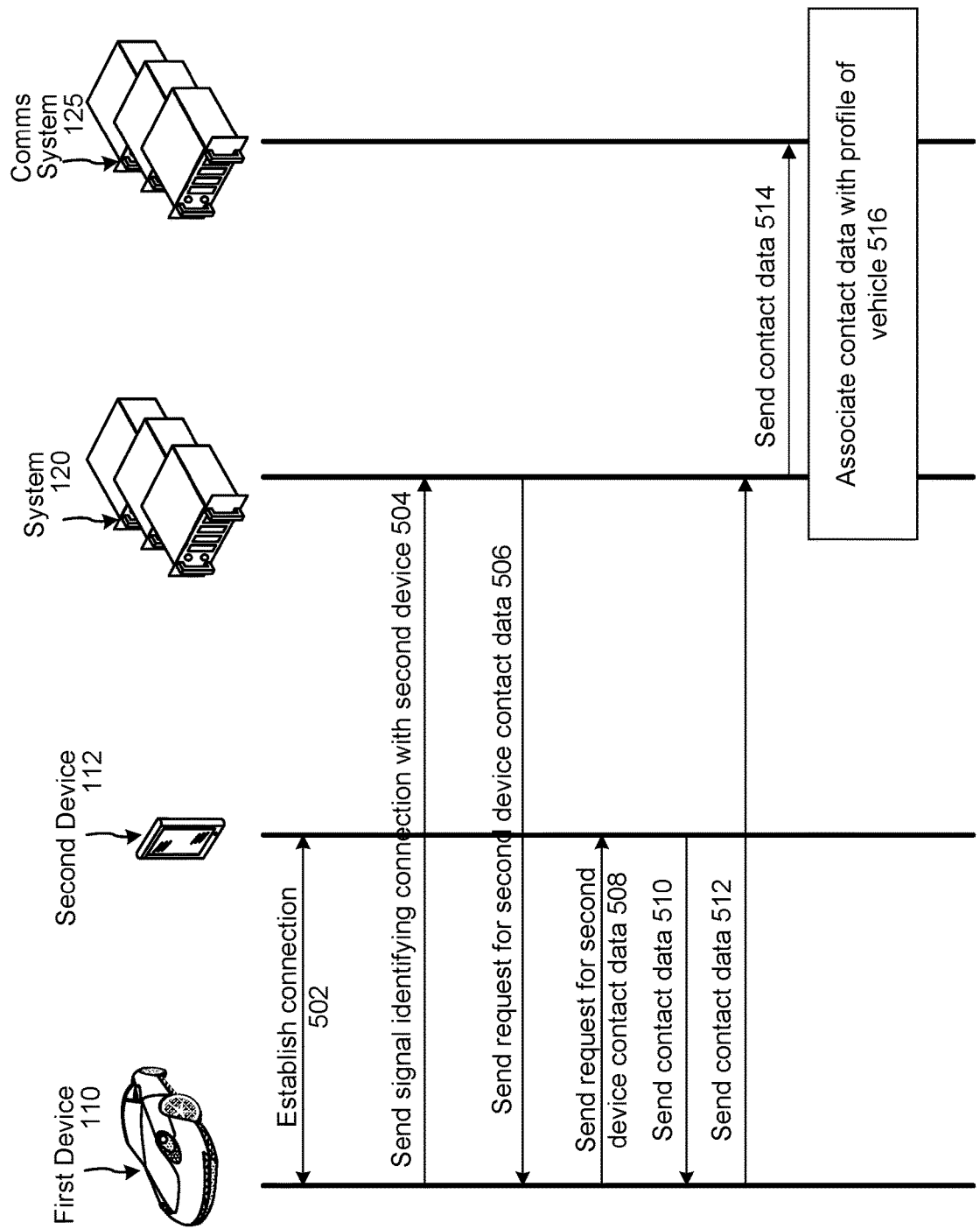

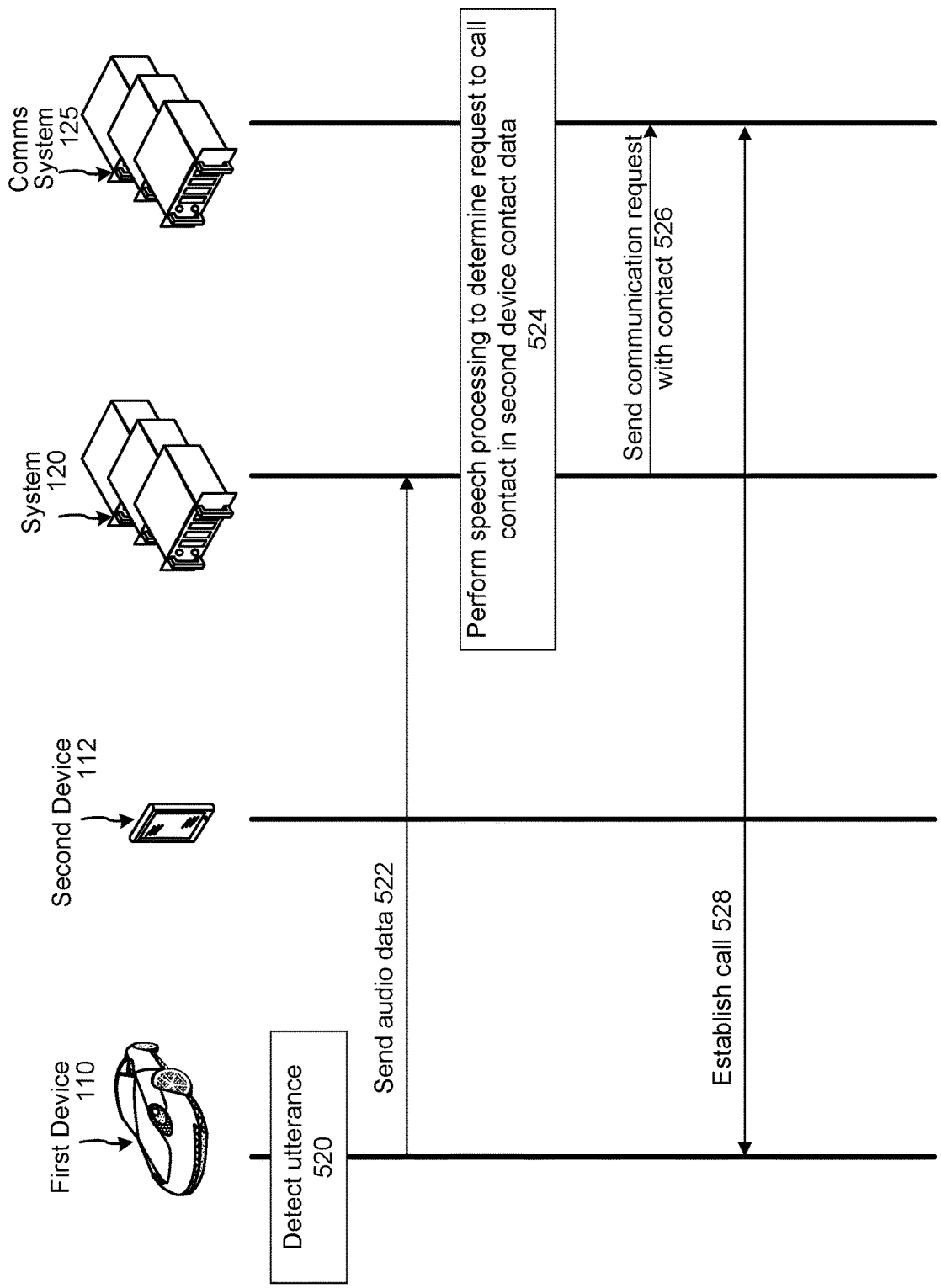

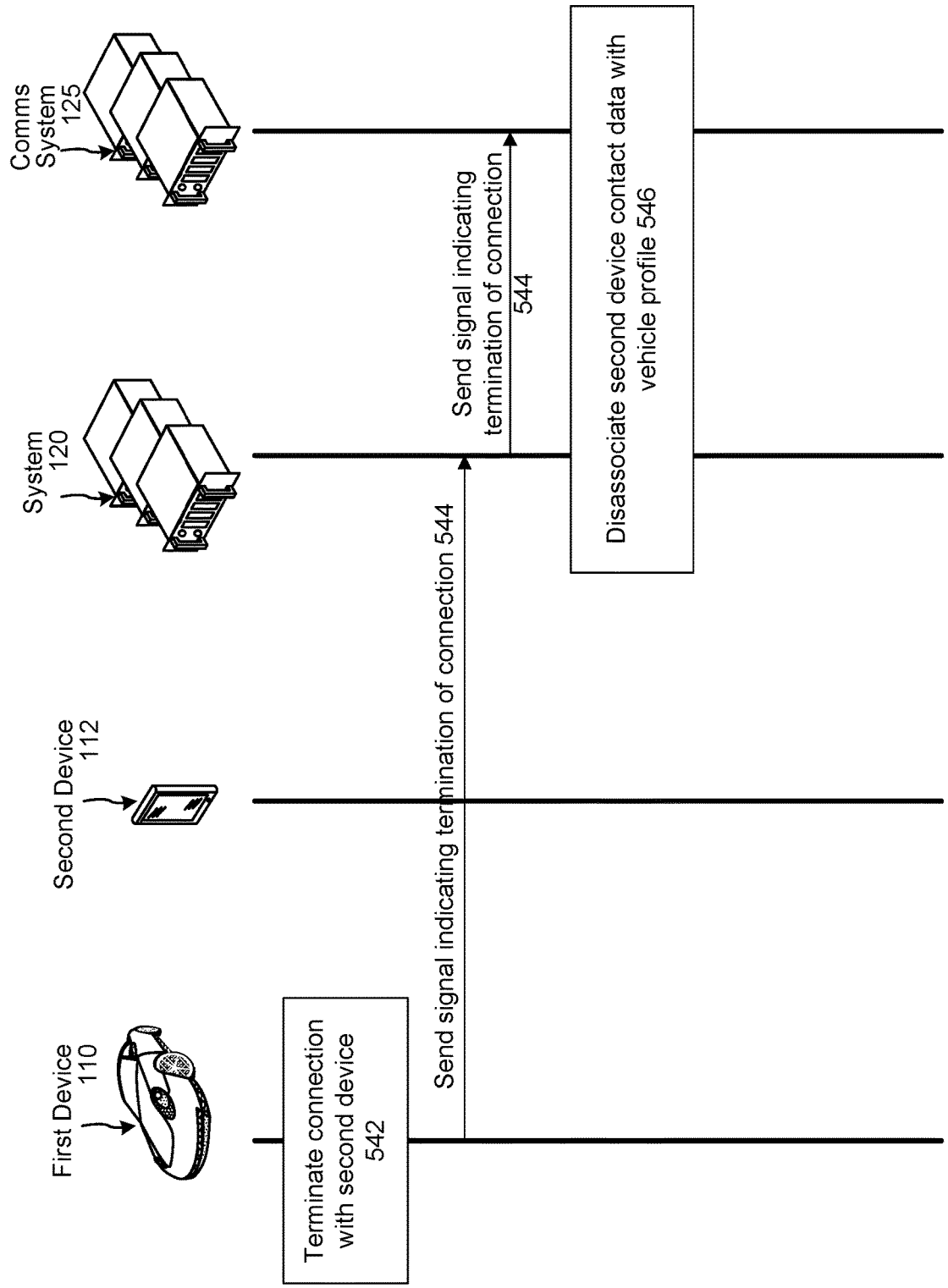

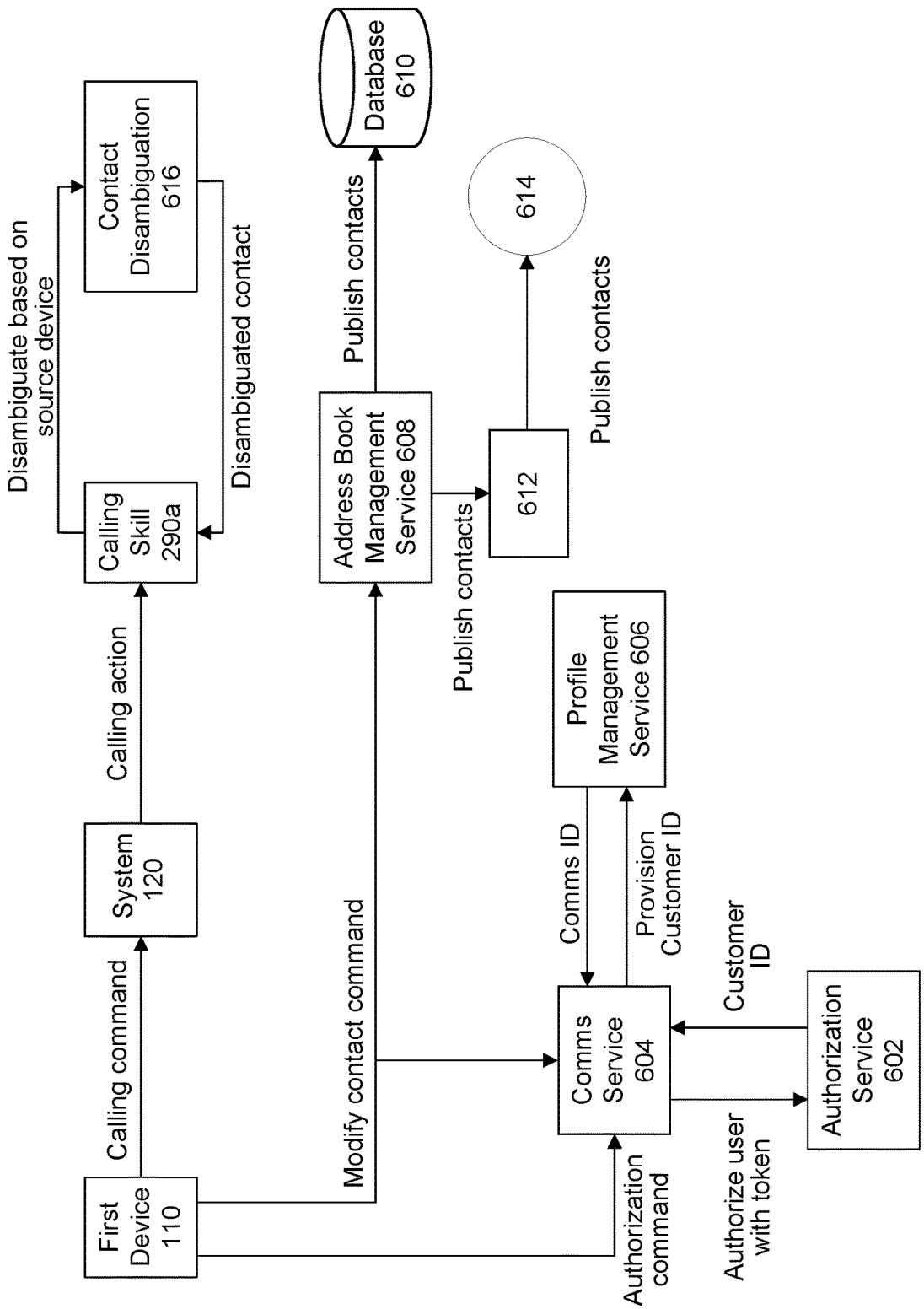

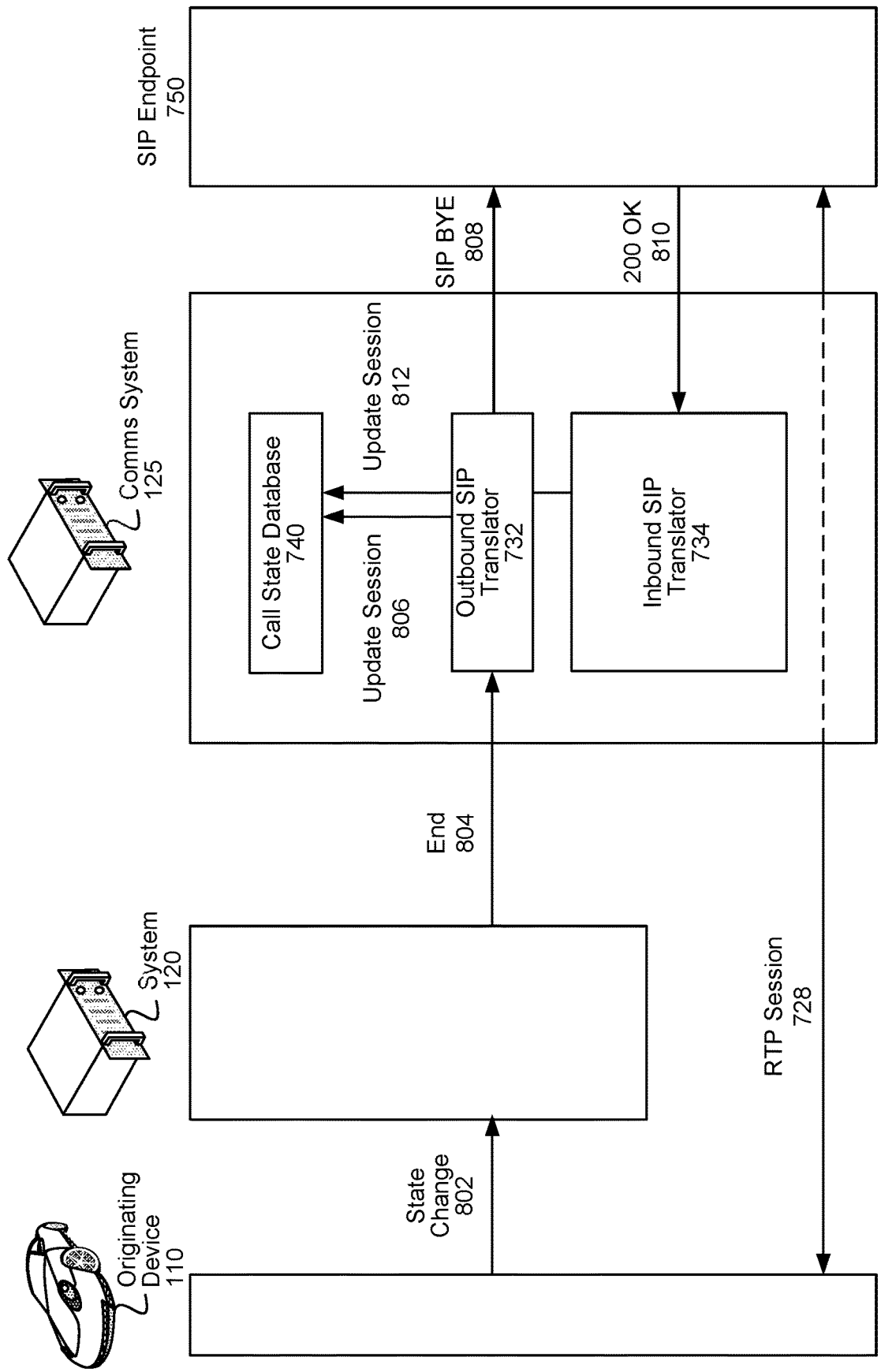

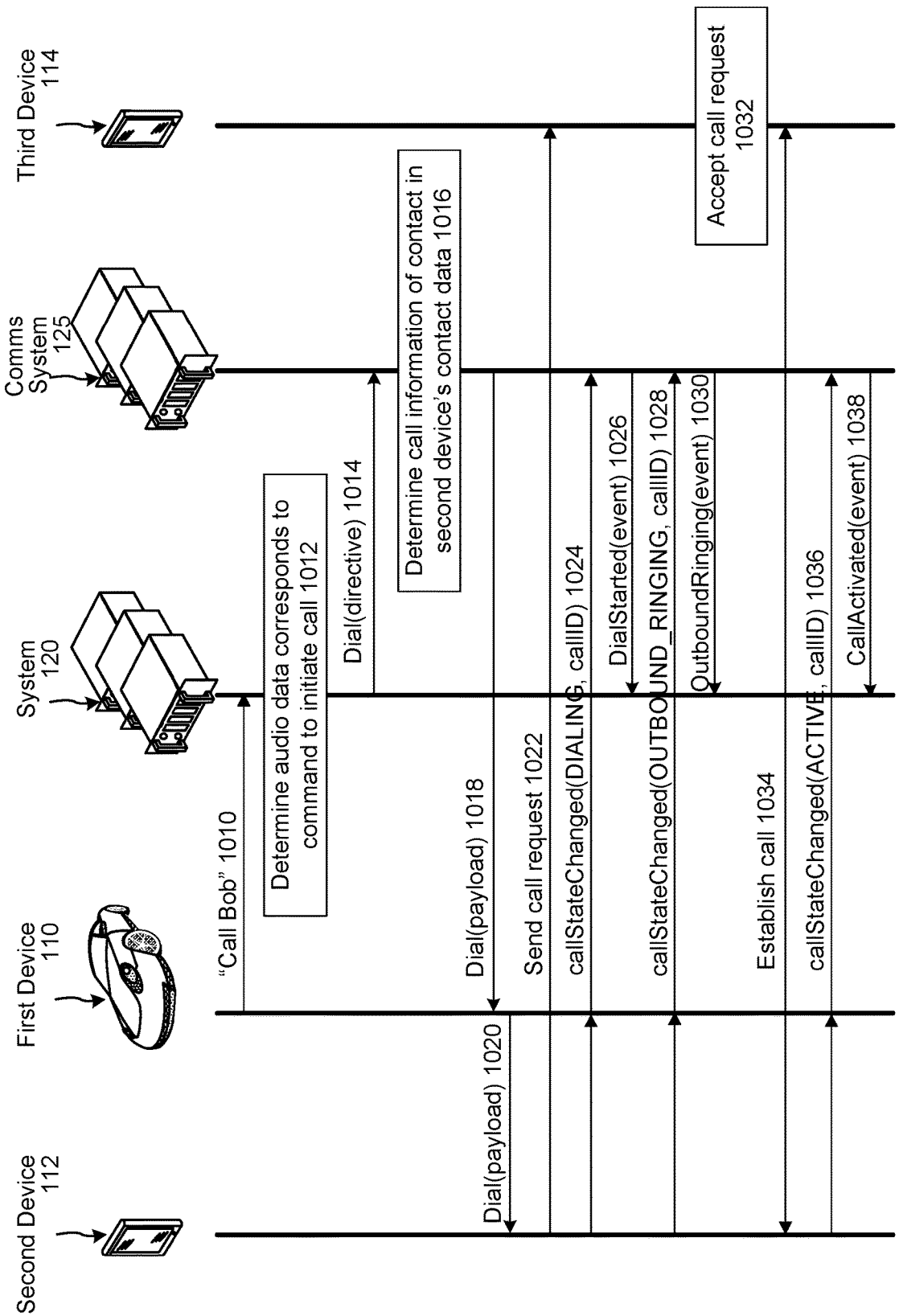

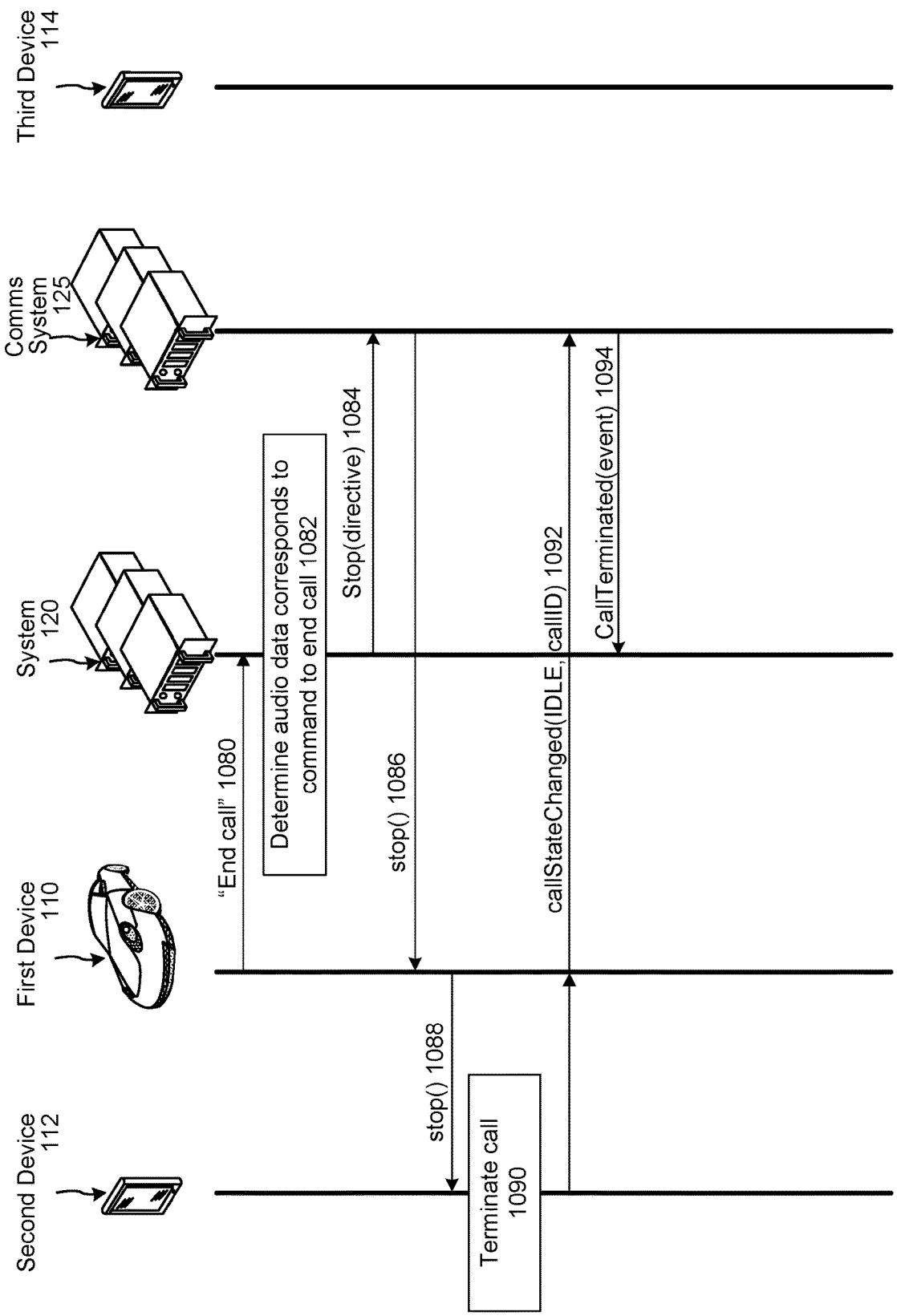

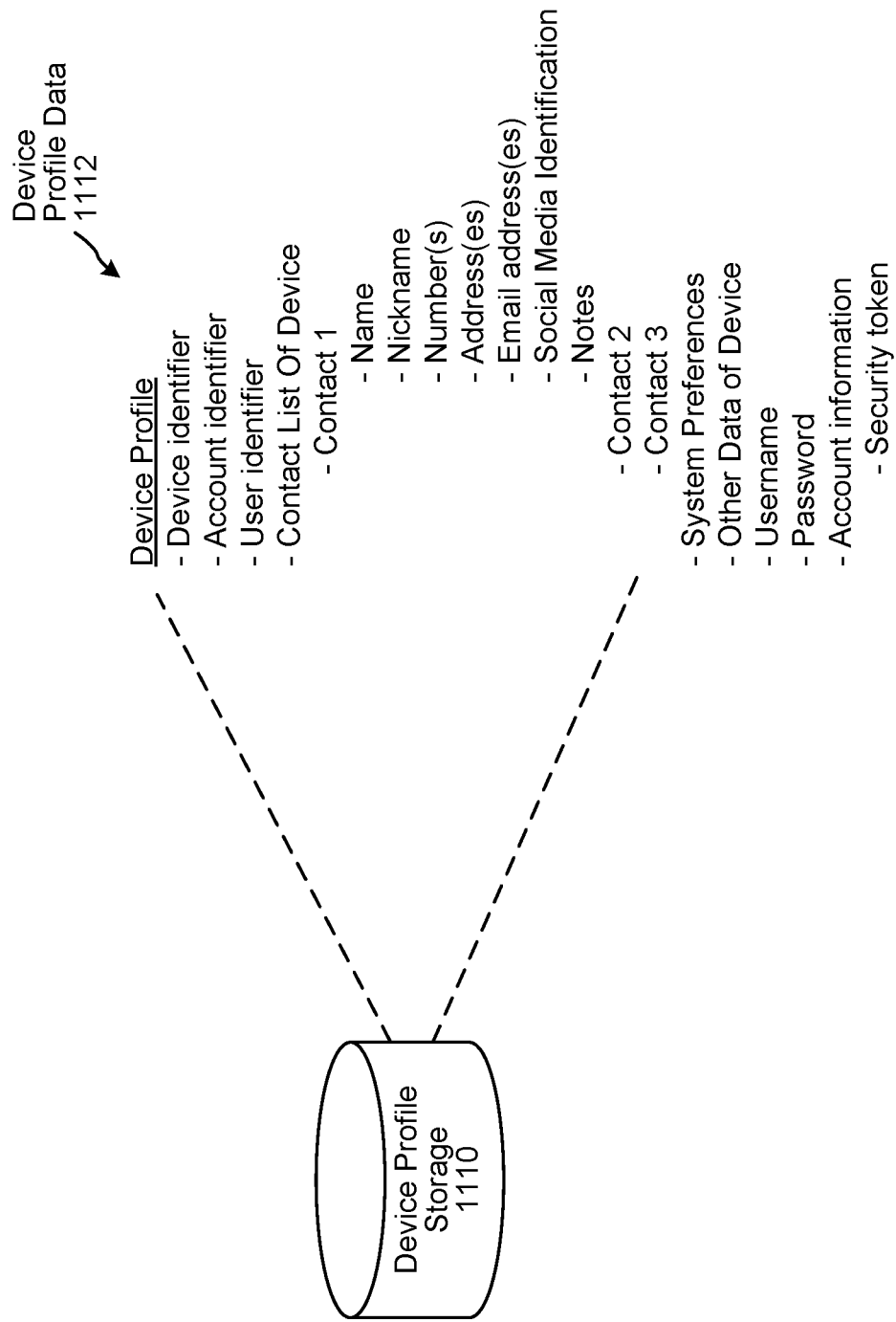

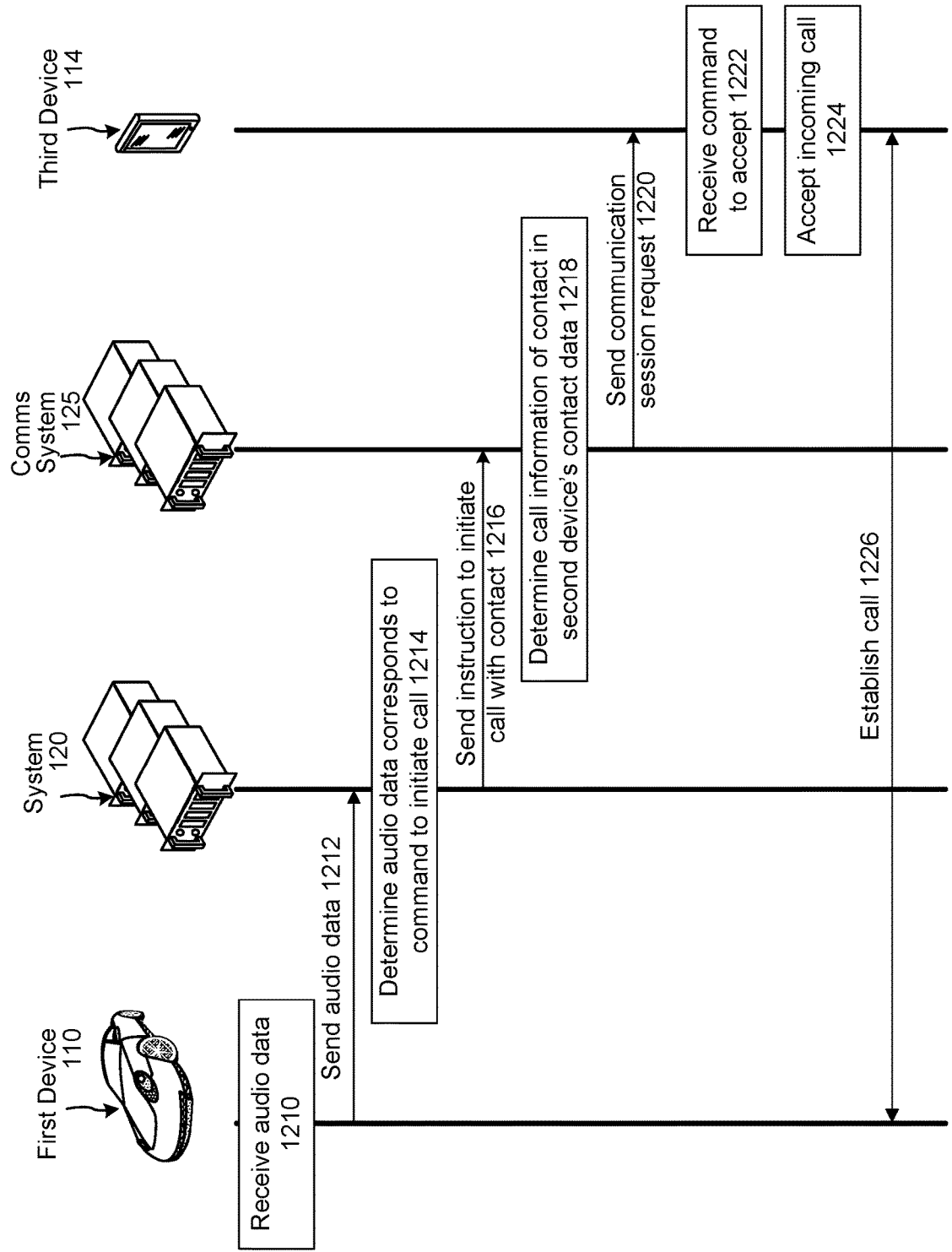

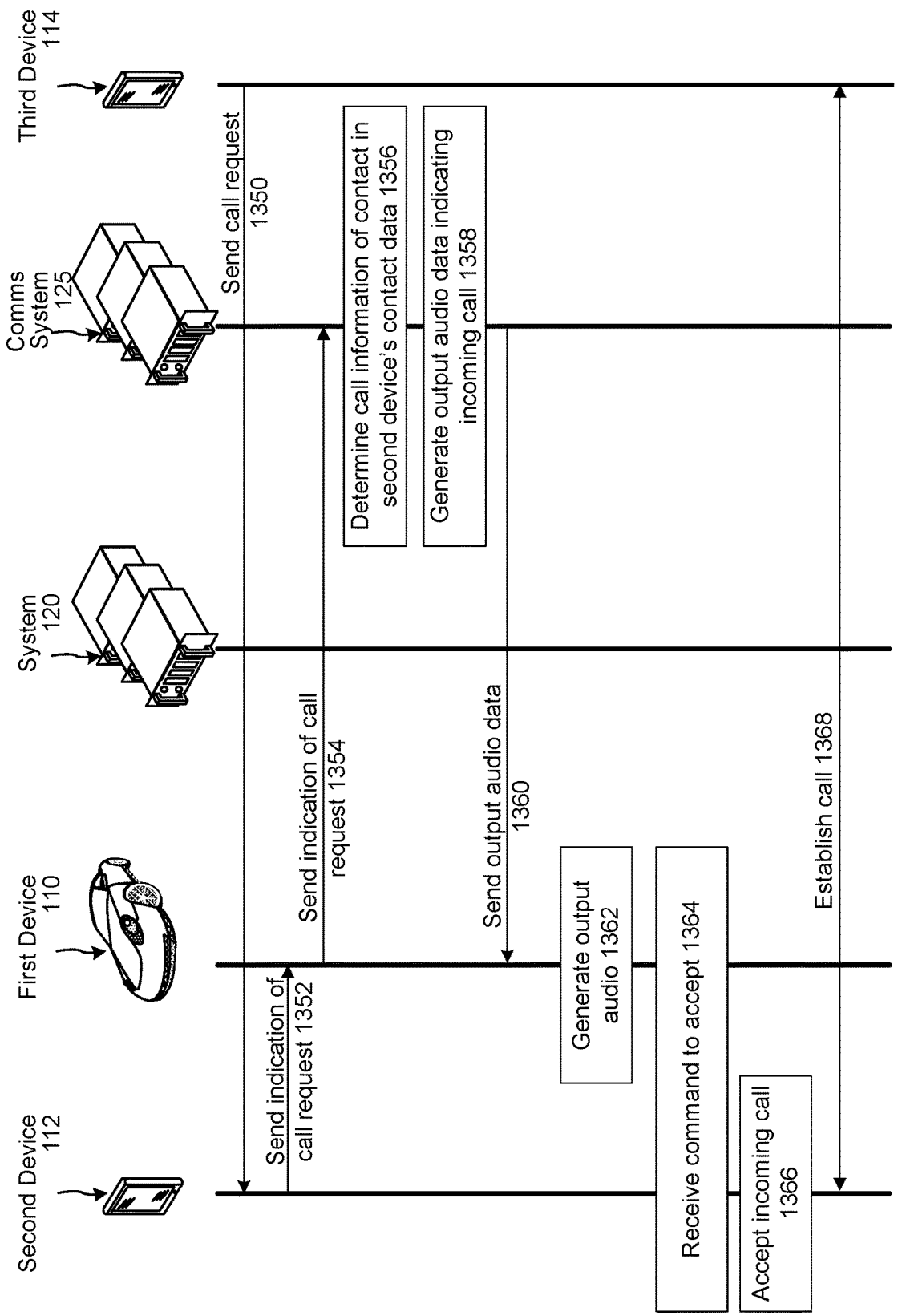

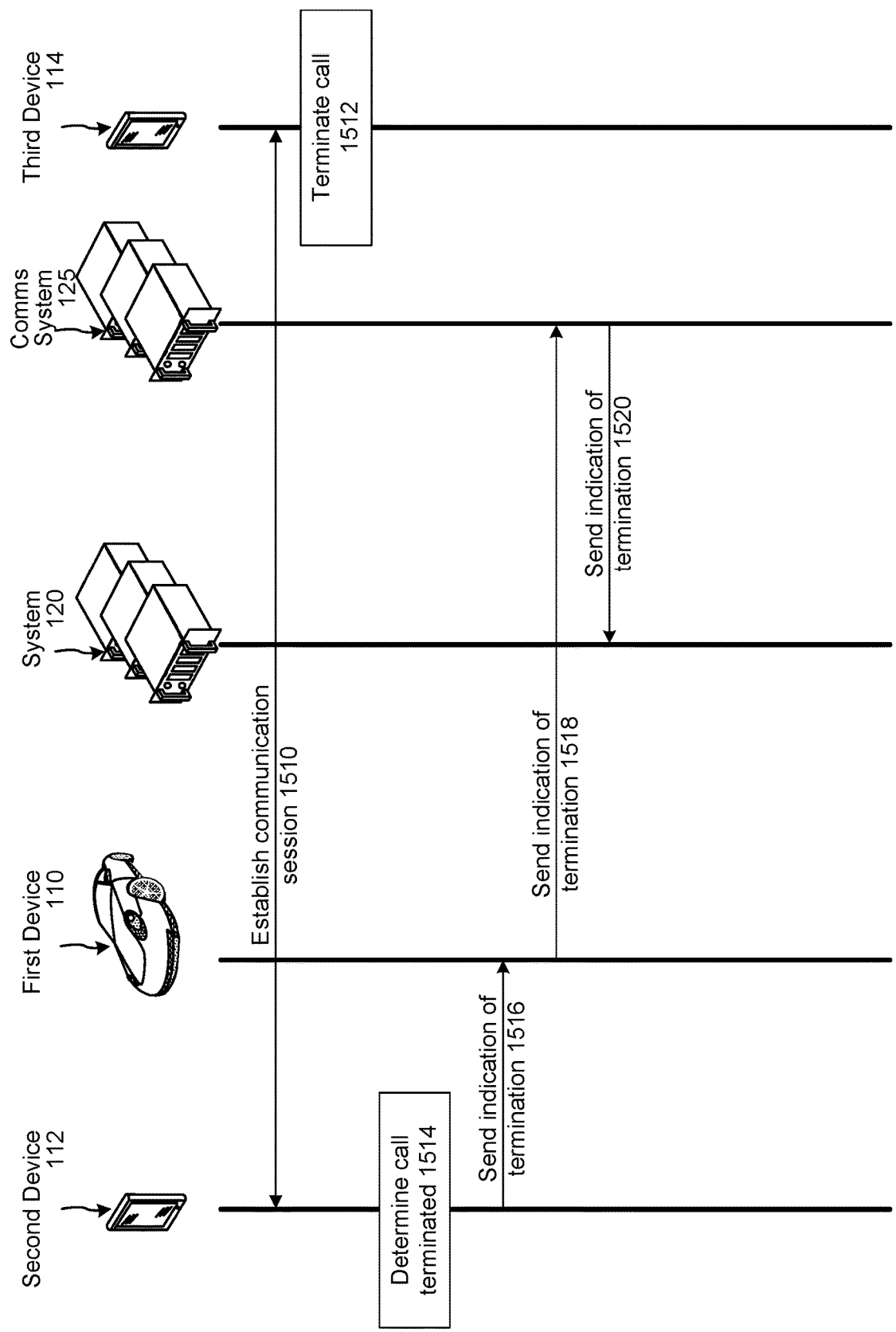

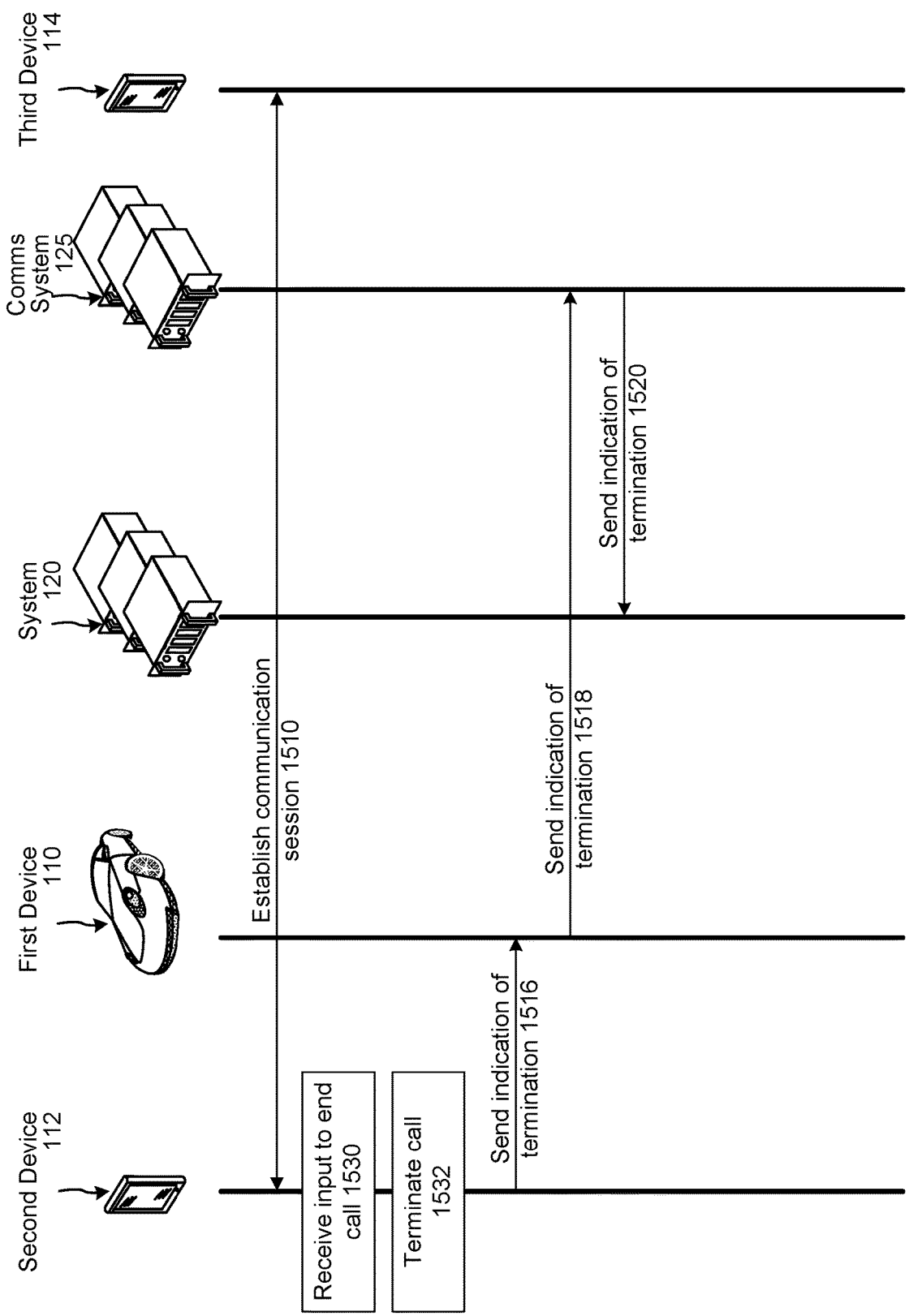

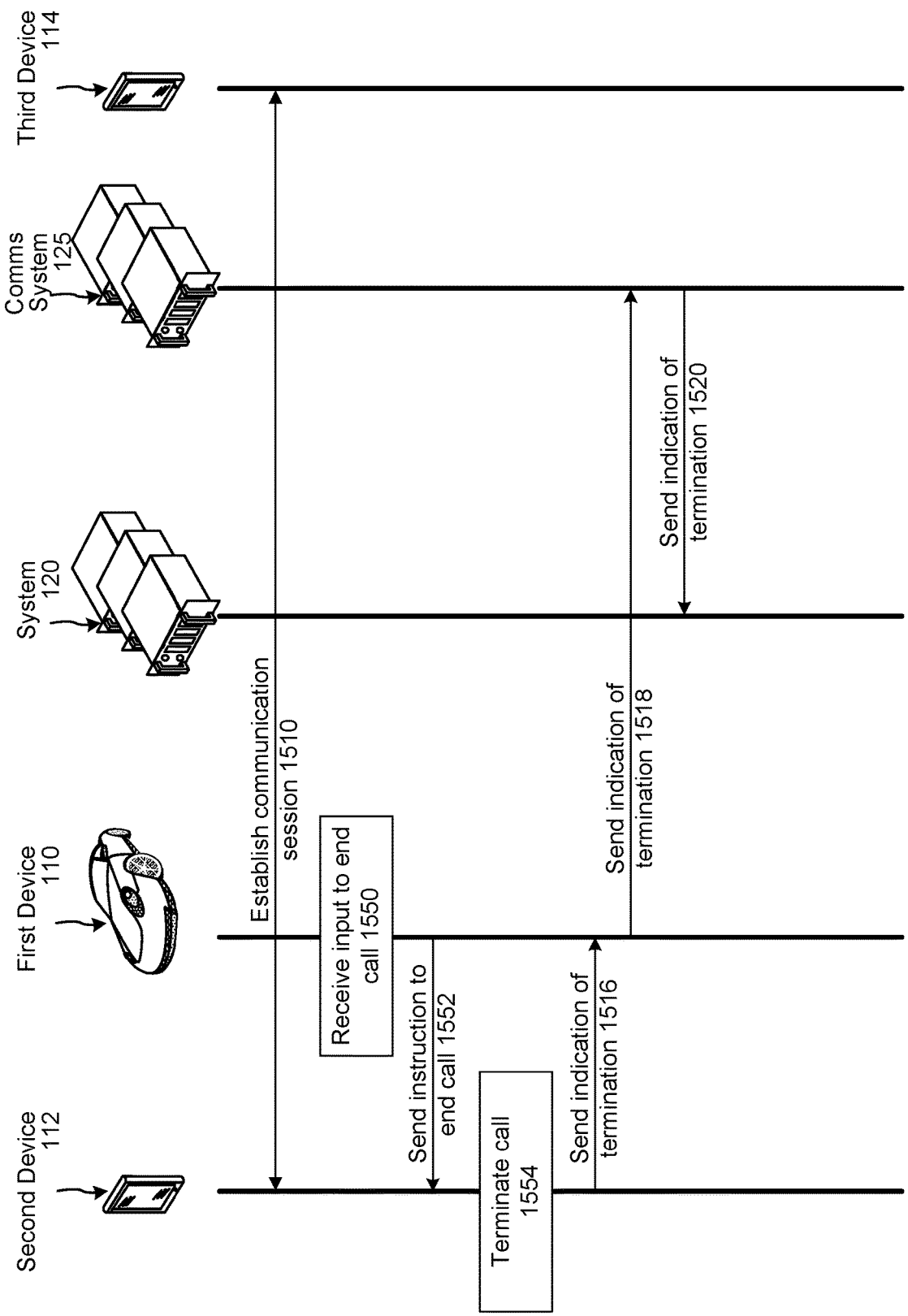

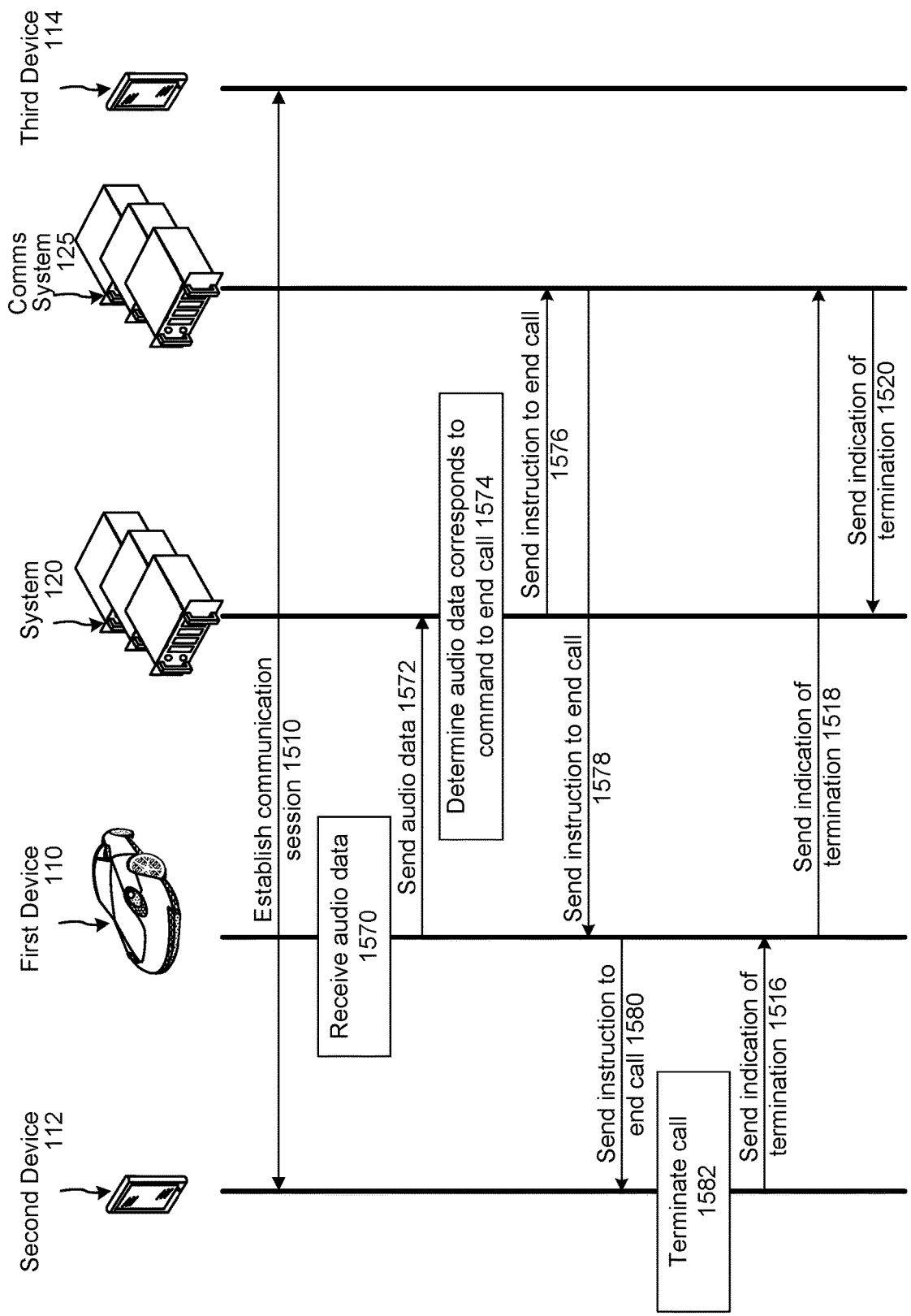

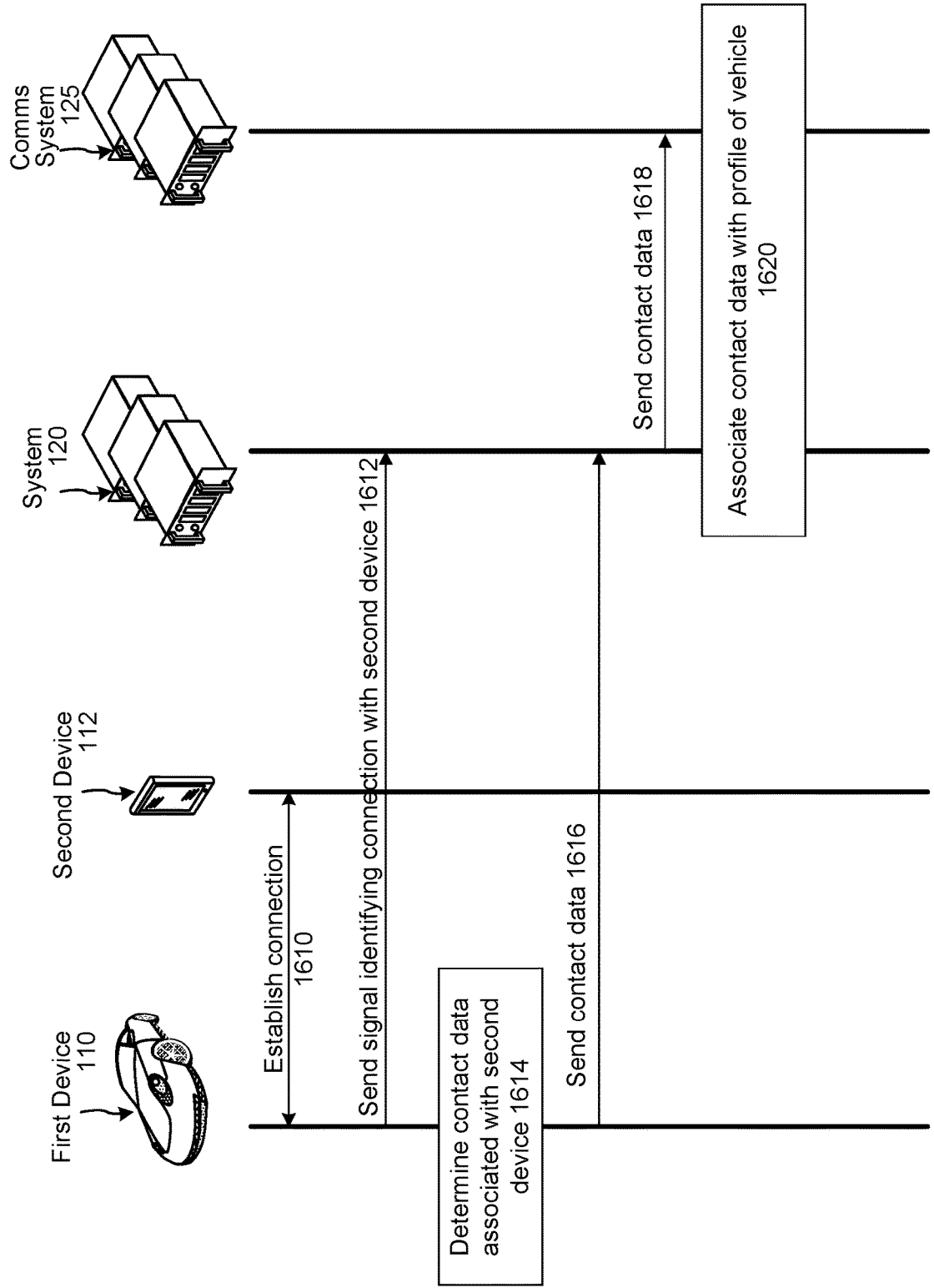

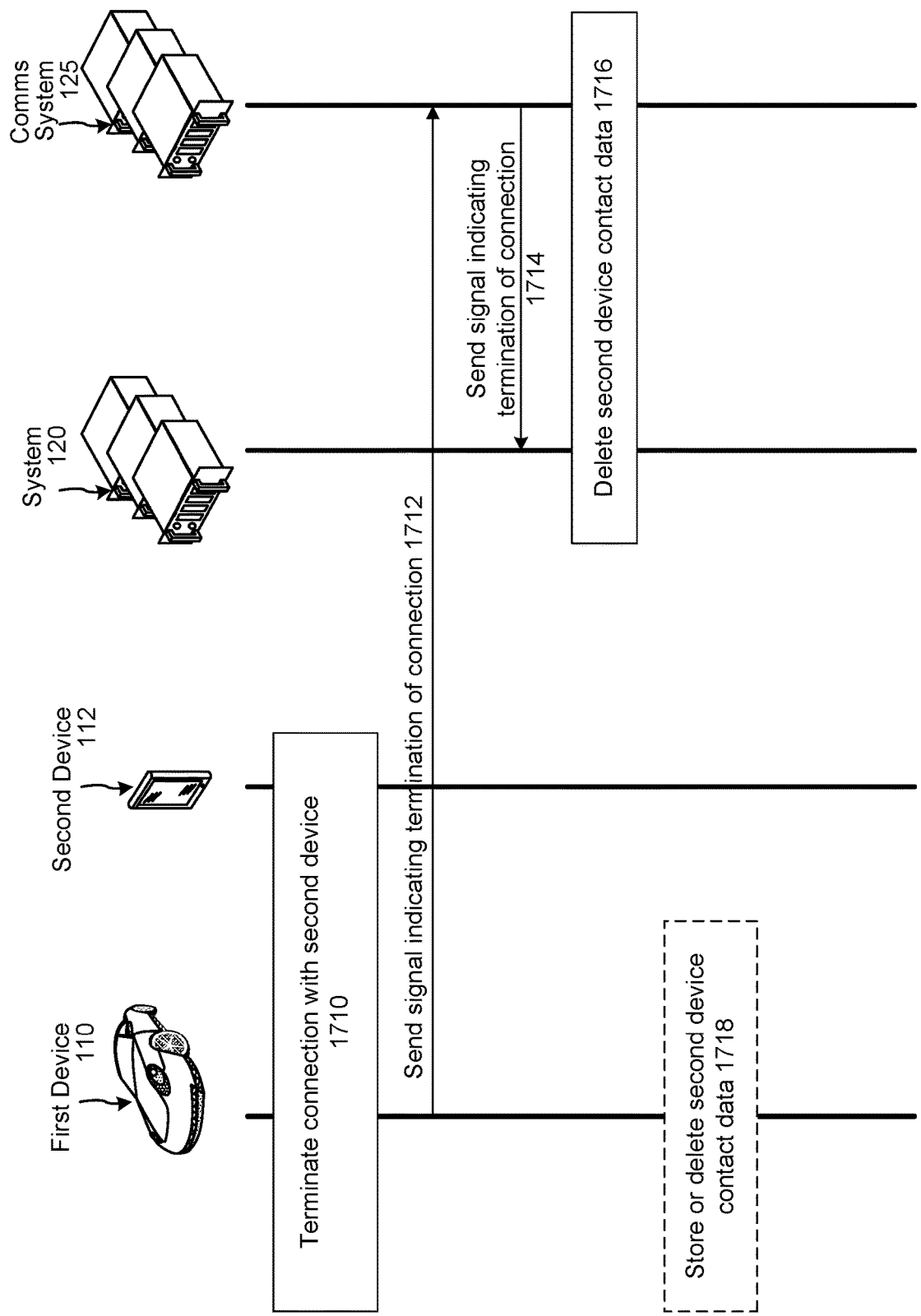

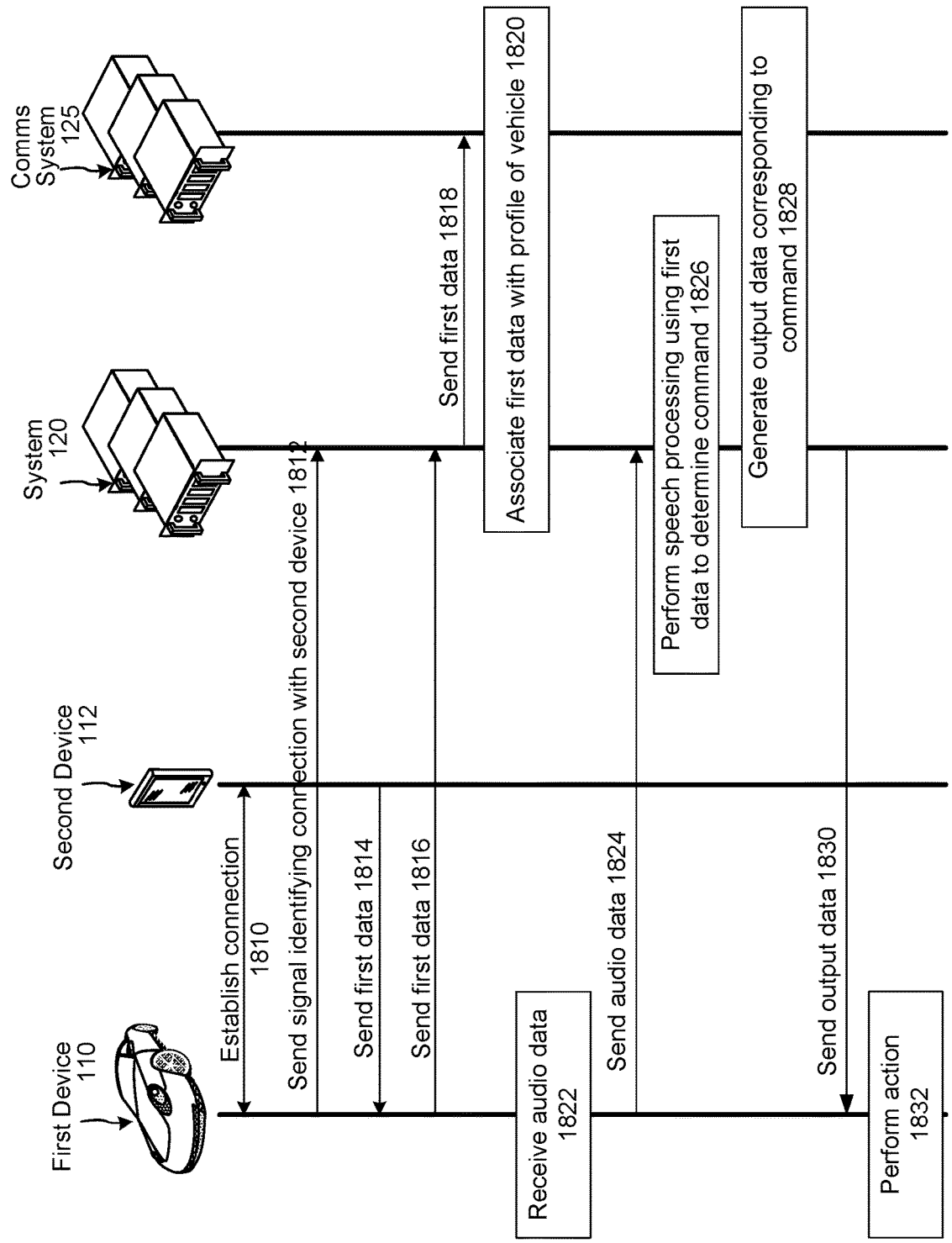

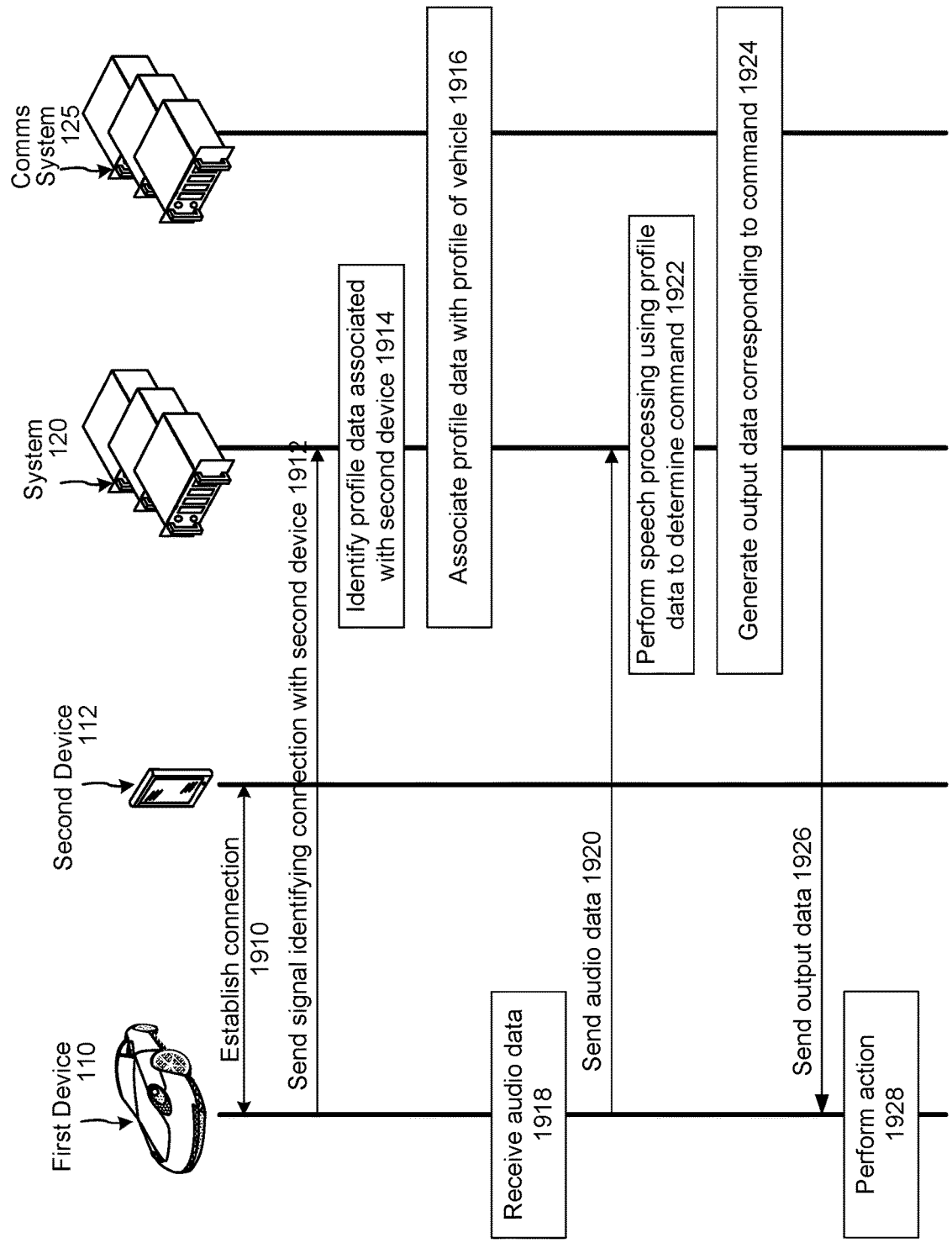

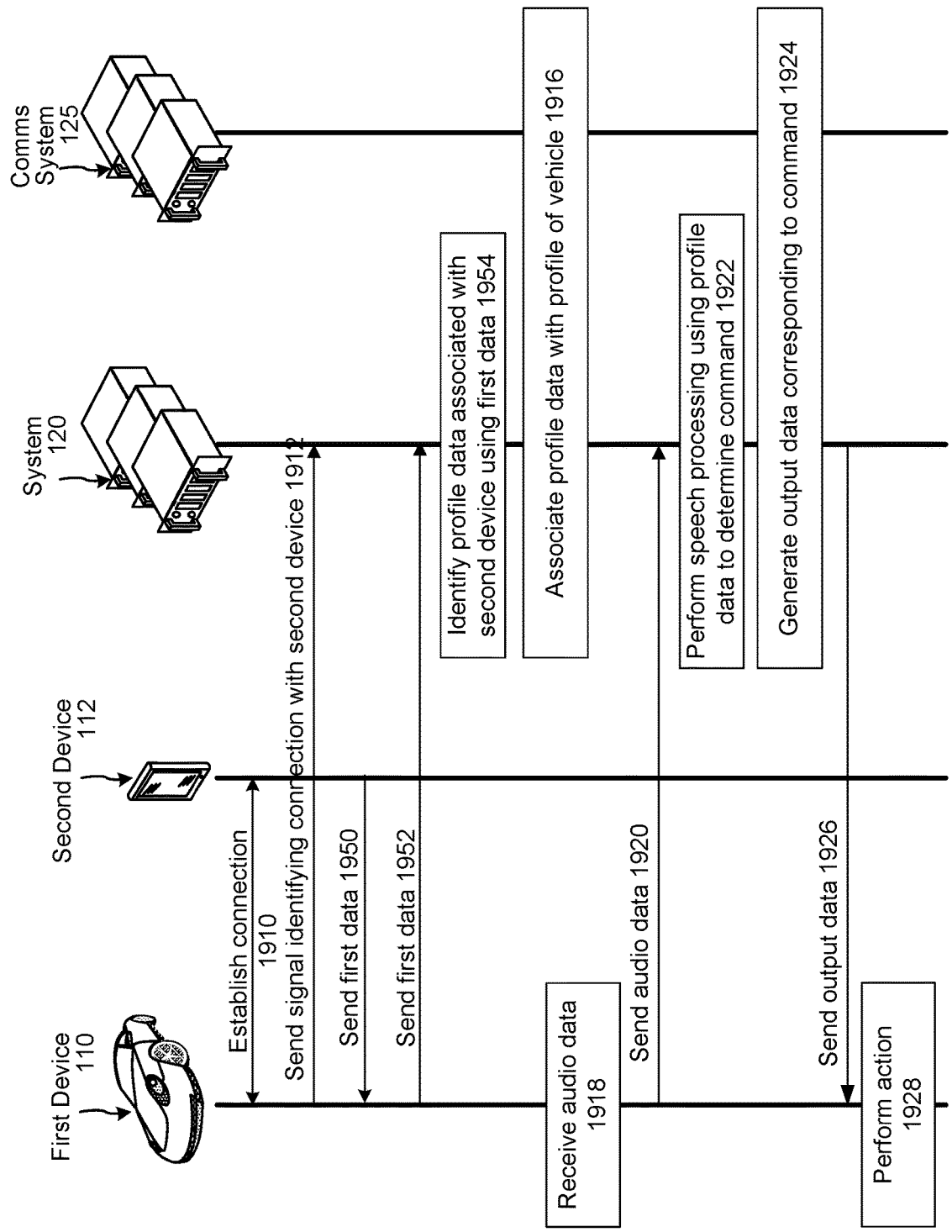

FIG. 21A
Single Device Implementation 2100
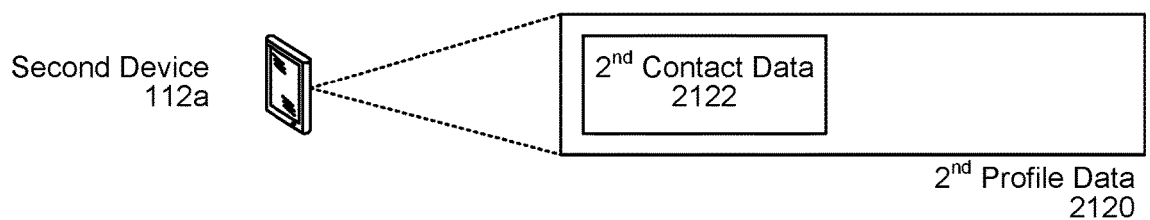
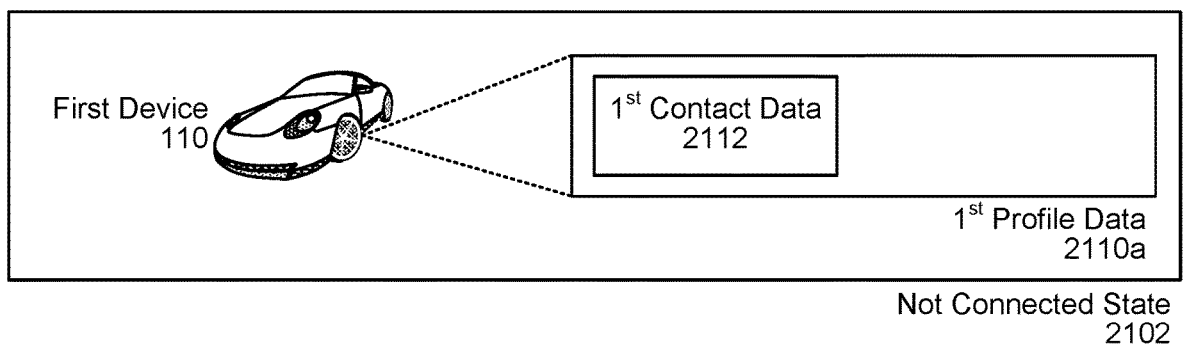
Not Connected State 2102
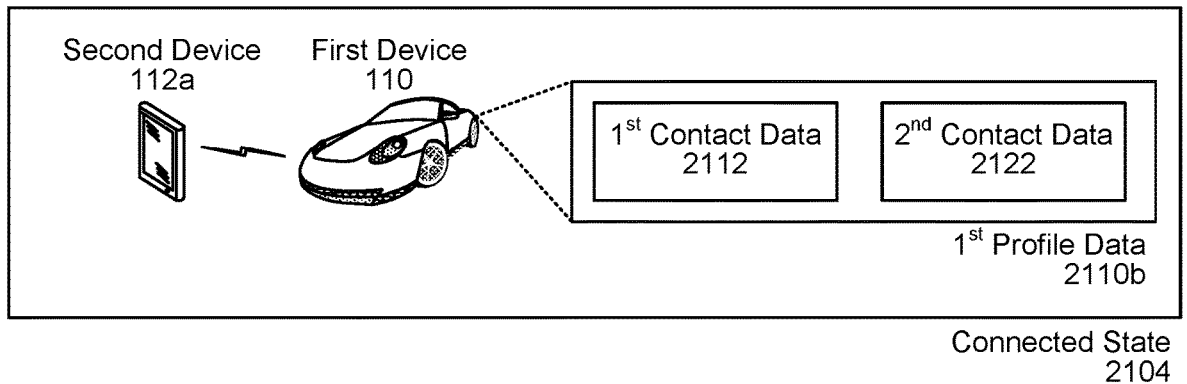
Connected State 2104

FIG. 21B

Multiple Device Implementation 2150

Second Device 112a — 2nd Contact Data 2122

2nd Profile Data 2120

Second Device 112b — 3rd Contact Data 2132

3rd Profile Data 2130

First Device 110 — 1st Contact Data 2112

1st Profile Data 2110a

Not Connected State 2152

Second Device 112a
First Device 110
Second Device 112b

1st Contact Data 2112 | 2nd Contact Data 2122
3rd Contact Data 2132

1st Profile Data 2110c

Connected State 2154

DYNAMIC CONTACT INGESTION

CROSS-REFERENCE TO RELATED APPLICATION DATA

This application is a continuation of, and claims the benefit of priority of, U.S. Non-Provisional patent application Ser. No. 16/360,436, filed Mar. 21, 2019, and entitled "DYNAMIC CONTACT INGESTION," which claims the benefit of and priority to, U.S. Provisional Patent Application No. 62/767,952, filed Nov. 15, 2018, and entitled "DYNAMIC CONTACT INGESTION," in the names of Amandeep Singh, et al. The contents of each of which are expressly incorporated herein by reference in their entirety.

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to skills. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5A is a process flow diagram illustrating the integration of contact data according to embodiments of the present disclosure.

FIG. 5B is a process flow diagram illustrating processing a request to make a call using ingested contact data according to embodiments of the present disclosure.

FIG. 5C is a process flow diagram illustrating disassociating contact data after termination of a connection according to embodiments of the present disclosure.

FIG. 6 illustrates components of the system and/or communications system according to embodiments of the present disclosure.

FIGS. 8A and 8B illustrate examples of signaling to end a communication session according to embodiments of the present disclosure.

FIGS. 10A-10C illustrate examples of establishing and terminating a communication session according to embodiments of the present disclosure.

FIG. 11 illustrates an example device profile of a device stored in device profile storage according to embodiments of the present disclosure.

FIGS. 12A-12B are process flow diagrams illustrating examples of establishing communication sessions using a data connection according to embodiments of the present disclosure.

FIGS. 13A-13B are process flow diagrams illustrating examples of establishing communication sessions using a cellular connection according to embodiments of the present disclosure.

FIGS. 15A-15D are process flow diagrams illustrating examples of terminating a communication session according to embodiments of the present disclosure.

FIG. 16 is a process flow diagram illustrating the integration of contact data according to embodiments of the present disclosure.

FIG. 17A is a process flow diagram illustrating deleting contact data after termination of a connection according to embodiments of the present disclosure.

FIG. 18 is a process flow diagram illustrating processing a voice command using ingested device data according to embodiments of the present disclosure.

FIGS. 19A-19B are process flow diagrams illustrating the temporary association of profile data according to embodiments of the present disclosure.

FIGS. 21A-21B illustrate examples of temporarily associating one or more user profiles according to embodiments of the present disclosure.

DETAILED DESCRIPTION

Figure 1:
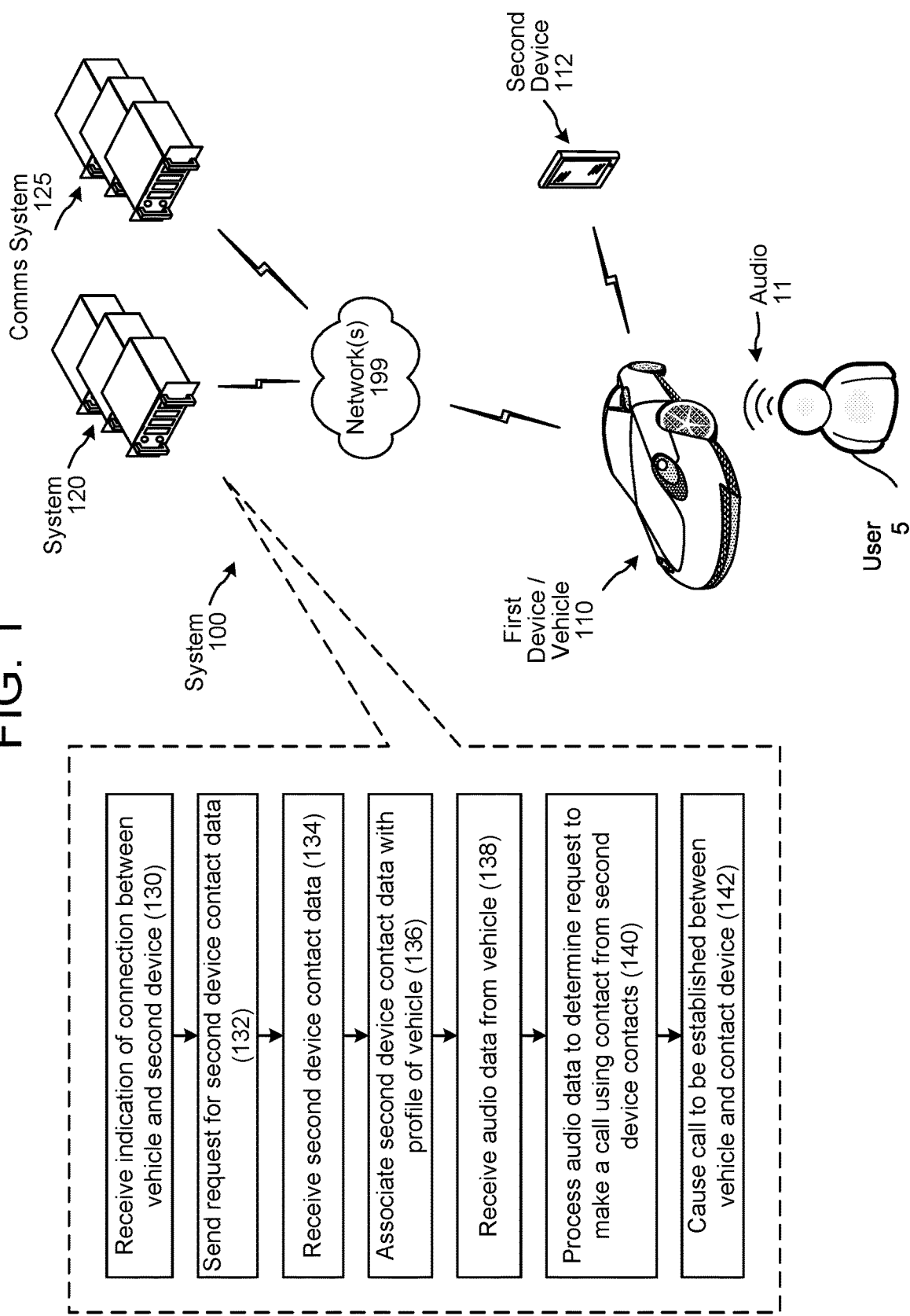
FIG. 1 is a conceptual diagram of a system configured to reconcile entries of a contact list according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may perform actions in response to user inputs, which may originate as user speech. For example, a system may output weather information in response to a user input corresponding to "Alexa, what is the weather today." For further example, a system may play the song Africa by Toto in response to a user input corresponding to "Alexa, play Toto music." In another example, a system may book a ride with a ride sharing service in response to a user input corresponding to "Alexa, book me a ride to the airport."

Certain systems may include communications functionality that enable users to send messages to other users as well as perform calls with other users. For example, if a user speaks "Alexa, tell John I am on my way" to a system device, the system may send a message to "John" with the message's content corresponding to audio of "I am on my way" and/or a text transcription thereof (i.e., a one-way communication session). For further example, if a user says "Alexa, call John" to a system device, the system may establish a two-way communication session between the system device and a device associated with "John."

In order to send messages to other users or call other users, a user of the system may create a profile with the system and import one or more contact lists to the profile. For example, when a user signs up for communications functionality of the system, the user may provide the system with permission to import their contacts from their personal device (e.g., a smart phone). The user may also validate their email address, social media handle, or some other communications identifier with the system. Certain devices may also be associated with profiles where the system is configured to use a device profile to establish communications with other devices. User profiles may be linked to device profiles, particularly when a user owns a particular device. The use of such profiles may ease communication activities using a voice controlled system allowing a user to use certain shorthand notation when making calls. For example, if the user says "call John" the system may identify a contact named "John" in the associated user profile and use the information in that contact to establish the call.

In certain situations, however, it may be desirable to allow more dynamic ingestion and association of contacts with a particular profile without a user having to manually associate contacts between devices. The present disclosure discusses such a system.

In particular, when a first device establishes a connection with a second device, for example when a user performs a Bluetooth pairing (e.g., wireless connection made using Bluetooth protocol) between a vehicle (e.g., the first device) and a smartphone (e.g., the second device), the system may obtain contact data associated with the second device and associate that contact data with the first device, for example with a profile associated with the first device. This profile may be a device profile, such as a profile associated with a vehicle, or a user profile, such as a user profile already associated with the first device. Then, when a communication request comes in associated with the first device, the system may use the new contact data from the second device to establish the communication (or otherwise attempt to resolve the user utterance using the contact data of the second device) between the first device and a contact from the second device's contact data.

In some examples, the vehicle (e.g., first device) may be connected to multiple smartphones (e.g., second devices) simultaneously, such are when two users are riding in the vehicle. When the first device is connected to multiple second devices (e.g., first smartphone associated with a first user and second smartphone associated with a second user), the system may obtain first contact data associated with the first smartphone and second contact data associated with the second smartphone and may associate both the first contact data and the second contact data with the profile associated with the first device.

FIG. 1 illustrates a system configured for ingesting contact data using this dynamic approach. Although the figures and discussion of the present disclosure illustrate certain operational steps of the system in a particular order, the steps described may be performed in a different order (as well as certain steps removed or added) without departing from the intent of the disclosure. A first device (shown as a vehicle) 110 of a user 5, one or more systems 120, and one or more communications systems 125 may communicate across one or more networks 199.

The below description describes the steps of FIG. 1 being performed by the system 120. One skilled in the art will appreciate that the first device 110, communications system 125 may perform some or all of the steps described with respect to FIG. 1 without departing from the present disclosure.

As shown in FIG. 1, a first device/vehicle 110 may establish a connection, such as a Bluetooth or other wireless communication connection, with a second device 112. The vehicle 110 may then send an indication of the connection to the system 120. The system 120 may receive (130) the indication of the first device's connection to the second device. The system 120 may then send (132) a request to the vehicle 110 for the second device's contact data. The vehicle 110 may then request and receive the second device's contact data from the second device 112 and may then send that contact data to the system 120. The system may then receive (134) the second device's contact data and associate (136) that second device's contact data with a profile of the vehicle.

Although the illustration of FIG. 1 shows the second device's contact data being requested through the vehicle 110, the second device's contact data may be located elsewhere, for example with a second system. The system 120 may use other techniques to obtain the second device's contact information depending on system configuration and user preferences and permissions.

The profile of the vehicle may be a vehicle profile assigned to the first device, thus allowing the contact data of the second device 112 to be associated directly with the vehicles profile. This scenario may be beneficial, for example, in the context of a rental car where a user may desire to make calls to their second device's contacts (or perform other operations) using speech controls through the rental vehicle. The profile of the vehicle may also be a different user profile associated with the vehicle, for example the owner or operator of the vehicle. This scenario may be beneficial, for example, in the context of a passenger of the vehicle 110 wanting to pair his/her second device 112 for purposes of making calls (or other operations) using the vehicle 110. Alternatively this scenario may be beneficial when a user borrows the vehicle from a friend or relation.

The profile of the vehicle may be a profile 270a associated with the system 120 as described below and/or may be a profile 270b associated with a communications system 125 as described below.

At some later point the vehicle 110 may detect audio 11 spoken by a user 5. The vehicle may determine the audio 11 includes a wakeword and may then send audio data 211 corresponding to the audio to the system 120. The system 120 may receive (138) the audio data from the vehicle 110. The system 120 may process (140) the audio data, for example using speech processing such as ASR, NLU, or the like, to determine a request to make a call. The audio data may be associated with an indication that it is associated with the profile of the vehicle. Thus the system may use profile information to perform the speech processing. As the second device's contact data is associated with the profile of the vehicle, the system may thus use the second device's contact data that is now associated with the profile of the vehicle, to interpret the audio data. For example, the system may determine that the call request is intended for a contact in the second device's contact data.

The system 120 may then cause (142) a call to be established between the vehicle 110 and a device of the contact, for example using communications system 125. For example, the system 120 may send to the communications system 125 contact data for the call recipient (such as a phone number, Alexa ID, or the like) and an identifier of the calling vehicle 110, and/or other data. The communications system may then use that data to establish the call between the contact and the vehicle 110.

This technique may also be used to exchange messages or engage in other communications besides synchronous calls.

The association between the profile of the vehicle and the contact data of the second device may be temporary. For example, at some later point the vehicle 110 and second device 112 may terminate their connection. The vehicle 110 may then notify the system 120 of the termination and the system 120 may disassociate the profile of the vehicle from the second device's contact data. This may allow the contact data of the second device 112 to only be used when the second device 112 is connected to the first device/vehicle 110.

Although a vehicle 110 is illustrated herein as the first device, many other first devices may be used such as an appliance, speech-controlled device, television, computer, wall outlet, or other device depending on system configuration.

Further, while the examples below focus on associating the second device's contact data with the profile of the vehicle, other second device data may also be associated with the profile of the vehicle. For example calendar data, application permission data (thus allowing applications approved for use with the second device to also be approved for use with the first device during the connection between the first device and second device), or other data of the second device may be associated with the first device.

Further, while the discussion herein illustrates the data of the second device (e.g., contact data, calendar data, and/or other data) actually being sent to the system 120, for privacy protection purposes, the system 120 may not necessarily receive the second device's data. Instead, the second device's data may reside elsewhere (e.g., on the second device, with a second system, etc.) and the system 120 may only receive an indication of that data for purposes of associating with the profile of the vehicle during the connection between the vehicle 110 and the second device 112. For example, the indication may indicating that the data to be associated may include contact data. Then if the system 120 receives a command (e.g., voice command) from the vehicle 110 during the time of the connection that may rely on contact data (for example a request to make a call or otherwise establish a connection), the system 120 may use the indication of the association of the second device data to send an request to the keeper of the second device's data as to whether any of the second device's data maybe relevant to the particular command.

For example, if the system 120 has associated the profile of the vehicle to contact data of the second device, but does not have direct access to the contact data of second device's and receives a request it cannot properly process using only the profile of the vehicle (e.g., an utterance originating in the vehicle says "call John" but there are no contacts with the name "John" associated with the vehicle), the system may send a request to the keeper of the second device's data to ask if there is a contact with the name "John" and if so, what the contact's information is. The keeper of the second device's data may then return John's contact information, which then may be used by the system 120/communications system 125 to establish a call between John and the vehicle 110 without necessarily giving the system 120 access to all of the second device's contact data.

Figure 2:
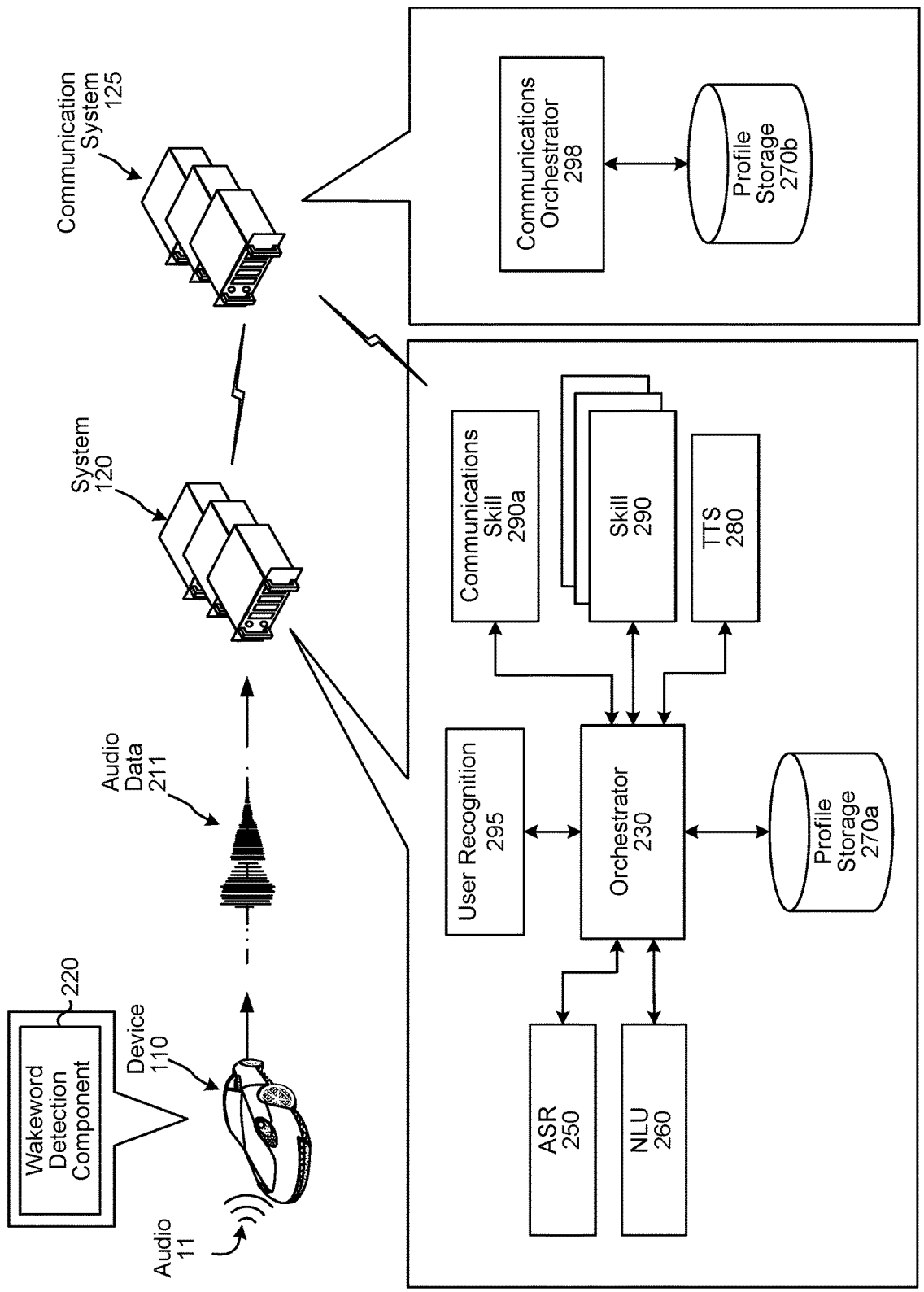
FIG. 2 is a conceptual diagram of components of a system according to embodiments of the present disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the system 120. The audio data 211 may include data corresponding to the wakeword, or the portion of the audio data 211 corresponding to the wakeword may be removed by the device 110 prior to sending the audio data 211 to the system 120.

Upon receipt by the system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the system 120, the communications system 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the system 120 that is akin to a software application running on a traditional computing device. That is, a skill component 290 may enable the system 120 to execute specific functionality in order to perform one or more actions (e.g., provide information to a user, display content to a user, output music, or perform some other requested action). The system 120 may be configured with more than one skill component 290. For example, a weather skill component may enable the system 120 to provide weather information, a ride sharing skill component may enable the system 120 to schedule a trip with respect to a ride sharing service, a restaurant skill component may enable the system 120 to order food with respect to a restaurant's online ordering system, a communications skill component may enable the system to perform messaging or multi-endpoint communications, etc. A skill component 290 may operate in conjunction between the system 120 and other devices such as the device 110 or a communications system 125 in order to complete certain functions. Inputs to a skill component 290 may come from various interactions and input sources. The first communications system 125 may include a communication orchestrator component 298 for orchestrating communication with the system 120 and/or device(s) 110.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the system 120 (as illustrated in FIG. 2) or may be located at whole (or in part) with one or more separate systems. Unless expressly stated otherwise, reference to a skill, skill device, or skill component may include a skill component operating within the system 120 (for example as skill component 290) and/or skill component operating within a system separate from the system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system 120 may include profile storage 270a and/or the first communications system 125 may include profile storage 270b. The profile storage 270a/270b may include a variety of information related to individual users, groups of users, etc. that interact with the system. The profile storage 270a/270b may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270a/270b may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located. Permissions may be obtained from a user associated with the vehicle/first device 110, second device 112, or other devices discussed herein.

The system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

Figure 3:
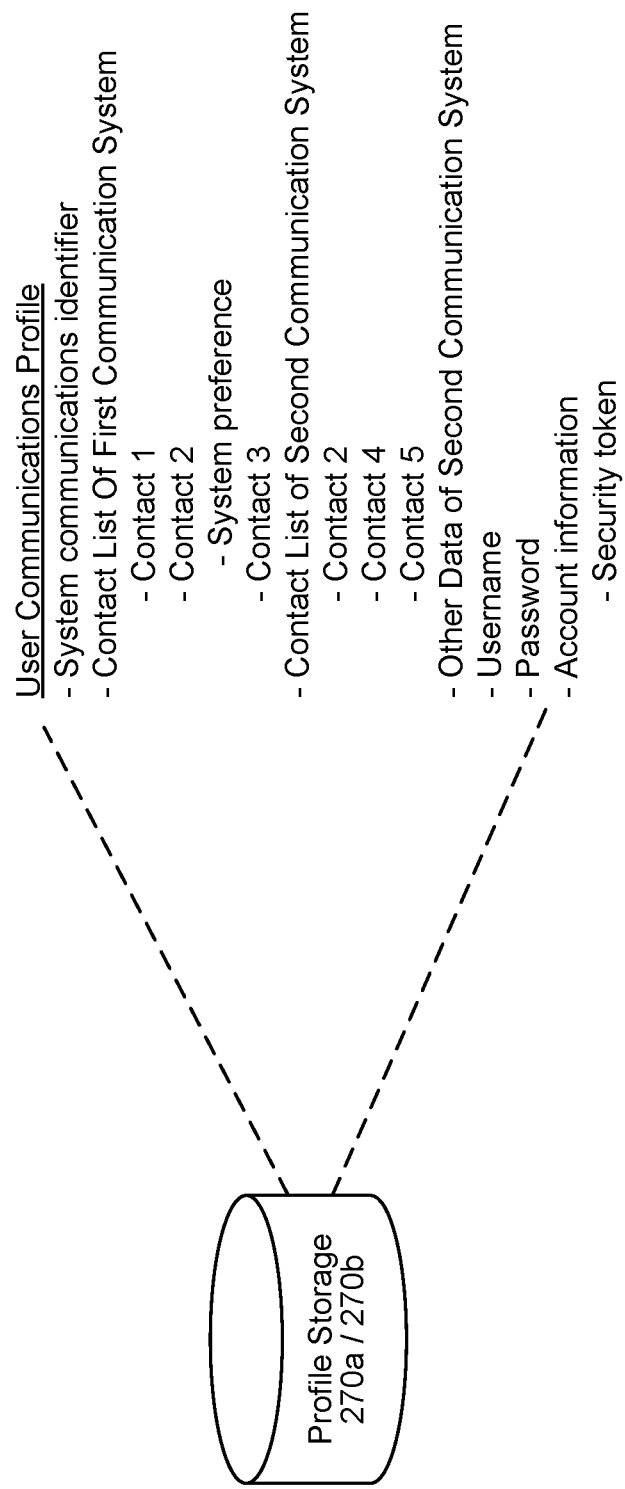
FIG. 3 is a conceptual diagram of a user's communications profile according to embodiments of the present disclosure.

FIG. 3 illustrates an example communication profile of a user stored in a communication profile storage 270a/270b. The communication profile storage 270a/270b may, as described above, be implemented as part of the communications system 125 or the system 120.

When a user enables or signs up for communication functionality of the system, the system may generate a communication profile identifier specific to the user. The user may validate their phone number, address, or other information with the system. For example, the user may input their phone number to the system, and the system may then validate the phone number with a cellular service provider. Once validated, the system may store the phone number in the user's communication profile (e.g., the system may associate the user's phone number with the user's communication profile identifier).

The system may output a prompt to the user. The prompt may be displayed on a screen of the device 110 as text and/or output as audio by the device 110. The prompt may ask whether the user wants to import their contact list (e.g., a contact list stored on the device 110) to the system. If the user responds affirmatively, the system may import the contact list to the user's communication's profile in the communication profile storage 270*a*/270*b* (e.g., the system may associate the user's contact list with the user's communication profile identifier). Alternatively, the system may import the contact list to a different storage (implemented as part of the communications system 125 or the system 120), and associate the stored contact list with the user's communication profile identifier via a contact list identifier.

The system may also prompt the user as to whether the user wishes to only import their contacts when their device is associated with another device of the system. This may allow the user's contact data to become associated with the system during a communication with another system device (e.g., a Bluetooth pairing between a smartphone and a vehicle) and allow the contact data to become disassociated when the connection is dropped. Further, when the communication resumes (or when communication begins with a different first device/vehicle that the user may not have been in before but may be part of the system for which permissions have been given), the system may associate the user's contact data with the first device/vehicle without the user having to go through a manual contact ingestion each time.

The user may also validate various communication identifiers with the system. The various communication identifiers may correspond to different modalities of communication. Moreover, the communication identifiers may be associated with different communications systems. The system may validate and store the communication identifiers in the user's communication profile (e.g., may associate each of the user's validated communication identifiers with the user's communication profile identifier). For example, the user may send messages and/or perform calls via the internet using an internet-based communications system. For further example, the user may send messages via a messaging application downloaded on the device 110. The user may provide the system with their communication identifier of a communications system (different from the communications system described herein), the system of the present disclosure may validate the user's communication identifier with the communications system, and may thereafter store the user's communication identifier in the user's communication profile (e.g., associate the validated communication identifier with the user's communication profile identifier), along with a representation of the communications system associated with the communication identifier.

As illustrated in FIG. 3, a user's communication profile identifier may be associated with various communication identifiers of the user. When the user provides the system with a communication identifier to validate, the user may also provide the system with permission to import a first contact list associated with the user's communication identifier. The user may perform communication using various communication sources. Each communication source may store a respective contact list for the user. The user's communication profile identifier may be associated with the contact lists of each communication source the user permitted to be imported. As illustrated in FIG. 3, each contact list may be associated with the communication source from which it was imported. Alternatively, the system may be configured to conglomerate all of the user's imported contact lists into a single contact list associated with the user's communication profile identifier.

The user profile may further include information regarding the second communications system, including a second contact list associated with the second communications system. The first contact list and the second contact list may include common contacts, such as "Contact 2," as illustrated in FIG. 3. The first contact list may also include contacts not present in the second contact list, such as "Contact 1" and "Contact 2," as illustrated in FIG. 3. The second contact list may include contacts not present in the first contact list, such as "Contact 4" and "Contact 5," as illustrated in FIG. 3. As explained further herein, if the first user wishes to communicate with a contact present in only one contact list, such as "Contact 1" or "Contact 4," the system 120 may attempt to establish communication using only the corresponding communications system. If, however, the first user wishes to communicate with a contact present in both the first contact list and the second contact list, the system 120 may select one or both communications systems to attempt to establish communication.

Figure 4:
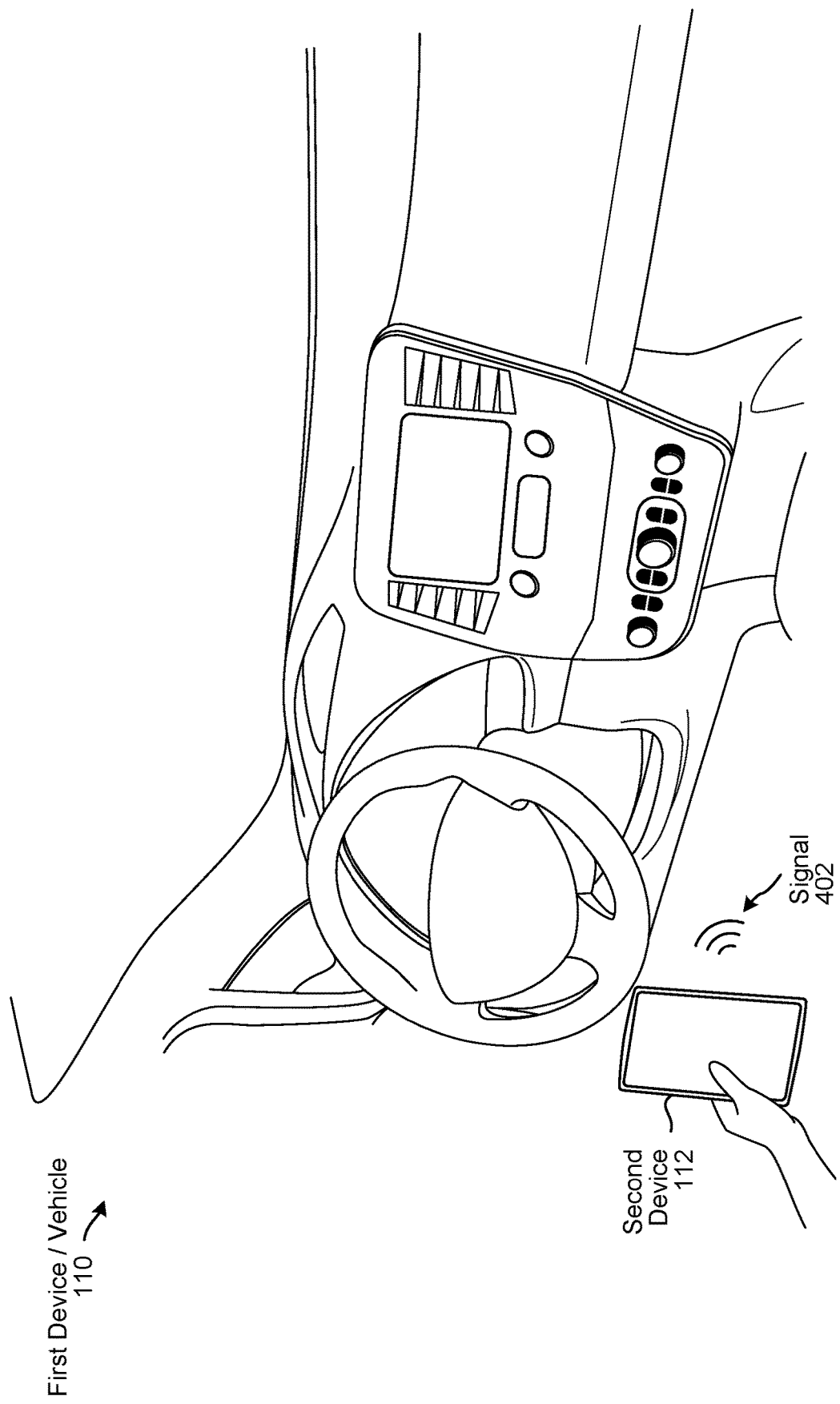
FIG. 4 illustrates a second device associating with a first device according to embodiments of the present disclosure.

As shown in FIG. 4, a second device 112 may come in proximity to a first device 110, such as a vehicle. The second device 112 may send a signal 402 to the vehicle 110 as part of establishing a communication between the vehicle 110 and the second device 112. Once the communication is established between the vehicle 110 and the second device 112 (e.g., the second device 112 is paired with the vehicle 110 or the like), the system 120 may associate the contact data of the second device 112 with a profile of the vehicle 110 for communication purposes. When the communication is terminated, the system 120 may disassociate the contact data of the second device 112 with the profile of the vehicle.

This process is illustrated below in FIGS. 5A-5C. As shown in FIG. 5A, a first device/vehicle 110 may establish (502) a connection with a second device 112. The connection may be a Bluetooth or other wireless communication connection, a universal serial bus (USB) or other wired connection, and/or the like. The vehicle 110 may then send (504) a signal identifying the connection with the second device 112 to the system 120. This may correspond to step 130 described above, in which the system 120 may receive an indication of the connection between the first device 110 and the second device 112. The system 120 may then send (506) a request to the vehicle 110 for contact data from the second device 112 (e.g., second device contact data). However, the disclosure is not limited thereto and steps 504 and 506 may be omitted without departing from the disclosure.

The vehicle 110 may then send (508) a request for the second device contact data to the second device 112. The second device 112 may send (510) the contact data to the first device 110. The first device 110 may then send (512) that the second device contact data to the system 120. The system may then receive the second device contact data, as described with regard to step 134 above, and may then send (514) the second device contact data to the communications system 125. The system 120 and/or the communications system 125 may then associate (516) the second device contact data with a profile of the vehicle.

As illustrated in FIG. 5B, at some later point the vehicle 110 may detect (520) audio of an utterance spoken by a user. The vehicle 110 may determine that the audio 11 includes a wakeword and may then send (522) audio data 211 corresponding to the audio to the system 120. As described above with regard to FIG. 1, the system 120 may receive the audio data from the vehicle 110 in step 138. The system 120 and/or the communications system 125 may perform (524) speech processing to determine that the audio data corresponds to a request to call a contact in the second device contact data. In some examples the system 120 may process the audio data as described above in step 140, for example using speech processing such as ASR, NLU, or the like, to determine a request to make a call to a contact in the second device contact data. Additionally or alternatively, the communications system 125 may process the audio data as described above in step 140, for example using speech processing such as ASR, NLU, or the like, to determine the request to make the call to the contact in the second device contact data.

The system 120 (and the communications system 125) may then cause a call to be established between the vehicle 110 and a third device associated with the contact, for example using communications system 125. For example, the system 120 may send (526) a communication request associated with the contact to the communications system 125. The communication request may include contact data for the call recipient (such as a phone number, Alexa ID, and/or the like) an identifier of the calling vehicle 110, and/or other data. The communications system 125 may then use the information included in the communication request to establish (528) the call between the vehicle 110 and the third device associated with the contact.

While FIG. 5B illustrates the system 120 sending the communication request to the communications system 125 and the communications system 125 establishing the call between the vehicle 110 and the third device associated with the contact, the disclosure is not limited thereto. Additionally or alternatively, the system 120 may send the communication request to the vehicle 110 and the vehicle 110 may establish the call between the vehicle 110 and the third device by sending a communication request to the third device and/or the communications system 125 without departing from the disclosure.

FIG. 5C is a process flow diagram illustrating disassociating contact data after termination of a connection according to embodiments of the present disclosure. The association between the profile of the vehicle (e.g., vehicle profile data) and the contact data of the second device (e.g., second device contact data) may be temporary. For example, as shown in FIG. 5C, at some later point the vehicle 110 and second device 112 may terminate (542) their connection. While FIG. 5C illustrates that the vehicle 110 terminates the connection with the second device 112, the disclosure is not limited thereto. After the connection is terminated, the vehicle 110 may then send (544) a signal indicating termination of the connection in order to notify the system 120 of the termination. The system 120 may then send (544) a signal (the same signal or another indication of disassociation) to the communications system 125. In response to receiving the signal indicating termination of the connection, the system 120 and/or the communications system 125 may disassociate (546) the second device contact data with the vehicle profile.

FIG. 6 illustrates exchange of data between various components of the vehicle 110, the system 120, and/or the communications system 125. For example, the system 120 and/or the communications system 125 may include an authorization service component 602, a communications service component 604, a profile management service component 606 (e.g., service that manages profile storage 270b), an address book management service component 608, a database 610, a first component 612, a second component 614, and/or a contact disambiguation component 616.

As illustrated in FIG. 6, the vehicle 110 may initiate one of three commands, a calling command, a modify contact command, or an authorization command. The vehicle 110 may send the calling command to the system 120, for example in the form of audio data representing a voice command. The system 120 may interpret the calling command, identify a calling action corresponding to the calling command, and send the calling action to a calling skill component 290a. The calling skill component 290a may disambiguate based on source device and the contact disambiguation component 616 may send a disambiguated contact to the calling skill 290a. While not illustrated in FIG. 6, the calling skill 290a may use the disambiguated contact to initiate a communication session, as will be described in greater detail below. Thus, the system 100 may use contact data associated with the second device 112 to perform contact disambiguation when the system 120 receives a calling command from the first device 110.

The vehicle 110 may also send a modify contact command to the communications service component 604 and/or the address book management service component 608, which may result in the system 100 updating and/or modifying the contact stored by the system 100. For example, the address book management service component 608 may publish contacts to the database 610 and/or the first component 612, and the first component 612 may publish the contacts to the second component 614. The first component 612 may be one or more components associated with personalization or different functionality enabled by the system 100, although the disclosure is not limited thereto. The second component 614 may be configured to process the contact information to select a subset of features to use in contact disambiguation, although the disclosure is not limited thereto.

The vehicle 110 may send an authorization command to the communications service component 604. In response to the modify contact command and/or the authorization command, the communications service component 604 may interact with the authorization service component 602 and/or the profile management service component 606. For example, the communications service component 604 may send an authorization token to the authorization service component 602 in order to authorize a user, and the authorization service component 602 may send a customer identification (ID) to the communications service component 604. Additionally or alternatively, the communications service component 604 may send the customer ID to the profile management service component 606 in order to provision a customer ID and the profile management service component 606 may send a communications identification (ID) to the communications service component 604.

Figure 7:
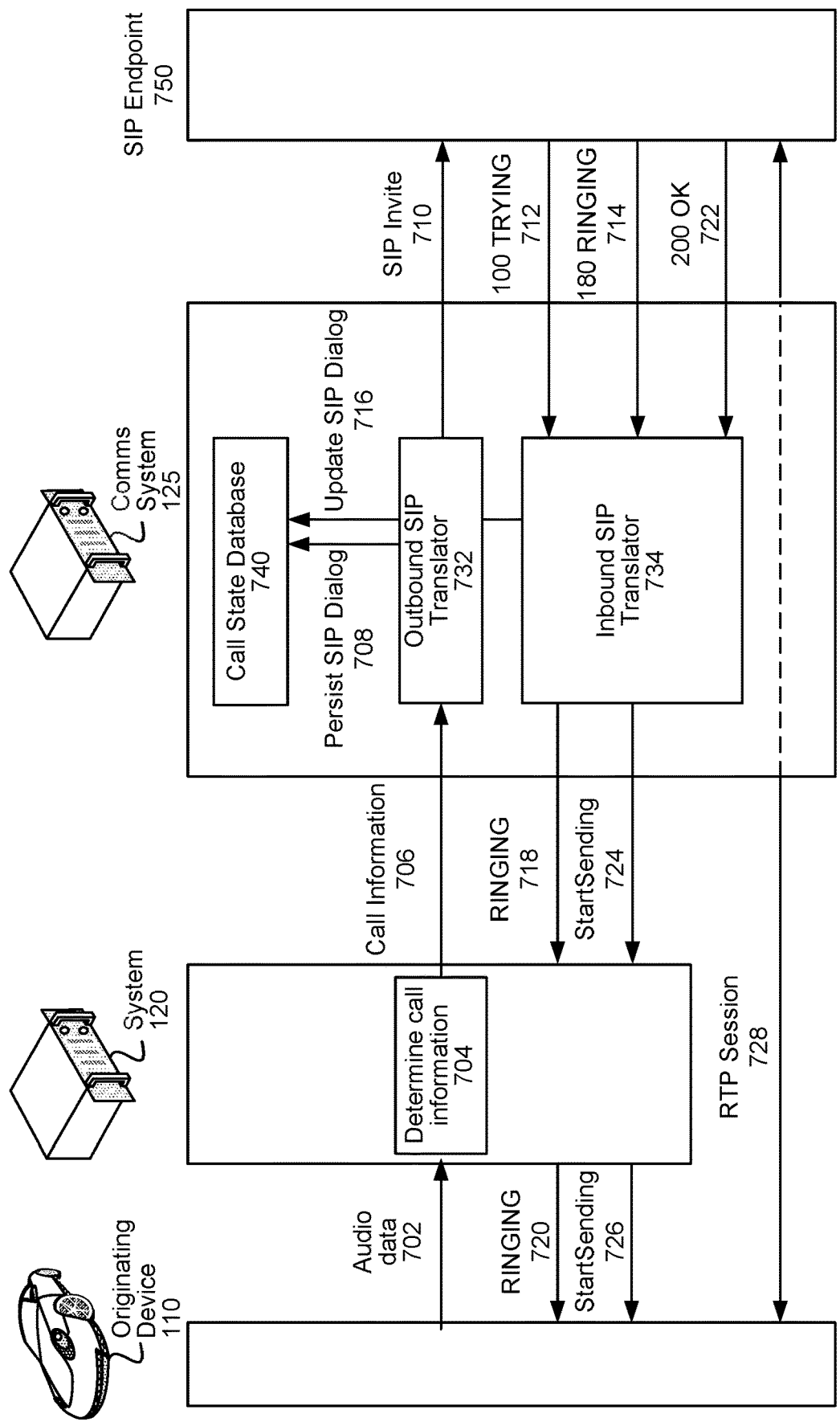
FIG. 7 illustrates an example of signaling to initiate a communication session according to embodiments of the present disclosure.

FIGS. 7, 8A, 8B, 9A, and 9B illustrate components that can be used to coordinate communications using a system such as that described herein. FIG. 7 illustrates an example of signaling to initiate a communication session according to the present disclosure. In one example, the system 120 is configured to enable voice commands (e.g., perform ASR, NLU, etc. to identify a spoken command included in audio data), whereas the communications system 125 is configured to enable communication sessions (e.g., using session initiation protocol (SIP)). For example, the communications system 125 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications system 125 may send SIP messages to initiate a single RTP media stream between two endpoints (e.g., direct RTP media stream between the originating device 110 and a recipient device) and/or to initiate and facilitate RTP media connections between the two endpoints (e.g., RTP media streams between the originating device 110 and the communications system 125 and between the communications system 125 and a recipient device). During a communication session, the communications system 125 may initiate two media streams, with a first media stream corresponding to audio data sent from the originating device 110 and to the recipient device and a second media stream corresponding to audio data sent from the recipient device and to the originating device 110, although for ease of explanation this may be illustrated as a single RTP media stream.

As illustrated in FIG. 7, the originating device 110 may send (702) audio data to the system 120 and the system 120 may determine (704) call information using the audio data and may send (706) the call information to the communications system 125 (e.g., via the communications skill 290a). The system 120 may determine the call information by performing ASR, NLU, etc., as discussed herein, and the call information may include a data source name (DSN), a number from which to call, a number to which to call, encodings, and/or additional information. For example, the system 120 may identify from which phone number the originating user would like to initiate the call, to which phone number the originating user would like to initiate the call, from which device 110 the originating user would like to perform the call, etc.

While FIG. 7 illustrates the system 120 sending the call information to the communications system 125 in a single step (e.g., 706), the present disclosure is not limited thereto. Instead, the system 120 may send the call information to the originating device 110 and the originating device 110 may send the call information to the communications system 125 in order to initiate the call without departing from the present disclosure. Thus, the system 120 may not communicate directly with the communications system 125 in step 706, or may instead instruct the originating device 110 to communicate with the communications system 125 in order to initiate the call.

The communications system 125 may include an outbound SIP translator 732, an inbound SIP translator 734, and a call state database 740. The outbound SIP translator 732 may include logic to convert commands received from the system 120 into SIP requests/responses and may handle sending outgoing SIP requests and sending responses to incoming SIP requests. After receiving the call information, the outbound SIP translator 732 may persist (708) a SIP dialog using the call state database 740. For example, the DSN may include information such as the name, location, and driver associated with the call state database 740 (and, in some examples, a user identifier and password of the originating user) and the outbound SIP translator 732 may send a SIP dialog to the call state database 740 regarding the communication session. The call state database 740 may persist the call state if provided a device identifier and one of a call identifier or a dialog identifier. The outbound SIP translator 732 may send (710) a SIP Invite to a SIP Endpoint 750 (e.g., a recipient device, a Session Border Controller (SBC), or the like). While one SIP Endpoint 750 is illustrated, one skilled in the art will appreciate that SIP invites may be sent to more than one SIP Endpoint 750.

The outbound SIP translator 732 may send the SIP Invite to a separate communications system, such as a cellular service provider. The cellular service provider may send the SIP invite to the SIP Endpoint 750. It will thus be appreciated that a cellular service provider (or other communications modality provider) may act as an intermediary between the communications system 125 and an SIP Endpoint 750. Various APIs or other components may be used to exchange messages across different communications systems.

The inbound SIP translator 734 may include logic to convert SIP requests/responses into commands to send to the system 120 and may handle receiving incoming SIP requests and incoming SIP responses. The SIP endpoint 750 may send (712) a 100 TRYING message to the inbound SIP translator 734 and may send (714) a 180 RINGING message to the inbound SIP translator 734. The inbound SIP translator 734 may update (716) the SIP dialog using the call state database 740 and may send (718) a RINGING message to the system 120, which may send (720) the RINGING message to the originating device 110. Alternatively, the inbound SIP translator 734 may send the RINGING message to the originating device 110 without using the system 120 as an intermediary.

When the communication session is accepted by the SIP endpoint 750, the SIP endpoint 750 may send (722) a 200 OK message to the inbound SIP translator 734, the inbound SIP translator 745 may send (724) a startSending message to the system 120, and the system 120 may send (726) the startSending message to the originating device 110. Alternatively, the inbound SIP translator 734 may send the startSending message to the originating device 110 without using the system 120 as an intermediary. The startSending message may include information associated with an internet protocol (IP) address, a port, encoding, or the like required to initiate the communication session. Using the startSending message, the originating device 110 may establish (728) an RTP communication session with the SIP endpoint 750 via the communications system 125. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 8B:
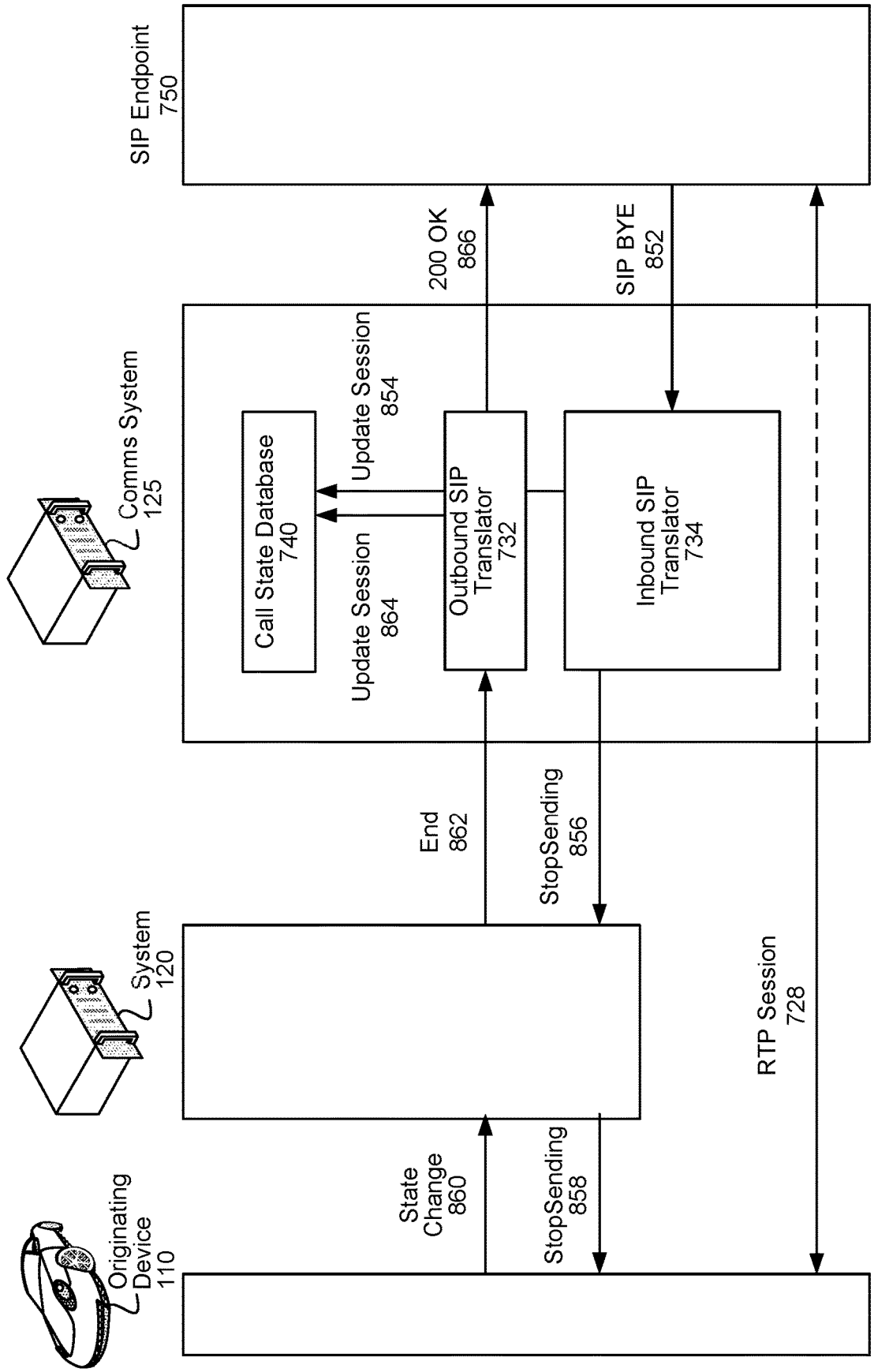

FIGS. 8A and 8B illustrate examples of signaling to end a communication session according to the present disclosure. After establishing the RTP communication session 728 between the originating device 110 and the SIP endpoint 750, the RTP communication session may be ended by the originating user inputting a command, to end the call, to the originating device 110, as illustrated in FIG. 8A, or a recipient user inputting a command, to end the call, to the SIP endpoint 750, as illustrated in FIG. 8B.

As illustrated in FIG. 8A, the originating device 110 may send (802) a state change message to the system 120 and the system 120 may send (804) an end message to the communications system 125. The outbound SIP translator 732 may update (806) the session using the call state database 740 and may send (808) a SIP BYE message to the SIP endpoint 750. The SIP endpoint 750 may send (810) a 200 OK message to the inbound SIP translator 734 and the inbound SIP translator 734 may update (812) the session using the call state database 740. In some examples, the inbound SIP translator 734 may send the 200 OK message to the originating device 110 to confirm the communication session has been ended. Thus, the RTP communication session 728 may be ended between the originating device 110 and the SIP endpoint 750.

As illustrated in FIG. 8B, the SIP endpoint 750 may send (852) a SIP BYE message to the inbound SIP translator 734 and the inbound SIP translator 734 may update (854) the session using the call state database 740. The inbound SIP translator 734 may send (856) a stopSending message to the system 120 and the system 120 may send (858) the stopSending message to the originating device 110. The originating device 110 may send (860) a state change message to the system 120 and the system 120 may send (862) an End message to the outbound SIP translator 732, the End message including a DSN. The outbound SIP translator 732 may then update (864) the session using the call state database 740, and send (866) a 200 OK message to the SIP endpoint 750. Thus, the RTP communication session 728 may be ended between the originating device 110 and the SIP endpoint 750.

While FIGS. 8A and 8B illustrate the system 120 acting as an intermediary between the originating device 110 and the communications system 125, the present disclosure is not limited thereto. Instead, steps 802 and 804 may be combined into a single step and the originating device 110 may send the state change message and/or the End message to the communications system 125 without using the system 120 as an intermediary. Similarly, steps 766 and 758 may be combined into a single step and the communications system 125 may send the StopSending message to the originating device 110 without using the system 120 as an intermediary, and/or steps 860 and 862 may be combined into a single step and the originating device 110 may send the state change message and/or the End message to the communications system 125 without using the system 120 as an intermediary.

While FIGS. 7, 8A, and 8B illustrate the RTP communication session 728 being established between the originating device 110 and the SIP endpoint 750, the present disclosure is not limited thereto and the RTP communication session 728 may be established between the originating device 110 and a telephone network associated with the SIP endpoint 750 without departing from the present disclosure.

Figure 9A:
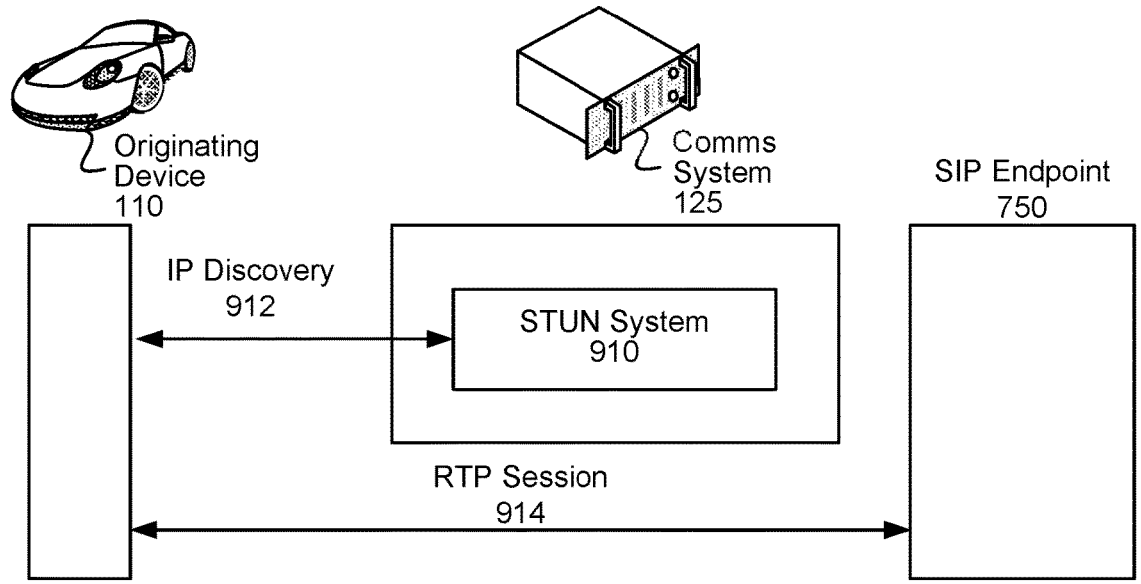
FIGS. 9A and 9B illustrate examples of establishing media connections between devices according to embodiments of the present disclosure.
Figure 9B:
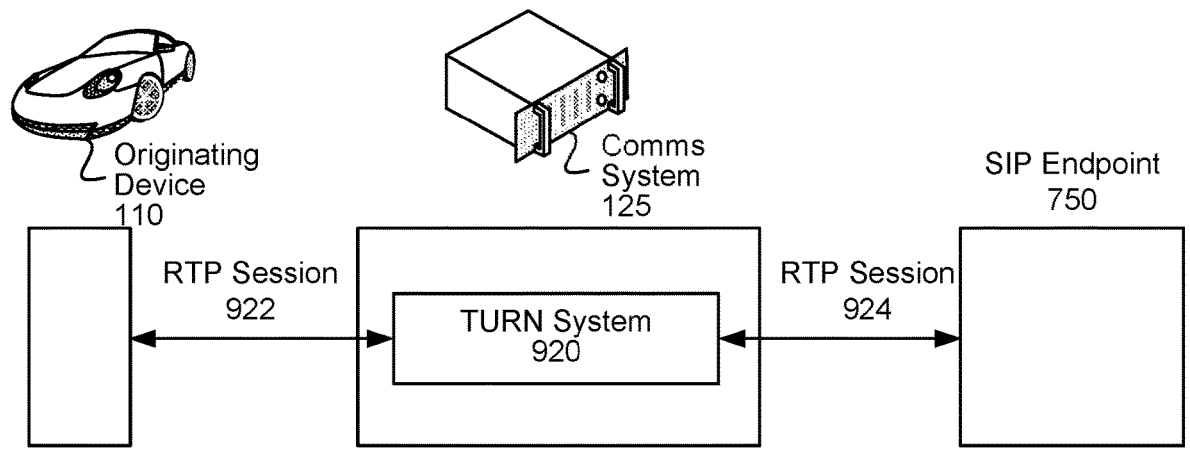

FIGS. 9A and 9B illustrate examples of establishing media connections between devices according to the present disclosure. In some examples, the originating device 110 may have a publicly accessible IP address and may be configured to establish the RTP communication session directly with the SIP endpoint 750. To enable the originating device 110 to establish the RTP communication session, the communications system 125 may include Session Traversal of User Datagram Protocol (UDP) Through Network Address Translators (NATs) system (e.g., STUN system 910). The STUN system 910 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 9A, the originating device 110 may perform (912) IP discovery using the STUN system 910 and may use this information to set up an RTP communication session 914 (e.g., UDP communication) between the originating device 110 and the SIP endpoint 750 to establish a call.

In some examples, the originating device 110 may not have a publicly accessible IP address. For example, in some types of NAT the originating device 110 cannot route outside of the local network. To enable the originating device 110 to establish an RTP communication session, the communications system 125 may include Traversal Using relays around NAT (TURN) system 920. The TURN system 920 may be configured to connect the originating device 110 to the SIP endpoint 750 when the originating device 110 is behind a NAT. As illustrated in FIG. 9B, the originating device 110 may establish (922) an RTP session with the TURN system 920 and the TURN system 920 may establish (924) an RTP session with the SIP endpoint 750. Thus, the originating device 110 may communicate with the SIP endpoint 750 via the TURN system 920. For example, the originating device 110 may send audio data to the communications system 125 and the communications system 125 may send the audio data to the SIP endpoint 750. Similarly, the SIP endpoint 750 may send audio data to the communications system 125 and the communications system 125 may send the audio data to the originating device 110.

In some examples, the system may establish communication sessions using a combination of the STUN system 910 and the TURN system 920. For example, a communication session may be more easily established/configured using the TURN system 920, but may benefit from latency improvements using the STUN system 910. Thus, the system may use the STUN system 910 when the communication session may be routed directly between two devices and may use the TURN system 920 for all other communication sessions. Additionally or alternatively, the system may use the STUN system 910 and/or the TURN system 920 selectively based on the communication session being established. For example, the system may use the STUN system 910 when establishing a communication session between two devices (e.g., point-to-point) within a single network (e.g., corporate LAN and/or WLAN), but may use the TURN system 920 when establishing a communication session between two devices on separate networks and/or three or more devices regardless of network(s). When the communication session goes from only two devices to three or more devices, the system may need to transition from the STUN system 910 to the TURN system 920. Thus, if the system anticipates three or more devices being included in the communication session, the communication session may be performed using the TURN system 920. When the communication session goes from three or more devices to only two devices, the system may need to transition from the TURN system 920 to the STUN system 910.

While FIGS. 7-9B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the system 120 and/or the communications system 125 may enable communication sessions using a cellular connection (e.g., mobile phone network) without departing from the disclosure. Thus, the system 120 may be configured to enable voice commands (e.g., perform ASR, NLU, etc. to identify a spoken command included in audio data), whereas the communications system 125 may be configured to enable communication sessions using the cellular connection. For example, the communications system 125 may send instructions (e.g., command data) to endpoints (e.g., caller devices, such as the vehicle 110 and/or the device 112) instructing the endpoint to establish a communication session (e.g., dial a telephone number) in response to the voice command.

Figure 10B:
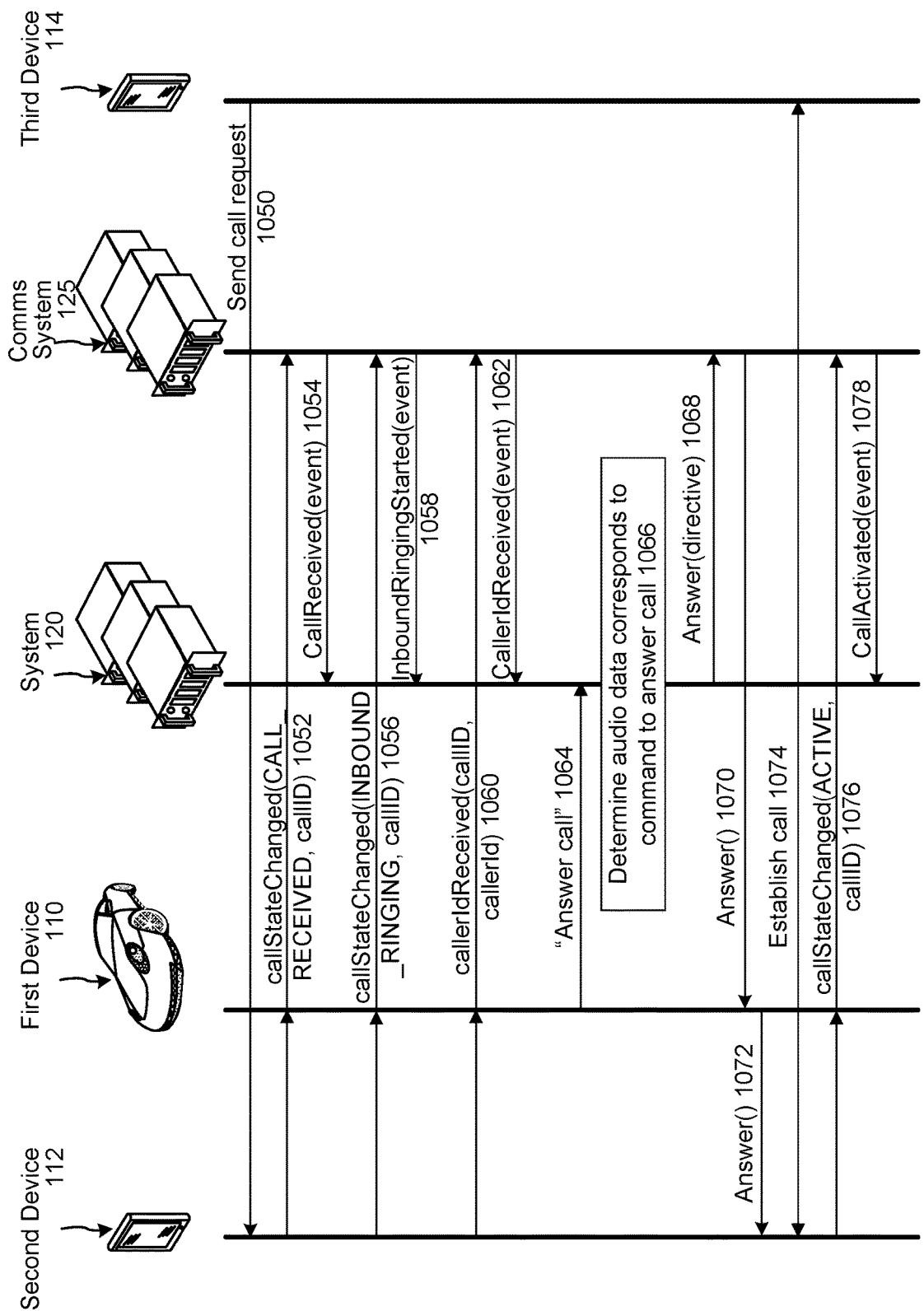

FIGS. 10A-10C illustrate examples of establishing and terminating a communication session according to embodiments of the present disclosure. Specifically, FIG. 10A illustrates an example of initiating a communication session (e.g., outbound call), FIG. 10B illustrates an example of accepting an incoming request to establish a communication session (e.g., inbound call), and FIG. 10C illustrates an example of terminating an existing communication session.

As illustrated in FIG. 10A, the vehicle 110 may receive audio data representing a voice command (e.g., "call Bob") and may send (1010) the audio data (e.g., "call Bob") to the system 120. The system 120 may determine (1012) that the audio data corresponds to a command to initiate a telephone call and may send (1014) an instruction (e.g., command data, such as Dial (directive)) to the communications system 125.

The communications system 125 may determine (1016) call information of a contact in the second device's contact data and may send (1018) an instruction (e.g., command data, such as Dial (payload)) to the vehicle 110, which may send (1020) the instruction to the second device 112. For example, the system 120 may determine that the audio data corresponds to a command to initiate the telephone call with a contact named "Bob" and may send this information to the communications system 125. The communications system 125 may identify the specific contact corresponding to the name "Bob" from within the second device's contact data, may identify a preferred telephone number associated with the contact, and may generate the instruction instructing the second device 112 to initiate the communication session by dialing the telephone number. Upon receiving the instruction, the second device 112 may initiate the communication session by sending (1022) a call request to the third device 114. For example, the second device 112 may dial the number indicated by the instruction and the third device 114 may receive the incoming telephone call.

The second device 112 may send updates to the communications system 125 indicating a current state of the communication session. The second device 112 may send the updates to the communications system 125 directly or via the vehicle 110 without departing from the disclosure. For ease of illustration, FIGS. 10A-10C may illustrate multiple sending steps as a single line with multiple arrows. For example, the second device 112 may send a notification to the vehicle 110 and the vehicle 110 may send the notification to the communications system 125, although the disclosure is not limited thereto and the second device 112 may send the notification directly to the communications system 125 without departing from the disclosure. The updates sent from the second device 112 to the communications system 125 may be referred to as call state notifications, indicating a current state of the call. In addition, the communications system 125 may receive a call state notification and may send a corresponding event notification to the system 120 to update the system 120.

As illustrated in FIG. 10A, the second device 112 may send (1024) a first notification (e.g., callStateChanged (DIALING, callID)) to the vehicle 110 and the vehicle 110 may send the first notification to the communications system 125. The first notification may indicate that the call state has changed and may include the current state (e.g., DIALING), which indicates that the second device 112 is dialing the telephone number, along with a call identifier that identifies the current communication session. The communications system 125 may receive the first notification and may send (1026) a first event notification (e.g., DialStarted (event)) to the system 120.

The second device 112 may send (1028) a second notification (e.g., callStateChanged (OUTBOUND_RINGING, callID)) to the vehicle 110 and the vehicle 110 may send the second notification to the communications system 125. The second notification may indicate that the call state has changed and may include the current state (e.g., OUTBOUND RINGING), which indicates that the telephone call is currently ringing and has not yet been answered, along with the call identifier that identifies the current communication session. The communications system 125 may receive the second notification and may send (1030) a second event notification (e.g., OutboundRinging (event)) to the system 120.

The third device 114 may accept (1032) the call request and may establish (1034) the call (e.g., establish a communication session between the second device 112 and the third device 114). The second device 112 may send (1036) a third notification (e.g., callStateChanged (ACTIVE, callID)) to the vehicle 110 and the vehicle 110 may send the third notification to the communications system 125. The third notification may indicate that the call state has changed and may include the current state (e.g., ACTIVE), which indicates that the communication session is currently active, along with the call identifier that identifies the current communication session. The communications system 125 may receive the third notification and may send (1038) a third event notification (e.g., CallActivated (event)) to the system 120.

While FIG. 10A illustrates an example of initiating an outbound telephone call, FIG. 10B illustrates an example of receiving an inbound communication request. As illustrated in FIG. 10B, the third device 114 may initiate a communication session by sending (1050) a call request to the second device 112. The second device 112 may send (1052) a first notification (e.g., callStateChanged (CALL_RECEIVED, callID)) to the vehicle 110 and the vehicle 110 may send the first notification to the communications system 125. The first notification may indicate that the call state has changed and may include the current state (e.g., CALL RECEIVED), which indicates that the second device 112 received an incoming telephone call, along with a call identifier that identifies the current communication session. The communications system 125 may receive the first notification and may send (1054) a first event notification (e.g., CallReceived (event)) to the system 120.

The second device 112 may send (1056) a second notification (e.g., callStateChanged (INBOUND_RINGING, callID)) to the vehicle 110 and the vehicle 110 may send the second notification to the communications system 125. The second notification may indicate that the call state has changed and may include the current state (e.g., INBOUND RINGING), which indicates that the incoming telephone call is currently ringing and has not yet been answered, along with the call identifier that identifies the current communication session. The communications system 125 may receive the second notification and may send (1058) a second event notification (e.g., InboundRingingStarted (event)) to the system 120.

The second device 112 may send (1060) a third notification (e.g., callerIdReceived (callID, callerId)) to the vehicle 110 and the vehicle 110 may send the third notification to the communications system 125. The third notification may indicate caller identification (e.g., telephone number) associated with the incoming telephone call along with the call identifier that identifies the current communication session. For example, the caller identification may indicate a telephone number from which the incoming telephone call originated (e.g., telephone number associated with the third device 114). The communications system 125 may receive the third notification and may send (1062) a third event notification (e.g., CallerIdReceived (event)) to the system 120.

The vehicle 110 may receive audio data representing a voice command (e.g., "Answer call") and may send (1064) the audio data (e.g., "Answer call") to the system 120. The system 120 may determine (1066) that the audio data corresponds to a command to answer the telephone call and may send (1068) an instruction (e.g., command data, such as Answer (directive)) to the communications system 125.

The communications system 125 may send (1070) an instruction (e.g., command data, such as Answer( )) to the vehicle 110, which may send (1072) the instruction (e.g., Answer( )) to the second device 112. Upon receiving the instruction, the second device 112 may accept the communication session and establish (1074) the call (e.g., establish a communication session between the second device 112 and the third device 114). The second device 112 may send (1076) a fourth notification (e.g., callStateChanged (ACTIVE, callID)) to the vehicle 110 and the vehicle 110 may send the fourth notification to the communications system 125. The fourth notification may indicate that the call state has changed and may include the current state (e.g., ACTIVE), which indicates that the communication session is currently active, along with the call identifier that identifies the current communication session. The communications system 125 may receive the fourth notification and may send (1078) a fourth event notification (e.g., CallActivated (event)) to the system 120.

In some examples, the communication session may be terminated in response to the system 120 receiving a voice command instructing the system 120 to end the communications system. However, the disclosure is not limited thereto and system 100 may be terminated using multiple techniques without departing from the disclosure, as will be described in greater detail below with regard to FIGS. 15A-15D.

As illustrated in FIG. 10C, the vehicle 110 may receive audio data representing a voice command (e.g., "End call") and may send (1080) the audio data (e.g., "End call") to the system 120. The system 120 may determine (1082) that the audio data corresponds to a command to end the telephone call and may send (1084) an instruction (e.g., command data, such as Stop (directive)) to the communications system 125.

The communications system 125 may send (1086) an instruction (e.g., Stop( )) to the vehicle 110, which may send (1088) the instruction (e.g., Stop( )) to the second device 112. Upon receiving the instruction, the second device 112 may terminate (1090) the call (e.g., end the communication session between the second device 112 and the third device 114). The second device 112 may send (1092) a notification (e.g., callStateChanged (IDLE, callID)) to the vehicle 110 and the vehicle 110 may send the notification to the communications system 125. The notification may indicate that the call state has changed and may include the current state (e.g., IDLE), which indicates that the communication session was terminated, along with the call identifier that identifies the current communication session. The communications system 125 may receive the notification and may send (1094) an event notification (e.g., CallTerminated (event)) to the system 120.

While FIGS. 10A-10C illustrate examples of establishing and terminating a communication session, specifically using a cellular connection (e.g., mobile phone network) to directly communicate with other devices using a telephone number, the disclosure is not limited thereto. Instead, the system 100 may establish and terminate a communication session using any techniques known to one of skill in the art without departing from the disclosure. Additionally or alternatively, the system 100 is not limited to a cellular connection and may establish and terminate a communication session using any connection and/or network known to one of skill in the art without departing from the disclosure.

FIG. 11 illustrates an example device profile of a device stored in device profile storage according to embodiments of the present disclosure. As illustrated in FIG. 11, each device may store device profile data specific to the device. For example, the second device 112 may include device profile data 1112 representing a device profile that is specific to the second device 112, and the device profile data 1112 may be stored in device profile storage 1110 of the second device 112.

As illustrated in FIG. 11, the device profile may include an assortment of information, such as a device identifier, an account identifier, a user identifier, a contact list of the device, system preferences, other data of the device, a username, a password, account information (which may include a security token), and/or the like.

As illustrated in FIG. 11, the contact list of the device may include a plurality of contacts, and each contact may include various information. For example, the contact information illustrated in FIG. 11 includes information such as a name, nickname, number(s), address(es), email address(es), social media identification, notes, and/or the like. However, the disclosure is not limited thereto and the contact information may also include identification data, name(s), nickname(s), telephone number(s), address(es), email address(es), business name(s), title(s), employment information, social networking information, and/or any other information without departing from the disclosure.

While FIG. 11 illustrates some examples of the device profile data 1112, the disclosure is not limited thereto. Instead, the example illustrated in FIG. 11 is intended to indicate that the device profile data 1112 includes additional information beyond just the contact list of the device, although the disclosure is not limited thereto and this information may vary without departing from the disclosure.

While FIG. 11 illustrates that the device profile data 1112 may include information about a user profile, such as a username, password, account identifier, and/or the like, the disclosure is not limited thereto and additional information that is not illustrated in FIG. 11 may also be stored in the device profile data 1112. Additionally or alternatively, the information stored in the device profile data 1112 may be stored separately and/or may have different formats or structure without departing from the disclosure. For example, the username and password may be stored separately from other information, the username may be stored separately from the password, and/or the like. In addition, some of the information stored in the device profile data 1112 may not be persistent data, meaning that it is stored temporarily and not permanently. For example, the security token may be stored temporarily during runtime but may not be stored permanently in the device profile data 1112 without departing from the disclosure.

Figure 12B:
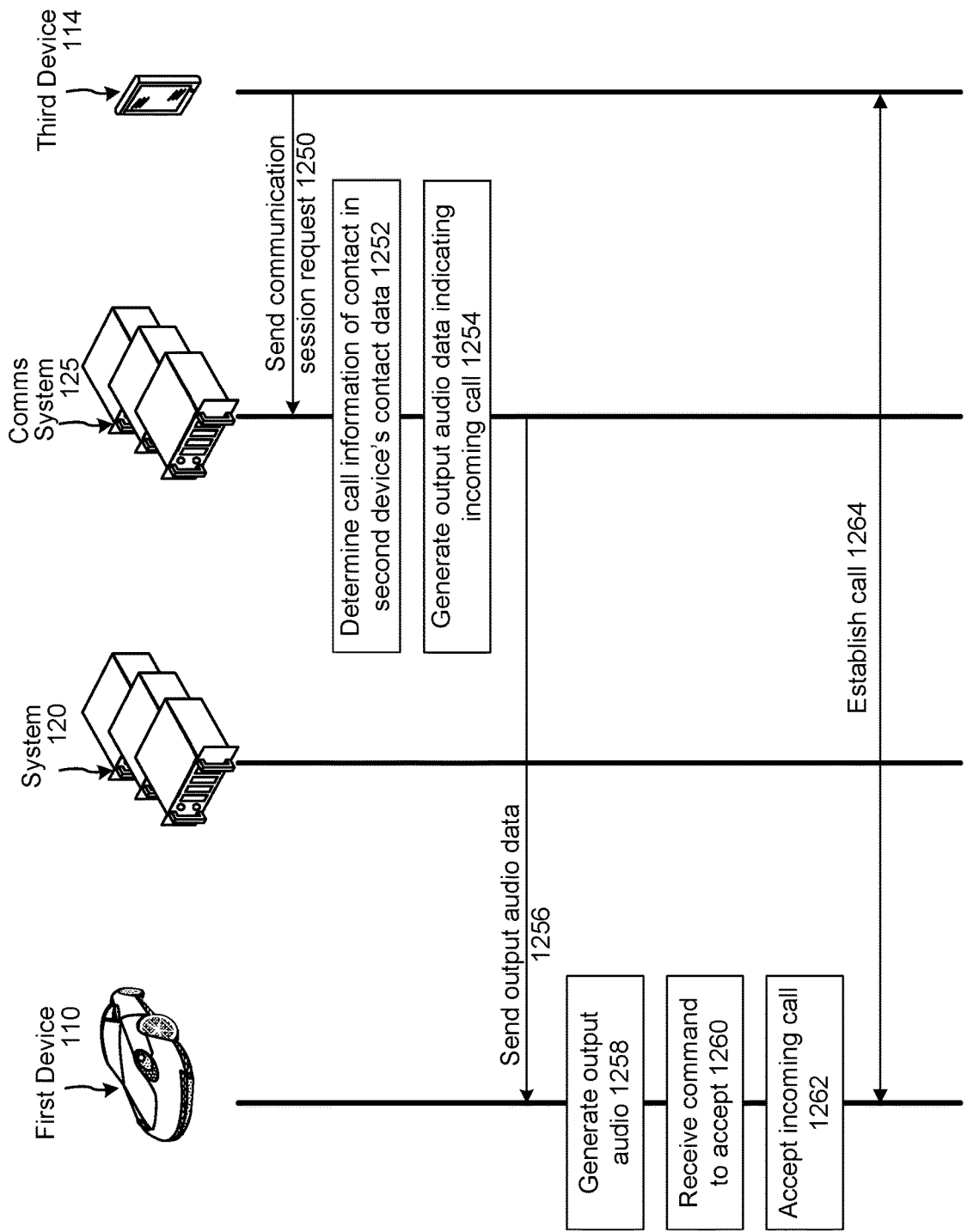

FIGS. 12A-12B are process flow diagrams illustrating examples of establishing communication sessions using a data connection according to embodiments of the present disclosure. As illustrated in FIG. 12A, the vehicle 110 may receive (1210) audio data and send (1212) the audio data to the system 120. The system 120 may receive the audio data, may determine (1214) that the audio data corresponds to a command to initiate a call, and may send (1216) an instruction to initiate the call with the contact to the communications system 125.

The communications system 125 may receive the instruction and may determine (1218) call information of a contact in the second device's contact data (e.g., second device contact data). For example, the instruction may indicate a name associated with a contact to call and the communications system 125 may identify a particular contact in the second device's contact data that corresponds to the name. To illustrate an example, the system 120 may determine that the audio data corresponds to a voice command of "call Mom" and may send an instruction to the communications system 125 instructing the communications system 125 to initiate a communication session with a contact named "Mom." The communications system 125 may interpret the instruction using the second device's contact data and select a contact labeled "Mom" from amongst a plurality of contacts associated with the second device 112. In some examples, the communications system 125 may select a first contact labeled "Mom" that is associated with the second device 112 over a second contact labeled "Mom" that is associated with the vehicle 110. Thus, the system 100 may prioritize the second device's contact data when interpreting the voice command while the second device 112 is connected to the vehicle 110.

The communications system 125 may send (1220) a communication session request to a third device 114 associated with the contact. However, the disclosure is not limited thereto and the system 120 may send the instruction to initiate the call to the vehicle 110 and/or the vehicle 110 may send the communication session request to the third device 114 without departing from the disclosure.

Upon receiving the communication session request, the third device 114 may receive (1222) a command to accept the communication session request, may accept (1224) the incoming call, and then the vehicle 110 and the third device 114 may establish (1226) a call. For example, the third device 114 may display a notification of the communication session request and may receive authorization from a user of the third device 114 to accept the communication session request. In some examples, the third device 114 may be a speech-enabled device that sends audio data to the system 120 and the system 120 performs speech processing to determine that the audio data includes the command to accept, although the disclosure is not limited thereto.

While FIG. 12A illustrates the vehicle 110 initiating an outbound communication session (e.g., call), the disclosure is not limited thereto and FIG. 12B illustrates the vehicle 110 receiving an inbound communication session request. As illustrated in FIG. 12B, the third device 114 may send (1250) a communication session request to the communications system 125.

The communications system 125 may determine (1252) call information of a contact in the second device's contact data (e.g., second device contact data), may generate (1254) output audio data indicating the incoming call request (e.g., indicating the contact and/or additional information about the incoming call), and may send (1256) the output audio data to the vehicle 110.

The vehicle 110 may generate (1258) output audio using the output audio data and may receive (1262) a command to accept the incoming call request. For example, the vehicle 110 may receive the command to accept the incoming call request via direct input associated with a button or dial, a touchscreen, and/or the like. However, the disclosure is not limited thereto and in some examples, the vehicle 110 may receive the command to accept the incoming call request as a voice command. While FIG. 12B does not illustrate steps associated with receiving the voice command, the vehicle 110 may send audio data representing the voice command to the system 120, the system 120 may determine that the audio data corresponds to a voice command to accept the incoming call request, and the system 120 may send a command to the communications system 125 and/or the vehicle 110 to accept the incoming call request.

The vehicle 110 may accept (1262) the incoming call request and the system 100 may establish (1264) the call between the vehicle 110 and the third device 114. For example, the vehicle 110 may send a notification to the third device 114 indicating that the incoming call request is accepted, although the disclosure is not limited thereto and the vehicle 110 may send the notification to the system 120 and/or the communications system 125 without departing from the disclosure.

While FIGS. 12A-12B illustrate an example in which the call is established between the vehicle 110 and the third device 114, the disclosure is not limited thereto. Instead, the call may be established between the second device 112 and the third device 114 without departing from the disclosure.

Figure 13A:
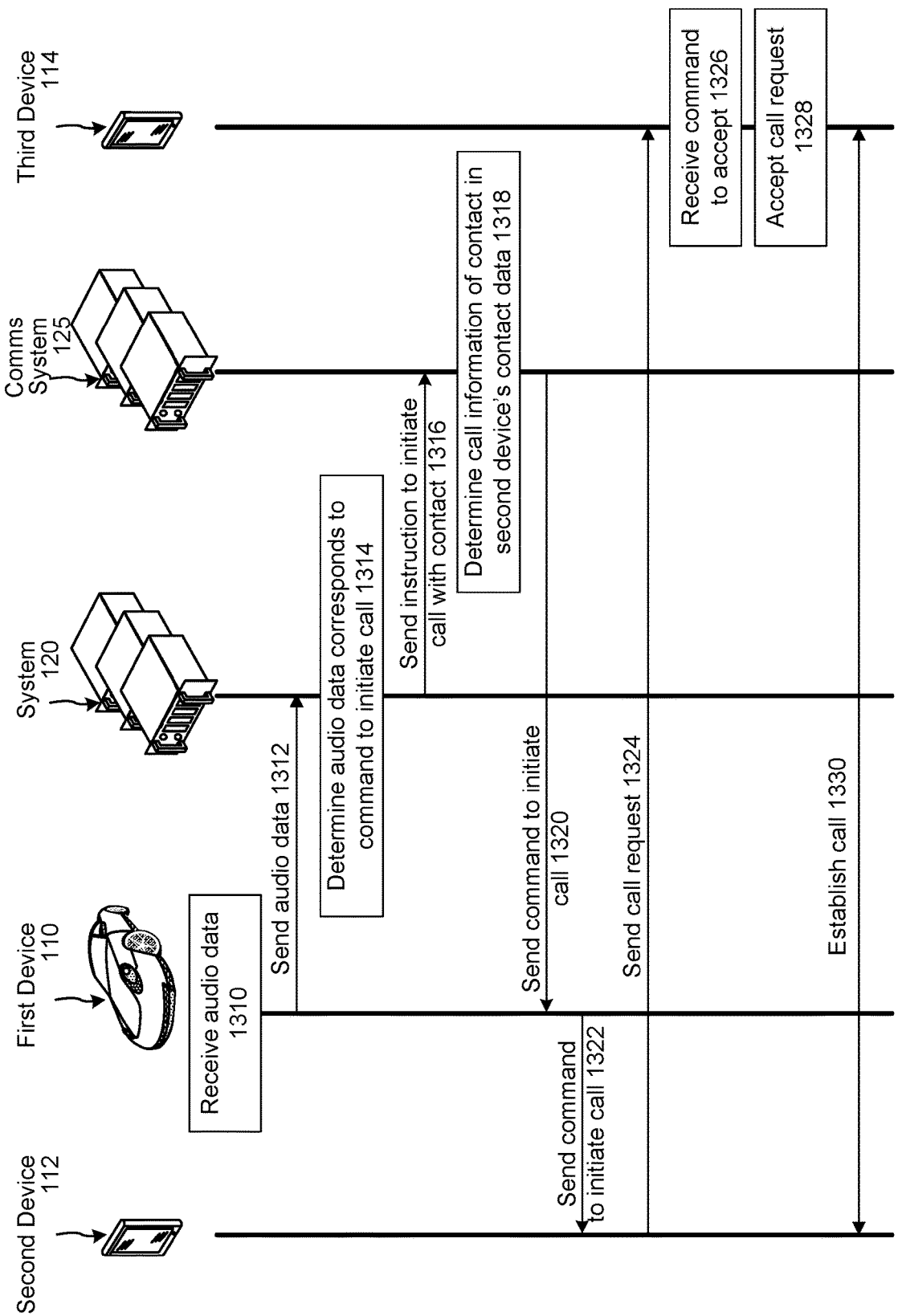

FIGS. 13A-13B are process flow diagrams illustrating examples of establishing communication sessions using a cellular connection according to embodiments of the present disclosure. As illustrated in FIG. 13A, the vehicle 110 may receive (1310) audio data and send (1312) the audio data to the system 120. The system 120 may receive the audio data, may determine (1314) that the audio data corresponds to a command to initiate a call, and may send (1316) an instruction (e.g., command data) to the communications system 125 to initiate the call with the contact.

The communications system 125 may receive the instruction and may determine (1318) call information of a contact in the second device's contact data (e.g., second device contact data). For example, the instruction may indicate a name associated with a contact to call and the communications system 125 may identify a particular contact in the second device's contact data that corresponds to the name. To illustrate an example, the system 120 may determine that the audio data corresponds to a voice command of "call Mom" and may send an instruction to the communications system 125 instructing the communications system 125 to initiate a communication session with a contact named "Mom." The communications system 125 may interpret the instruction using the second device's contact data and select a contact labeled "Mom" from amongst a plurality of contacts associated with the second device 112. In some examples, the communications system 125 may select a first contact labeled "Mom" that is associated with the second device 112 over a second contact labeled "Mom" that is associated with the vehicle 110. Thus, the system 100 may prioritize the second device's contact data when interpreting the voice command while the second device 112 is connected to the vehicle 110.

The communications system 125 may send (1320) a command to initiate a telephone call to the vehicle 110 and the vehicle 110 may send (1322) the command to the second device 112. However, the disclosure is not limited thereto and the system 120 may send the command to initiate the call to the vehicle 110 and/or the communications system 125 may send the command to initiate the call directly to the second device 112 without departing from the disclosure. The second device 112 may receive the command and send (1324) a call request to the third device 114 by dialing the telephone number associated with the contact.

Upon receiving the call request, the third device 114 may receive (1326) a command to accept the communication session request, may accept (1328) the incoming call, and then the second device 112 and the third device 114 may establish (1330) a call. For example, the third device 114 may display a notification of the communication session request and may receive authorization from a user of the third device 114 to accept the communication session request.

While FIG. 13A illustrates the vehicle 110 initiating an outbound communication session (e.g., call), the disclosure is not limited thereto and FIG. 13B illustrates the vehicle 110 receiving an inbound communication session request. As illustrated in FIG. 13B, the third device 114 may send (1350) a call session request to the second device 112.

The second device 112 may send (1352) an indication of the call request to the vehicle 110 and the vehicle 110 may send (1354) an indication of the call request to the communications system 125. The communications system 125 may determine (1356) call information of a contact in the second device's contact data (e.g., second device contact data), may generate (1358) output audio data indicating the incoming call request (e.g., indicating the contact and/or additional information about the incoming call), and may send (1360) the output audio data to the vehicle 110.

The vehicle 110 may generate (1362) output audio using the output audio data, indicating the incoming call request and/or information about the contact from the second device's contact data. After generating the output audio, the second device 112 and/or the vehicle 110 may receive (1364) a command to accept the incoming call request. For example, the vehicle 110 may receive the command to accept the incoming call request via direct input associated with a button or dial, a touchscreen, and/or the like, the second device 112 may receive the command to accept the incoming call request via direct input associated with a button or dial, a touchscreen, and/or the like, and/or the vehicle 110 may receive the command to accept the incoming call request as a voice command (not illustrated in FIG. 13B). While FIG. 13B does not illustrate steps associated with receiving the voice command, the vehicle 110 may send audio data representing the voice command to the system 120, the system 120 may determine that the audio data corresponds to a voice command to accept the incoming call request, and the system 120 may send a command to the communications system 125 and/or the vehicle 110 to accept the incoming call request. While not illustrated in FIG. 13B, when the vehicle 110 receives the command to accept the incoming call request, the vehicle 110 may send a command to the second device 112 to accept the incoming call as part of step 1364.

The second device 112 may accept (1366) the incoming call request and the system 100 may establish (1368) the call between the second device 112 and the third device 114. For example, the second device 112 and/or the vehicle 110 may send a notification to the third device 114 indicating that the incoming call request is accepted, although the disclosure is not limited thereto. In addition, the second device 112 and/or the vehicle 110 may send a notification to the system 120 and/or the communications system 125 indicating that the call request was accepted and the call is established without departing from the disclosure. For example, FIG. 10B illustrates an example in which the vehicle 110 may send a call state notification to the communications system 125 and the communications system 125 sends an event notification to the system 120, although the disclosure is not limited thereto.

Figure 14:
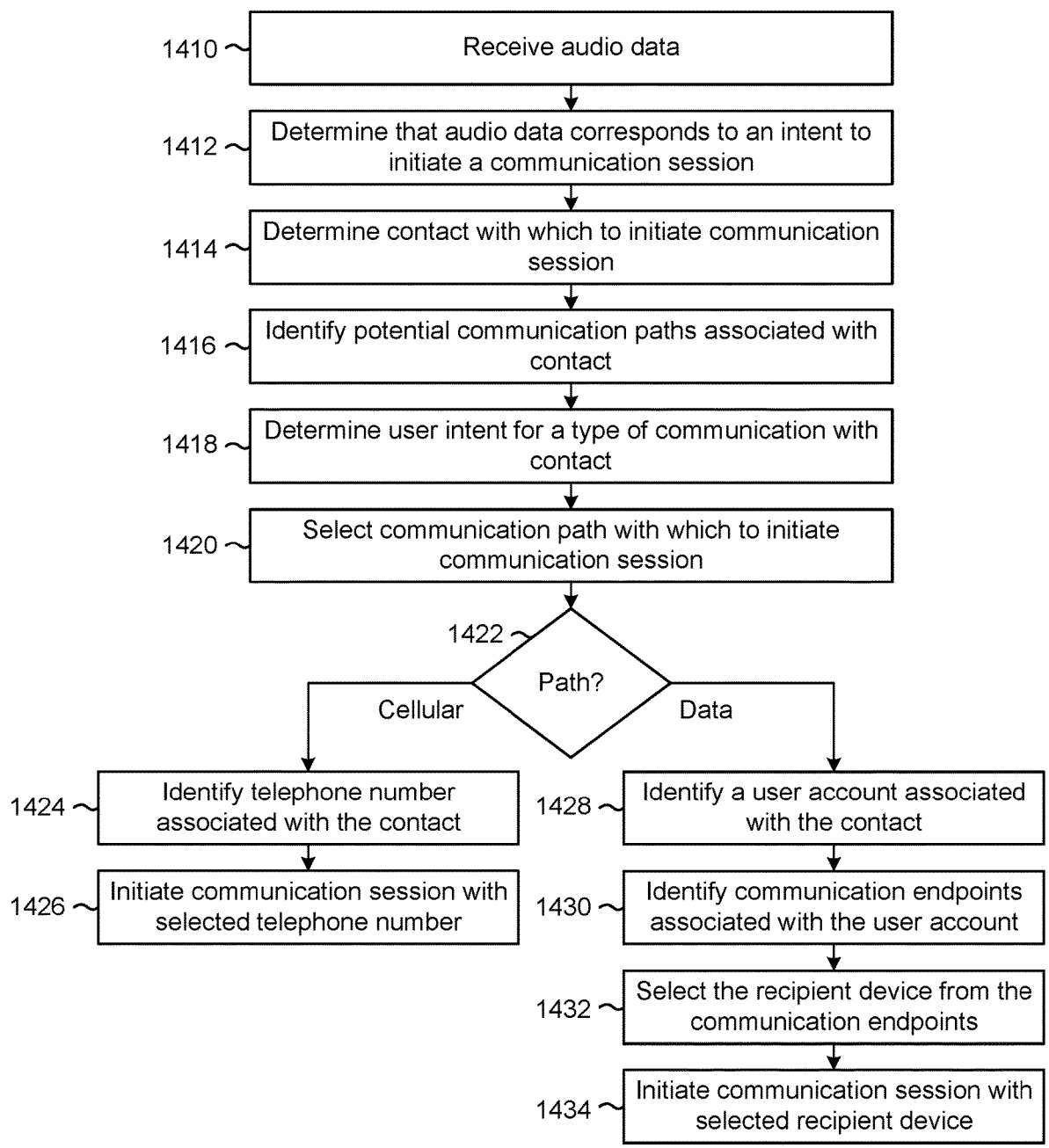
FIG. 14 is a flowchart conceptually illustrating an example method for determining a type of communication session to establish according to embodiments of the present disclosure.

FIG. 14 is a flowchart conceptually illustrating an example method for determining a type of communication session to establish according to embodiments of the present disclosure. As illustrated in FIG. 14, the system 100 may receive (1410) audio data, determine (1412) that the audio data corresponds to an intent to initiate a communication session, and determine (1414) a contact with which to initiate the communication session. For example, the system 100 may interpret an utterance of "call Mom" as a voice command to initiate a communication session with a contact named "Mom."

The system 100 may identify (1416) potential communication paths associated with the contact, determine (1418) a user intent (e.g., intent data) for a type of communication with the contact, and select (1420) a communication path with which to initiate the communication session. For example, the system 100 may select between a first communication path, such as initiating the communication session using a telephone network, cellular connection, or the like, and a second communication path, such as initiating the communication session using a data connection, such as VoIP, using social network applications, and/or using any technique known to one of skill in the art. Thus, the contact may be associated with one or more telephone numbers, one or more user accounts associated with the system 100, one or more social network applications, and/or the like and the system 100 may select a single communication path with which to initiate the communication session with the contact.

The system 100 may determine (1422) which communication path was selected. If the cellular connection (e.g., dialing using a telephone number) was selected, the system 100 may identify (1424) a telephone number associated with the contact and initiate (1426) the communication session with the selected telephone number. If the data connection (e.g., VoIP, using social networking applications, etc.) was selected, the system 100 may identify (1428) a user account associated with the contact, identify (1430) communication endpoints associated with the user account, select (1432) the recipient device from the communication endpoints, and initiate (1434) a communication session with the selected recipient device. For example, the system 100 may determine that the user account is associated with multiple endpoints and may select a particular endpoint and/or recipient device associated with the user account. However, the disclosure is not limited thereto and in some examples, the system 100 may initiate the communication session with multiple recipient devices and/or communication endpoints without departing from the disclosure.

FIGS. 15A-15D are process flow diagrams illustrating examples of terminating a communication session according to embodiments of the present disclosure. Specifically, FIG. 15A illustrates a first example of the third device 114 terminating the call, FIG. 15B illustrates a second example of the second device 112 terminating the call, FIG. 15C illustrates a third example of the vehicle 110 terminating the call, and FIG. 15D illustrates a fourth example of the system 120 terminating the call in response to a voice command.

As illustrated in FIG. 15A, the second device 112 may establish (1510) a communication session with the third device 114, as described in greater detail above, and then the third device 114 may terminate (1512) the call. In response to the call being terminated, the second device 112 may determine (1514) that the call was terminated and send (1516) an indication of termination to the vehicle 110, the vehicle 110 may send (1518) an indication of termination to the communications system 125, and the communications system 125 may send an indication of termination to the system 120.

As illustrated in FIG. 15B, the second device 112 may establish (1510) a communication session with the third device 114, as described in greater detail above, and then the second device 112 may receive (1530) input to end the call.

For example, the second device 112 may receive input from a button press, a touchscreen, and/or the like. The second device 112 may terminate (1532) the call and send (1516) an indication of termination to the vehicle 110, the vehicle 110 may send (1518) an indication of termination to the communications system 125, and the communications system 125 may send an indication of termination to the system 120.

As illustrated in FIG. 15C, the second device 112 may establish (1510) a communication session with the third device 114, as described in greater detail above, and then the vehicle 110 may receive (1550) input to end the call. For example, the vehicle 110 may receive input from a button press, a touchscreen, and/or the like. The vehicle 110 may send (1552) an instruction (e.g., command data) to end the call to the second device 112 and the second device 112 may terminate (1554) the call. After terminating the call, the second device 112 may send (1516) an indication of termination to the vehicle 110, the vehicle 110 may send (1518) an indication of termination to the communications system 125, and the communications system 125 may send an indication of termination to the system 120.

As illustrated in FIG. 15D, the second device 112 may establish (1510) a communication session with the third device 114, as described in greater detail above, and then the vehicle 110 may receive (1570) audio data. The vehicle 110 may send (1572) the audio data to the system 120, the system 120 may determine (1574) that the audio data corresponds to a command to end the call and may send (1576) an instruction to end the call to the communications system 125, the communications system 125 may send (1578) an instruction to end the call to the vehicle 110, the vehicle 110 may send (1580) the instruction to end the call to the second device 112, and the second device 112 may terminate (1582) the call. After terminating the call, the second device 112 may send (1516) an indication of termination to the vehicle 110, the vehicle 110 may send (1518) an indication of termination to the communications system 125, and the communications system 125 may send an indication of termination to the system 120.

While FIGS. 15A-15D illustrate the vehicle 110 sending the indication of termination to the communications system 125 and the communications system 125 sending the indication of termination to the system 120, the disclosure is not limited thereto and the vehicle 110 may send the indication of termination directly to the system 120 in addition to and/or instead of sending the indication of termination to the communications system 125 without departing from the disclosure.

FIG. 16 is a process flow diagram illustrating the integration of contact data according to embodiments of the present disclosure. As illustrated in FIG. 16, the vehicle 110 may establish (1610) a connection with the second device 112 and may send (1612) a signal to the system 120 identifying the connection with the second device 112. For example, the vehicle 110 may establish the connection with the second device 112 using a wireless link (e.g., pair via Bluetooth) and/or a wired link (e.g., using a Universal Serial Bus (USB) interface or other wired connection) and may send a notification that the connection has been established to the system 120. Establishing the connection corresponds to the vehicle 110 being communicatively coupled to the second device 112 via a wireless/wired link, such that the vehicle 110 may send data to and/or receive data from the second device 112.

The vehicle 110 may determine (1614) contact data associated with the second device 112 and may send (1616) the contact data to the system 120. For example, the second device 112 may upload the contact data to the vehicle 110 after establishing the connection in step 1610. However, the disclosure is not limited thereto, and in some examples the vehicle 110 may store the contact data between connections and, based on establishing the connection with the second device 112, the vehicle 110 may identify the previously stored contact data that is associated with the second device 112.

In some examples, the system 120 may send (1618) the contact data to the communications system 125 and the system 120 and/or the communications system 125 may associate (1620) the contact data with a profile associated with the vehicle 110. However, the disclosure is not limited thereto and the system 120 may not send the contact data to the communications system 125 without departing from the disclosure. For example, in some examples the system 120 may not send any information to the communications system 125 (e.g., only associating the contact data with the profile associated with the vehicle on the system 120), whereas in other examples the system 120 may send a portion of the contact data 1616 and/or may send additional data associated with the vehicle profile without departing from the disclosure. Thus, while FIG. 16 illustrates the system 120 sending the same contact data received from the vehicle 110, the disclosure is not limited thereto and the system 120 may determine first data associated with the contact data and/or the vehicle profile and may send the first data to the communications system 125 without departing from the disclosure.

Additionally or alternatively, while FIG. 16 illustrates the vehicle 110 sending contact data to the system 120, the disclosure is not limited thereto and the vehicle 110 may send first data, which may include any information and/or data, whether associated with contacts on the second device 112 or not, that originated from the second device 112.

As used herein, contact data may correspond to information about contacts stored on the second device 112. To illustrate non-limiting examples, contact data may include information associated with identification data, name(s), nickname(s), telephone number(s), address(es), email address(es), business name(s), title(s), employment information, social networking information, and/or the like, although the disclosure is not limited thereto. Further, the second data originating from the second device 112 may include the contact data as well as any information stored on and/or associated with the second device 112 that is not included in the contact data without departing from the disclosure.

As described in greater detail above, the system 120 and/or the communications system 125 may use the contact data and/or the second data to assist with interpreting a voice command received from the vehicle 110. For example, the system 100 may use the contact data and/or the second data to perform disambiguation, prioritize temporary contact information associated with the second device 112 over existing contact information associated with the vehicle 110, and/or the like without departing from the disclosure.

FIG. 17A is a process flow diagram illustrating deleting contact data after termination of a connection according to embodiments of the present disclosure. As illustrated in FIG. 17A, the vehicle 110 and/or the second device 112 may terminate (1710) the connection between the vehicle 110 and the second device 112. In some examples, the vehicle 110 may terminate the connection, such as when the vehicle 110 turns off or receives explicit input instructing the vehicle 110 to end the connection. In other examples, the second device 112 may terminate the connection, such as when the second device 112 determines that battery power is exhausted and the second device 112 enters a low power mode (e.g., sleep or power off), receives input instructing the second device 112 to enter the low power mode, receives input to turn off the wired or wireless transmitter (e.g., receives a button press instructing the second device 112 to turn off Bluetooth), receives input instructing the second device 112 to terminate the connection (e.g., disconnect from the vehicle 110), and/or the like, although the disclosure is not limited thereto. Additionally or alternatively, neither the vehicle 110 or the second device 112 may explicitly terminate the connection but may instead determine that the connection is no longer active (e.g., the vehicle 110 is no longer communicatively coupled to the second device 112), which indicates that the connection is terminated, such as when the second device 112 is out of range of the vehicle 110.

The vehicle 110 may send (1712) a signal to the communications system 125 indicating termination of the connection (e.g., indicating that the connection was terminated and/or that the second device 112 is no longer communicatively coupled to the vehicle 110), the communications system 125 may send (1714) the signal indicating termination of the connection to the system 120. However, the disclosure is not limited thereto and the vehicle 110 may send the signal to the system 120 and the system 120 may send the signal to the communications system 125 without departing from the disclosure.

In response to receiving the signal indicating termination of the connection, the system 120 and/or the communications system 125 may delete (1716) second device contact data associated with the vehicle profile. For example, the system 120 and/or the communications system 125 may determine the second device contact data, or any information associated with the second device contact data, and may remove the data from the vehicle profile or in some way disassociate the data from the vehicle profile.

In some examples, the vehicle 110 may optionally store (1718) or delete the second device contact data. For example, the vehicle 110 may delete the second device contact data upon termination of the connection, such that the second device contact data and/or any information associated with the second device contact data is no longer stored on the vehicle 110 and/or associated with the second device 112. Additionally or alternatively, the vehicle 110 may store the second device contact data with an indicator indicating the second device 112 (e.g., identification data associated with the second device 112 and/or the like), enabling the vehicle 110 to associate the second device contact data with the second device 112 upon establishing a subsequent connection with the second device 112. Thus, the vehicle 110 may optionally store persistent second device contact data so that the second device 112 does not need to send the second device contact data each time the connection is established without departing from the disclosure.

Figure 17B:
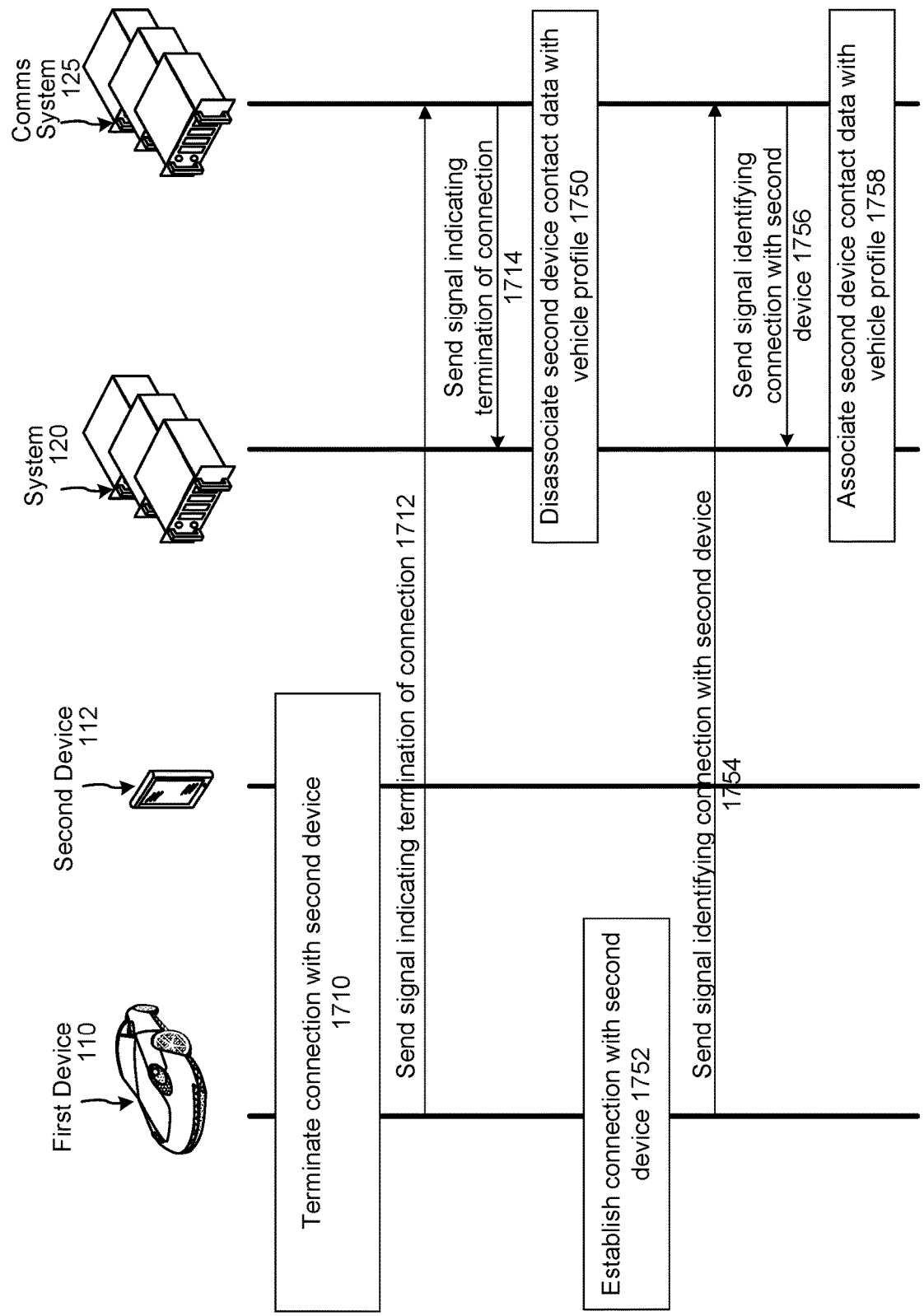
FIG. 17B is a process flow diagram illustrating disassociating contact data after termination of a connection and reassociating the contact data upon establishing a subsequent connection according to embodiments of the present disclosure.

FIG. 17B is a process flow diagram illustrating disassociating contact data after termination of a connection and reassociating the contact data upon establishing a subsequent connection according to embodiments of the present disclosure. As described above with regard to storing the second device contact data on the vehicle 110 when the second device 112 is no longer connected to the vehicle 110 (e.g., so that the second device 112 does not need to send duplicate data each time the connection is established), the system 120 and/or the communications system 125 may also store the second device contact data and simply disassociate the second device contact data from the vehicle profile when the connection is terminated.

As illustrated in FIG. 17B, the vehicle 110 and/or the second device 112 may terminate (1710) the connection between the vehicle 110 and the second device 112, the vehicle 110 may send (1712) a signal to the communications system 125 indicating termination of the connection (e.g., indicating that the connection was terminated and/or that the second device 112 is no longer communicatively coupled to the vehicle 110), and the communications system 125 may send (1714) the signal indicating termination of the connection to the system 120, as described above with regard to FIG. 17A. However, the disclosure is not limited thereto and the vehicle 110 may send the signal to the system 120 and the system 120 may send the signal to the communications system 125 without departing from the disclosure.

In contrast to deleting the second device contact data, the system 120 and/or the communications system 125 may disassociate (1750) the second device contact data from the vehicle profile, while still storing the second device contact data.

At a later point in time, the vehicle 110 may establish (1752) the connection between the vehicle 110 and the second device 112 (e.g., re-establish the existing connection, establish a new connection, and/or the like), corresponding to the vehicle 110 being communicatively coupled to the second device 112.

The vehicle 110 may send (1754) a signal to the system 120 identifying the connection with the second device 112 and the system 120 may send (1756) the signal to the communications system 125. In response to receiving the signal indicating that the vehicle 110 is connected to the second device 112, the system 120 and/or the communications system 125 may associate (1758) the second device contact data with the vehicle profile again.

FIG. 18 is a process flow diagram illustrating processing a voice command using ingested device data according to embodiments of the present disclosure. As illustrated in FIG. 18, the vehicle 110 and the second device 112 may establish (1810) a connection and the vehicle 110 may send (1812) a signal to the system 120 identifying the connection with the second device 112. However, the disclosure is not limited thereto and the vehicle 110 may not send the signal to the system 120 without departing from the disclosure.

After the connection is established, the second device 112 may send (1814) first data to the vehicle 110, the vehicle 110 may send (1816) the first data to the system 120, the system 120 may send (1818) the first data to the communications system 125, and the system 120 and/or the communications system 125 may associate (1820) the first data with the profile of the vehicle (e.g., vehicle profile). The first data may correspond to any information originating from the second device 112. For example, the first data may correspond to the second device contact data described above, although the disclosure is not limited thereto and the first data may include information not associated with contacts stored on the second device 112 without departing from the disclosure.

As described in greater detail above, the system 120 and/or the communications system 125 may use the first data to assist with interpreting a voice command received from the vehicle 110. For example, the system 100 may use the first data to perform disambiguation, prioritize temporary contact information associated with the second device 112 over existing contact information associated with the vehicle 110, and/or the like without departing from the disclosure.

As illustrated in FIG. 18, the vehicle 110 may receive (1822) audio data from one or more microphones associated with the vehicle 110 and may send (1824) the audio data to the system 120. The system 120 may perform (1826) speech processing on the audio data using the first data to determine a command represented in the audio data and the system 120 and/or the communications system 125 may generate (1828) output data corresponding to the command. In some examples, the system 120 may determine the command, receive additional information from the communications system 125, and generate the output data based on the additional information. For example, the system 120 may send a request to the communications system 125 and the communications system 125 may send the additional information based on the request. Additionally or alternatively, the system 120 may send the command to the communications system 125 and the communications system 125 may generate the output data without departing from the disclosure. For example, the system 120 may send the command with a contact name or other entity information and the communications system 125 may interpret the contact name/entity information based on the profile data.

The system 120 and/or the communications system 125 may send (1830) the output data to the vehicle 110, prompting the vehicle 110 to perform (1832) an action corresponding to the output data. Thus, the output data may correspond to an action to perform, such as generating output audio data representing a notification, capturing input audio data during a communication session, and/or the like, although the disclosure is not limited thereto and the output data may correspond to any action known to one of skill in the art without departing from the disclosure.

While FIG. 18 illustrates the vehicle 110 sending the first data to the system 120 and/or the communications system 125, the disclosure is not limited thereto. In some examples, the vehicle 110 may store the first data locally on the vehicle 110 and/or send the first data to a local device (not illustrated) located within the vehicle 110. Similarly, while FIG. 18 and other drawings illustrate the system 100 processing voice commands remotely (e.g., performing speech processing, contact resolution, disambiguation, and/or the like using the system 120 and/or the communications system 125), the disclosure is not limited thereto and the vehicle 110 may process voice commands locally without departing from the disclosure. For example, the vehicle 110 may perform any of the functionality described herein even when the vehicle 110 and/or the second device 112 are not connected to the system 120 and/or the communications system 125 without departing from the disclosure.

FIGS. 19A-19B are process flow diagrams illustrating the temporary association of profile data according to embodiments of the present disclosure. As illustrated in FIG. 19A, the vehicle 110 and the second device 112 may establish (1910) a connection and the vehicle 110 may send (1912) a signal to the system 120 identifying the connection with the second device 112.

In some examples, the system 120 may identify (1914) profile data associated with the second device 112 (e.g., second device profile data) based on the signal and the system 120 and/or the communications system 125 may associate (1916) the second device profile data with the profile of the vehicle (e.g., vehicle profile). For example, the signal may identify the second device 112 using identification information or some other form of identification and the system 120 may use the identification information to identify the second device profile data associated with the second device 112. Thus, the vehicle 110 does not need to send the second device profile data (e.g., first data, second device contact data, and/or the like) to the system 120 each time the vehicle 110 establishes a connection with the second device 112. Instead, the system 120 determines that the connection is established and associates the second device profile data with the vehicle profile accordingly.

To illustrate an example, the vehicle 110 may have previously established connections with a small number of devices, such as a first smartphone associated with a first user of the vehicle (e.g., wife) a second smartphone associated with a second user of the vehicle (e.g., husband), and/or the like. Thus, when the first smartphone was connected to the vehicle 110, the system 120 may have received first information (e.g., first data and/or second device contact data originating from the first smartphone) and associated the first information with a first user profile associated with the first smartphone. Similarly, when the second smartphone was connected to the vehicle 110, the system 120 may have received second information (e.g., first data and/or second device contact data originating from the second smartphone) and associated the second information with a second user profile associated with the first smartphone. Using the signal identifying the connection with the second device 112, the system 120 may determine that the second device 112 corresponds to the first smartphone or the second smartphone and identify the profile data accordingly. For example, if the second device 112 corresponds to the first smartphone, the system 120 may associate the first user profile with the vehicle profile, whereas if the second device 112 corresponds to the second smartphone, the system 120 may associate the second user profile with the vehicle profile.

In some examples, the system 120 may link the first user profile associated with the first smartphone to a larger user profile associated with the first user of the vehicle 110. For example, the first user may interact with the system 120 directly using the first smartphone and/or other devices and thus the system 120 may already have a user profile associated with the first user, separate from the previously established connections between the first smartphone and the vehicle 110. Thus, while FIG. 19A illustrates that the system 120 and/or the communications system 125 may associate profile data associated with the second device 112 with the vehicle profile, this may actually refer to a larger user profile associated with a specific user (e.g., the first user). Thus, the system 120 may use the signal identifying the connection and/or identification information associated with the first smartphone to identify the larger user profile associated with the first user and may associate the larger user profile with the vehicle profile without departing from the disclosure.

As described in greater detail above, the system 120 and/or the communications system 125 may use the profile data associated with the second device 112 to assist with interpreting a voice command received from the vehicle 110. For example, the system 100 may use the second device profile data to perform disambiguation, prioritize temporary contact information associated with the second device 112 over existing contact information associated with the vehicle 110, and/or the like without departing from the disclosure.

As illustrated in FIG. 19A, the vehicle 110 may receive (1918) audio data from one or more microphones associated with the vehicle 110 and may send (1920) the audio data to the system 120. The system 120 may perform (1922) speech processing on the audio data using the second device profile data to determine a command represented in the audio data and the system 120 and/or the communications system 125 may generate (1924) output data corresponding to the command. In some examples, the system 120 may determine the command, receive additional information from the communications system 125, and generate the output data based on the additional information. For example, the system 120 may send a request to the communications system 125 and the communications system 125 may send the additional information based on the request. Additionally or alternatively, the system 120 may send the command to the communications system 125 and the communications system 125 may generate the output data without departing from the disclosure. For example, the system 120 may send the command with a contact name or other entity information and the communications system 125 may interpret the contact name/entity information based on the profile data.

The system 120 and/or the communications system 125 may send (1926) the output data to the vehicle 110, prompting the vehicle 110 to perform (1928) an action corresponding to the output data. As discussed above, the output data may correspond to an action to perform, such as generating output audio data representing a notification, capturing input audio data during a communication session, and/or the like, although the disclosure is not limited thereto and the output data may correspond to any action known to one of skill in the art without departing from the disclosure.

In some examples, the system 120 may not identify the profile data associated with the second device 112 using only the signal and/or identification information indicated by the signal. For example, the system 120 may not have associated the identification information with profile data and/or the identification information may be too vague to accurately identify the profile data. When this occurs, the system 120 may receive first data from the vehicle 110 and may use the first data to identify the profile data associated with the second device 112. For example, the first data may include additional information originating from the second device 112, such as precise identification information, and the system 120 may accurately identify the profile data associated with the second device 112 based on the precise identification information.

Additionally or alternatively, in some examples the first data may include the second device contact data (or a portion thereof), and the system 120 may use the first data to identify the profile data associated with the second device 112. For example, the system 120 may identify one or more first contacts that are unique to the first smartphone (e.g., not stored as contacts in the second smartphone) and, if the first data includes the one or more first contacts, may determine that that the second device 112 corresponds to the first smartphone and identify profile data associated with the first smartphone. Similarly, the system 120 may identify one or more second contacts that are unique to the second smartphone (e.g., not stored as contacts in the first smartphone) and, if the first data includes the one or more second contacts, may determine that that the second device 112 corresponds to the second smartphone and identify profile data associated with the second smartphone.

As illustrated in FIG. 19B, the vehicle 110 and the second device 112 may establish (1910) the connection and the vehicle 110 may send (1912) the signal to the system 120 identifying the connection with the second device 112. The second device 112 may send (1950) the first data to the vehicle 110 and the vehicle 110 may send (1952) the first data to the system 120. Based on the first data, the system 120 may identify (1954) profile data associated with the second device 112 (e.g., second device profile data) and the system 120 and/or the communications system 125 may associate (1916) the second device profile data with the profile of the vehicle (e.g., vehicle profile).

As described above with regard to FIG. 19A, the vehicle 110 may receive (1918) audio data from one or more microphones associated with the vehicle 110 and may send (1920) the audio data to the system 120. The system 120 may perform (1922) speech processing on the audio data using the second device profile data to determine a command represented in the audio data and the system 120 and/or the communications system 125 may generate (1924) output data corresponding to the command. In some examples, the system 120 may determine the command, receive additional information from the communications system 125, and generate the output data based on the additional information. For example, the system 120 may send a request to the communications system 125 and the communications system 125 may send the additional information based on the request. Additionally or alternatively, the system 120 may send the command to the communications system 125 and the communications system 125 may generate the output data without departing from the disclosure. For example, the system 120 may send the command with a contact name or other entity information and the communications system 125 may interpret the contact name/entity information based on the profile data.

The system 120 and/or the communications system 125 may send (1926) the output data to the vehicle 110, prompting the vehicle 110 to perform (1928) an action corresponding to the output data. As discussed above, the output data may correspond to an action to perform, such as generating output audio data representing a notification, capturing input audio data during a communication session, and/or the like, although the disclosure is not limited thereto and the output data may correspond to any action known to one of skill in the art without departing from the disclosure.

Figure 20:
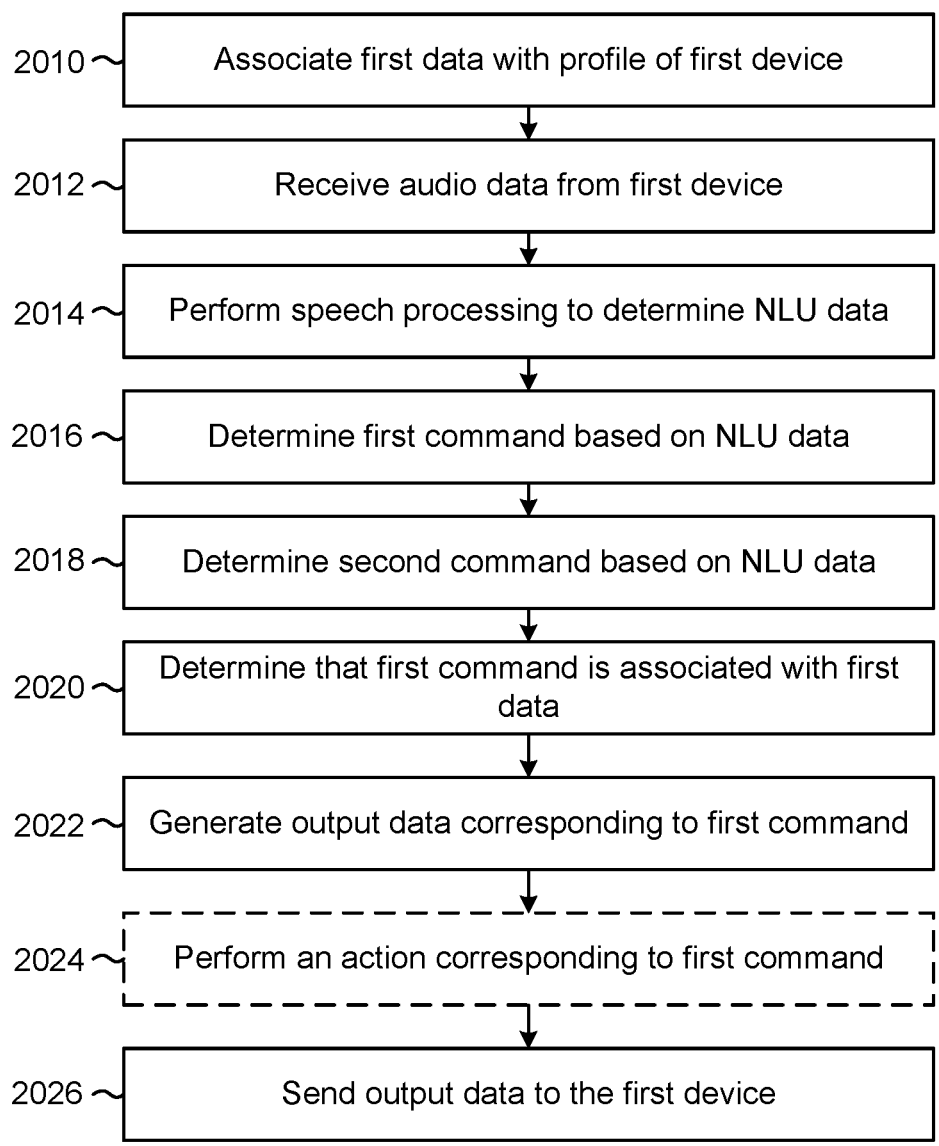
FIG. 20 is a flowchart conceptually illustrating an example method for performing disambiguation by prioritizing temporarily associated profile data over existing profile data according to embodiments of the present disclosure.

FIG. 20 is a flowchart conceptually illustrating an example method for performing disambiguation by prioritizing temporarily associated profile data over existing profile data according to embodiments of the present disclosure. As illustrated in FIG. 20, the system 100 may associate (2010) first data with a profile of a first device. For example, the system 100 may receive the first data from the first device (e.g., the vehicle 110), although the first data may have originated from the second device 112. However, the disclosure is not limited thereto and the first data may also corresponds to data and/or information stored on the system 100 that is associated with the second device 112.

The system 100 may receive (2012) audio data from the first device (e.g., vehicle 110) and may perform (2014) speech processing to determine NLU data corresponding to the audio data. The system 100 may determine (2016) a first command based on the NLU data, may determine (2018) a second command based on the NLU data, and may determine (2020) that the first command is associated with the first data. To prioritize the first data, which may include temporary contacts associated with the second device 112, the system 100 may select the first command over the second command and generate (2022) output data corresponding to the first command. The system 100 may optionally (2024) perform an action corresponding to the first command and send (2026) the output data to the first device, as described in greater detail above.

As illustrated in FIG. 20, the system 100 may prioritize the first data by selecting the first command over the second command. In some examples, the system 100 may associate the first data with a first priority value that is higher than a second priority value associated with second data included in the profile of the first device that is not associated with the second device 112. However, this is intended only as an illustrative example and the disclosure is not limited thereto. Instead, the system 100 may prioritize the first data over the second data using any techniques known to one of skill in the art without departing from the disclosure.

In some examples, the system 120 may perform speech processing while the communications system 125 may perform disambiguation by prioritizing temporarily associated profile data over existing profile data, although the disclosure is not limited thereto.

FIGS. 21A-21B illustrate examples of temporarily associating one or more user profiles according to embodiments of the present disclosure. As illustrated in FIGS. 21A-21B, the system 100 may associate first profile data 2110 with the vehicle 110, second profile data 2120 with second device 112a, and third profile data 2130 with second device 112b. In some examples, the second device 112a may correspond to a first user and the second device 112b may correspond to a second user, although the disclosure is not limited thereto. For ease of illustration, FIGS. 21A-21B illustrate the first profile data 2110 being associated with first contact data 2112, the second profile data 2120 being associated with second contact data 2122, and the third profile data 2130 being associated with third contact data 2132. However, the disclosure is not limited thereto and the profile data 2110/2120/2130 may be associated with additional information without departing from the disclosure. For example, the system 100 may associate the second profile data 2120 and/or the third profile data 2130 with the first profile data 2110 without departing from the disclosure.

FIG. 21A illustrates a single device implementation 2100 that conceptually illustrates an example of modifying the first profile data 2110 associated with the vehicle 110 while the vehicle 110 is connected to a single device (e.g., second device 112a). For example, when there is no connection between the vehicle 110 and the second device 112a, illustrated in FIG. 21A by not connected state 2102, the system 100 may only associate the first contact data 2112 with the vehicle 110, as illustrated by first profile data 2110a. In contrast, when there is a connection between the vehicle 110 and the second device 112a, illustrated in FIG. 21A by connected state 2104, the system 100 may associate the first contact data 2112 and the second contact data 2122 with the vehicle 110, as illustrated by first profile data 2110b.

In some examples, a vehicle (e.g., first device 110) may be connected to multiple smartphones (e.g., second devices 112a/112b) simultaneously, such are when two users are riding in the vehicle. When the first device 110 is connected to multiple second devices 112a/112b (e.g., first smartphone associated with a first user and second smartphone associated with a second user), the system 100 may obtain first contact data associated with the first smartphone and second contact data associated with the second smartphone and may associate both the first contact data and the second contact data with the profile associated with the first device 110.

FIG. 21B illustrates a multiple device implementation 2150 that conceptually illustrates an example of modifying the first profile data 2110 associated with the vehicle 110 while the vehicle 110 is connected to two or more devices (e.g., second device 112a, second device 112b, etc.). For example, when there is no connection between the vehicle 110 and the second devices 112a/112b, illustrated in FIG. 21B by not connected state 2152, the system 100 may only associate the first contact data 2112 with the vehicle 110, as illustrated by first profile data 2110a. In contrast, when there is a first connection between the vehicle 110 and the second device 112a and a second connection between the vehicle 110 and the second device 112b, illustrated in FIG. 21B by connected state 2154, the system 100 may associate the first contact data 2112, the second contact data 2122, and the third contact data 2132 with the vehicle 110, as illustrated by first profile data 2110c.

Thus, while the vehicle 110 is connected to both the second device 112a and the second device 112b, the system 100 may associate contact data corresponding to the second devices 112a/112b (e.g., second contact data 2122 and third contact data 2132), profile data corresponding to the second devices 112a/112b (e.g., second profile data 2120 and third profile data 2130), and/or the like with the first profile data 2110 corresponding to the vehicle 110. If the vehicle 110 terminates the second connection with the second device 112b but maintains the first connection with the second device 112a, the system 100 may remove the association between the third contact data 2132 and the first profile data 2110, while maintaining the association between the second contact data 2122 and the first profile data 2110. Similarly, if the vehicle 110 terminates the first connection with the second device 112a but maintains the second connection with the second device 112b, the system 100 may remove the association between the second contact data 2122 and the first profile data 2110, while maintaining the association between the third contact data 2132 and the first profile data 2110. Finally, if the vehicle 110 terminates the first connection with the second device 112a and the second connection with the second device 112b, the system 100 may remove the association between both the second contact data 2122/third contact data 2132 and the first profile data 2110.

While FIGS. 21A-21B are described with regard to the first device 110 corresponding to a vehicle, the disclosure is not limited thereto and the first device 110 may correspond to any device without departing from the disclosure. In some examples, the first device 110 may correspond to a speech-enabled device (e.g., Amazon Echo device) located in a building. For example, the system 100 may determine that one or more second devices 112 are within communicable range of the first device 110 and may associate contact data and/or profile data corresponding to the one or more second devices 112 with the first profile data corresponding to the first device 110, as described above with regard to FIGS. 21A-21B. The system 100 may determine that the one or more second devices 112 are within communicable range of the first device 110 using any techniques known to one of skill in the art, such as using wireless networking protocols (e.g., Bluetooth, WiFi, etc.), location data, proximity sensors, and/or the like. In some examples, the system 100 may require additional authentication and/or verification from a user before associating the one or more second devices 112 with the first device 110.

Figure 22:
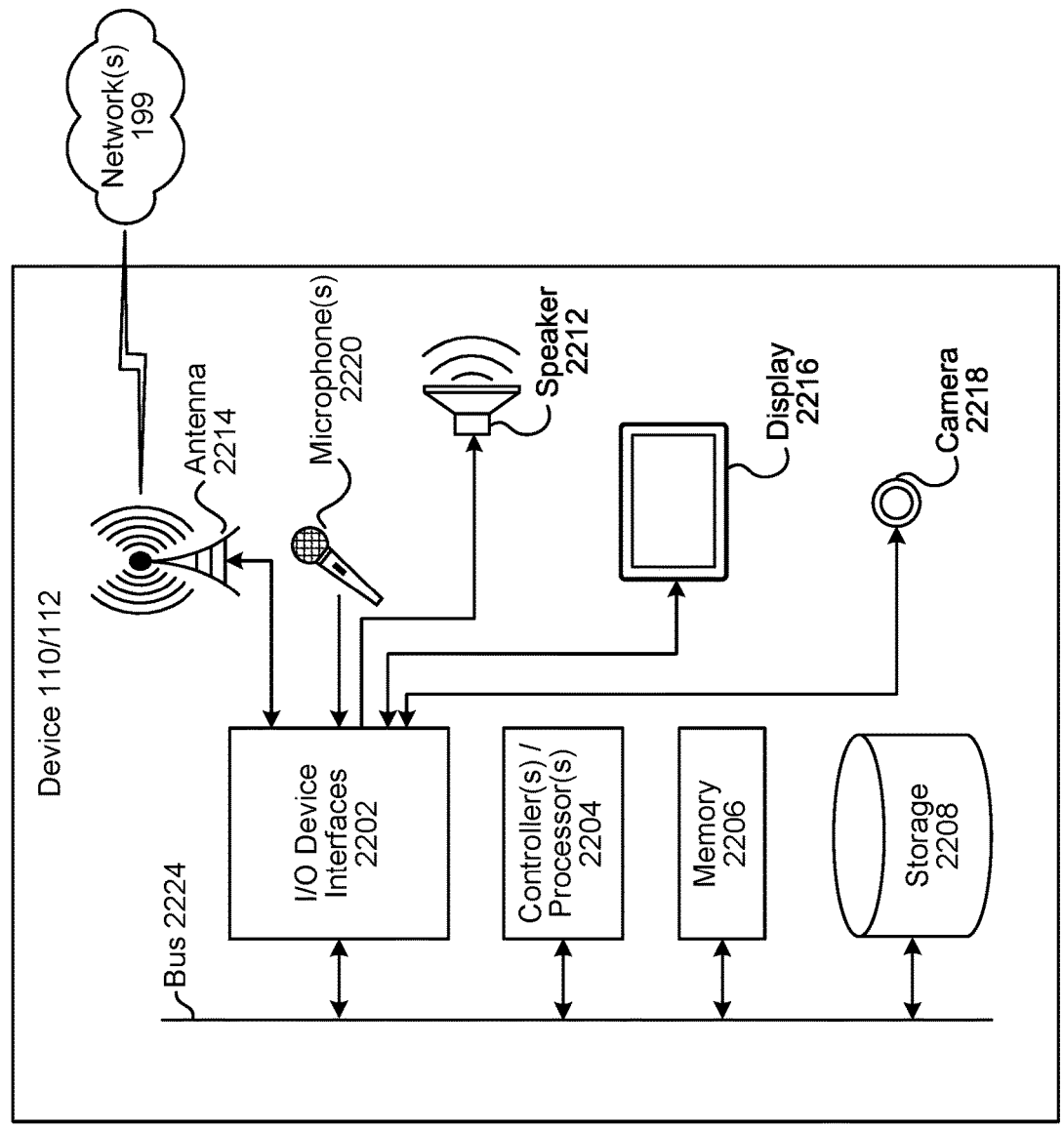
FIG. 22 is a block diagram conceptually illustrating example components of a device according to embodiments of the present disclosure.
Figure 23:
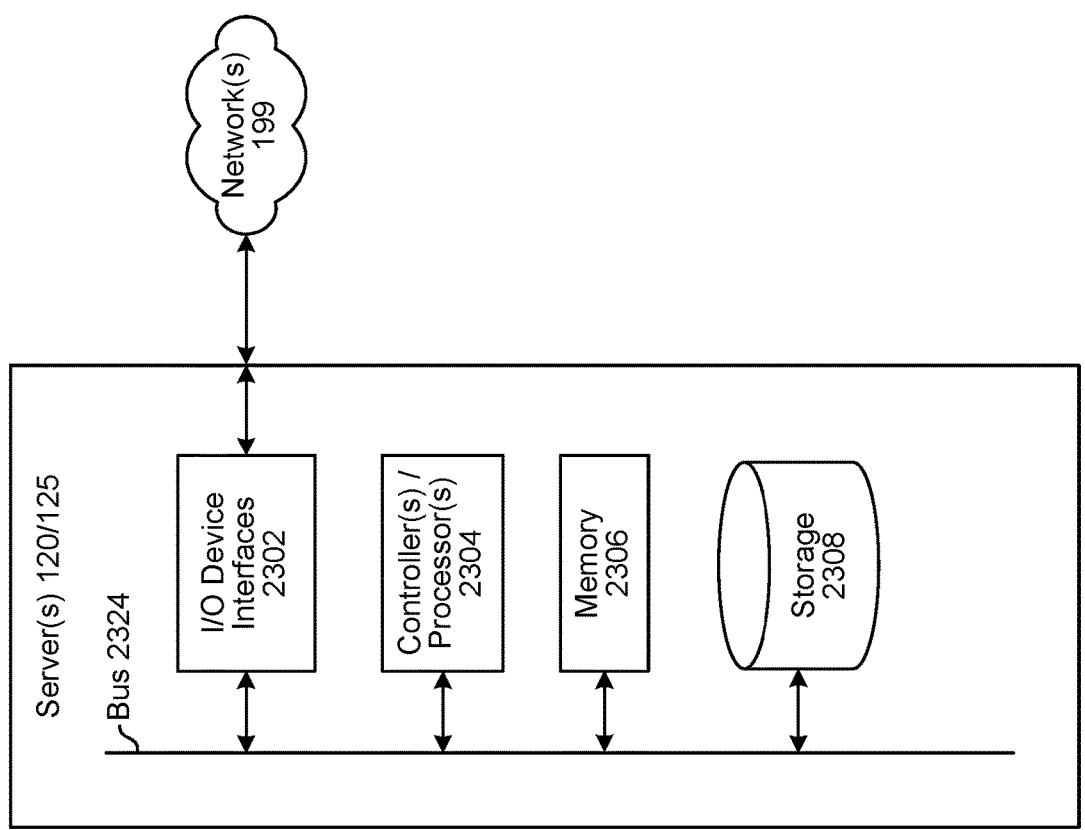
FIG. 23 is a block diagram conceptually illustrating example components of a system according to embodiments of the present disclosure.

FIG. 22 is a block diagram conceptually illustrating a device 110/112 that may be used with the system. FIG. 23 is a block diagram conceptually illustrating example components of the system 120/communications system 125, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/112/120/125) may include one or more controllers/processors (2204/2304), which may each include a central processing unit (CPU) for processing data and computer-readable instructions, and a memory (2206/2306) for storing data and instructions of the respective device. The memories (2206/2306) may individually include volatile random access memory (RAM), non-volatile read only memory (ROM), non-volatile magnetoresistive memory (MRAM), and/or other types of memory. Each device (110/112/120/125) may also include a data storage component (2208/2308) for storing data and controller/processor-executable instructions. Each data storage component (2208/2308) may individually include one or more non-volatile storage types such as magnetic storage, optical storage, solid-state storage, etc. Each device (110/112/120/125) may also be connected to removable or external non-volatile memory and/or storage (such as a removable memory card, memory key drive, networked storage, etc.) through respective input/output device interfaces (2202/2302).

Computer instructions for operating each device/system (110/112/120/125) and its various components may be executed by the respective device's controller(s)/processor(s) (2204/2304), using the memory (2206/2306) as temporary "working" storage at runtime. A device's computer instructions may be stored in a non-transitory manner in non-volatile memory (2206/2306), storage (2208/2308), or an external device(s). Alternatively, some or all of the executable instructions may be embedded in hardware or firmware on the respective device in addition to or instead of software.

Each device/system (110/112/120/125) includes input/output device interfaces (2202/2302). A variety of components may be connected through the input/output device interfaces (2202/2302), as will be discussed further below. Additionally, each device (110/112/120/125) may include an address/data bus (2224/2324) for conveying data among components of the respective device. Each component within a device (110/112/120/125) may also be directly connected to other components in addition to (or instead of) being connected to other components across the bus (2224/2324).

Referring to FIG. 22, the device 110/112 may include input/output device interfaces 2202 that connect to a variety of components such as an audio output component such as a speaker 2212, a wired headset or a wireless headset (not illustrated), or other component capable of outputting audio. The device 110/112 may also include an audio capture component. The audio capture component may be, for example, a microphone 2220 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 2216 for displaying content. The device 110/112 may further include a camera 2218.

Via antenna(s) 2214, the input/output device interfaces 2202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2202/2302) may also include communication components that allow data to be exchanged between devices such as different physical systems in a collection of systems or other components.

The components of the device(s) 110, the system 120, of the communications system 125 may include their own dedicated processors, memory, and/or storage. Alternatively, one or more of the components of the device(s) 110/112, the system 120, or the communications system 125 may utilize the I/O interfaces (2202/2302), processor(s) (2204/2304), memory (2206/2306), and/or storage (2208/2308) of the device(s) 110/112, the system 120, or the communications system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the system 120, and the communications system 125, as described herein, are illustrative, and may be located as a stand-alone device or may be included, in whole or in part, as a component of a larger device or system.

Figure 24:
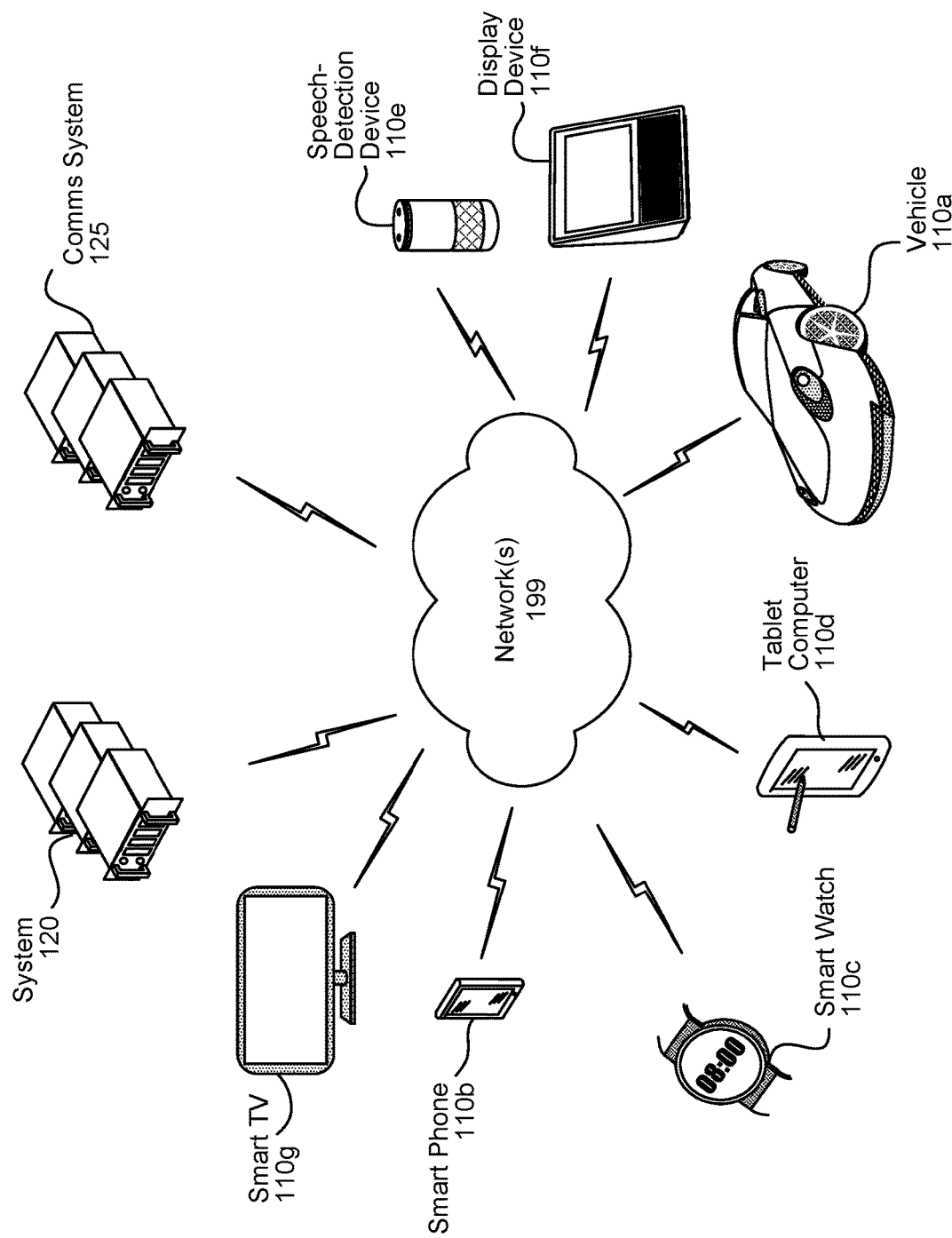
FIG. 24 illustrates an example of a network of devices according to embodiments of the present disclosure.

As illustrated in FIG. 24, multiple devices (110a-110g, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, and/or a smart television 110g may be connected to the network(s) 199 through a wireless service provider, over a WiFi or cellular network connection, or the like. Any of the devices 110 may be first devices or second devices 112 depending on the system configuration. Other devices are included as network-connected support devices, such as the system 120, the communications system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   determining that a first device is proximate to a second device;
   based at least in part on the first device being proximate to the second device, receiving, from a first computing system different from the first device and the second device, first profile data associated with the second device;
   associating the first profile data with the first device;
   determining first audio data corresponding to a first utterance captured by the first device; and
   performing speech processing using the first audio data and the first profile data to determine first output data.

2. The computer-implemented method of claim 1, wherein determining the first device is proximate to the second device comprises determining the first device is wirelessly connected to the second device.

3. The computer-implemented method of claim 1, wherein determining the first device is proximate to the second device comprises determining the first device is physically connected to the second device.

4. The computer-implemented method of claim 1, further comprising:
   after performing the speech processing, disassociating the first profile data from the first device.

5. The computer-implemented method of claim 4, wherein the disassociating is performed in response to termination of a connection between the first device and the second device.

6. The computer-implemented method of claim 4, wherein the disassociating is performed in response to an instruction.

7. The computer-implemented method of claim 4, further comprising, after disassociating the first profile data:
   determining that the first device is proximate to a third device;
   based at least in part on the first device being proximate to the third device, receiving, from the first computing system, second profile data associated with the second device;
   associating the second profile data with the first device;
   receiving, from the first device, second audio data corresponding to a second utterance; and
   performing speech processing using the second audio data and the second profile data to determine second output data.

8. The computer-implemented method of claim 1, wherein performing the speech processing to determine the first output data comprises:
   determining the first audio data includes a reference to an entity;
   determining the reference corresponds to a first entity associated with the first profile data; and
   determining the first output data based at least in part on the first entity.

9. The computer-implemented method of claim 1, further comprising:
   sending, to the first computing system, a request for the first profile data;
   wherein the first profile data is received from the first computing system in response to the request.

10. The computer-implemented method of claim 9, wherein the request includes an identifier of the second device to enable the first computing system to determine that the first profile data is associated with the second device.

11. A system comprising:
at least one processor; and
at least one memory comprising instructions that, when executed by the at least one processor, cause the system to:
- determine that a first device is proximate to a second device;
- based at least in part on the first device being proximate to the second device, receive, from a computing system different from the first device and the second device, first profile data associated with the second device;
- associate the first profile data with the first device;
- determine first audio data corresponding to a first utterance captured by the first device; and
- perform speech processing using the first audio data and the first profile data to determine first output data.

12. The system of claim 11, wherein the instructions that cause the system to determine the first device is proximate to the second device comprise instructions that, when executed by the at least one processor, cause the system to determine the first device is wirelessly connected to the second device.

13. The system of claim 11, wherein the instructions that cause the system to determine the first device is proximate to the second device comprise instructions that, when executed by the at least one processor, cause the system to determine the first device is physically connected to the second device.

14. The system of claim 11, wherein the at least one memory further comprises instructions that, when executed by the at least one processor, further cause the system to:
- after performing the speech processing, disassociate the first profile data from the first device.

15. The system of claim 14, wherein the instructions that cause the system to disassociate are executed in response to termination of a connection between the first device and the second device.

16. The system of claim 14, wherein the instructions that cause the system to disassociate are executed in response to an instruction.

17. The system of claim 14, wherein the at least one memory further comprises instructions that, when executed by the at least one processor, further cause the system to, after disassociating the first profile data:
- determine that the first device is proximate to a third device;
- based at least in part on the first device being proximate to the third device, receive, from the computing system, second profile data associated with the second device;
- associate the second profile data with the first device;
- receive, from the first device, second audio data corresponding to a second utterance; and
- perform speech processing using the second audio data and the second profile data to determine second output data.

18. The system of claim 11, wherein the instructions that cause the system to perform the speech processing to determine the first output data comprise instructions that, when executed by the at least one processor, cause the system to:
- determine the first audio data includes a reference to an entity;
- determine the reference corresponds to a first entity associated with the first profile data; and
- determine the first output data based at least in part on the first entity.

19. The system of claim 11, wherein the at least one memory further comprises instructions that, when executed by the at least one processor, further cause the system to:
- send, to the computing system, a request for the first profile data; and
- receive the first profile data from the computing system in response to the request.

20. The system of claim 19, wherein the at least one memory further comprises instructions that, when executed by the at least one processor, further cause the system to:
- configure the request to include an identifier of the second device to enable the computing system to determine that the first profile data is associated with the second device.

* * * * *